US007287264B2

(12) United States Patent
Akanuma

(10) Patent No.: US 7,287,264 B2
(45) Date of Patent: Oct. 23, 2007

(54) OBJECTIVE LENS DRIVE APPARATUS WITH OBJECTIVE LENS PORTION MOVABLE ALONG SUPPORT MEMBER AXIAL DIRECTION

(75) Inventor: Goichi Akanuma, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 522 days.

(21) Appl. No.: 10/448,002

(22) Filed: May 30, 2003

(65) Prior Publication Data

US 2003/0234990 A1 Dec. 25, 2003

(30) Foreign Application Priority Data

| Jun. 6, 2002 | (JP) | ............................. 2002-165616 |
| Jul. 8, 2002 | (JP) | ............................. 2002-198442 |
| Oct. 10, 2002 | (JP) | ............................. 2002-297166 |
| Nov. 18, 2002 | (JP) | ............................. 2002-334417 |

(51) Int. Cl.
*G11B 7/09* (2006.01)

(52) U.S. Cl. ...................................... 720/681; 720/685

(58) Field of Classification Search ................ 720/681, 720/682, 683, 684, 685

See application file for complete search history.

(56) References Cited

U.S. PATENT DOCUMENTS

| 5,790,510 | A | * | 8/1998 | Itoh et al. .................... 720/685 |
| 6,018,509 | A | * | 1/2000 | Itoh et al. .................... 720/685 |
| 6,177,667 | B1 | | 1/2001 | Fujita et al. |
| 6,343,053 | B1 | | 1/2002 | Akanuma et al. |
| 2002/0021651 | A1 | * | 2/2002 | Hong et al. ............ 369/112.23 |
| 2003/0174596 | A1 | | 9/2003 | Wakabayashi et al. |
| 2003/0184179 | A1 | * | 10/2003 | Galbraith .................... 310/166 |

FOREIGN PATENT DOCUMENTS

| EP | 0 650 161 A1 | 4/1995 |
| JP | 01-243246 | 9/1989 |
| JP | 5-4096 | 2/1993 |
| JP | 05-073938 | 3/1993 |

(Continued)

OTHER PUBLICATIONS

"Optical Pickup Assembly," Choi et al., Republic of Korea, Patent No. KR 2002045022 A, Abstract & Clipped Image Only, Publushed Jun. 19, 2002.*

(Continued)

*Primary Examiner*—Craig A. Renner
(74) *Attorney, Agent, or Firm*—Dickstein Shapiro LLP

(57) ABSTRACT

An objective lens drive apparatus includes a stationary member, a movable portion having an objective lens, an objective-lens holding member, and driving coils, and a plurality of rod-like elastic support members each having an axial direction parallel to a third direction perpendicular to a first direction and a second direction, the support members elastically supporting the movable portion so that the movable portion is movable to the stationary member in the first direction and the second direction. The movable portion is supported by the support members on both sides of the movable portion in the third direction, the support members are arranged on different planes perpendicular to the first direction, and the movable portion is arranged to be movable in the third direction with the support members, so that the objective lens is rotatable around an axis of the second direction.

15 Claims, 64 Drawing Sheets

FOREIGN PATENT DOCUMENTS

| | | |
|---|---|---|
| JP | 6-162540 | 6/1994 |
| JP | 06-314433 | 11/1994 |
| JP | 06-326398 | 11/1994 |
| JP | 07-073484 | 3/1995 |
| JP | 08083433 | 3/1996 |
| JP | 09-016994 | 1/1997 |
| JP | 2579715 | 6/1998 |
| JP | 10-198992 | 7/1998 |
| JP | 10-275354 | 10/1998 |
| JP | 11-306573 | 11/1999 |
| JP | 11-316963 | 11/1999 |
| JP | 3029616 | 2/2000 |
| JP | 2000-076672 | 3/2000 |
| JP | 2000-149292 | 5/2000 |
| JP | 2000-163773 | 6/2000 |
| JP | 2000-163774 | 6/2000 |
| JP | 2000-195078 | 7/2000 |
| JP | 2001-110075 | 4/2001 |
| JP | 2001-110076 | 4/2001 |
| JP | 2001-297460 | 10/2001 |
| JP | 2002-015444 | 1/2002 |
| JP | 2002260256 A * | 9/2002 |
| KR | 2002045022 A * | 6/2002 |

OTHER PUBLICATIONS

Translation of Japanese Publication No. 5-4096 published to Shunzo Tayama, et al. on Feb. 1, 1993.*
Translation of Korean Patent No. 2002-0045022 published to Suk Jung Kim et al. on Jun. 19, 2002.*
European Search Report, Feb. 2007.

* cited by examiner

TANGENTIAL DIRECTION

PRINCIPAL POINT A OF OBJECTIVE LENS

CENTER OF ROTATION

WIRE-SPRING EFFECTIVE LENGTH

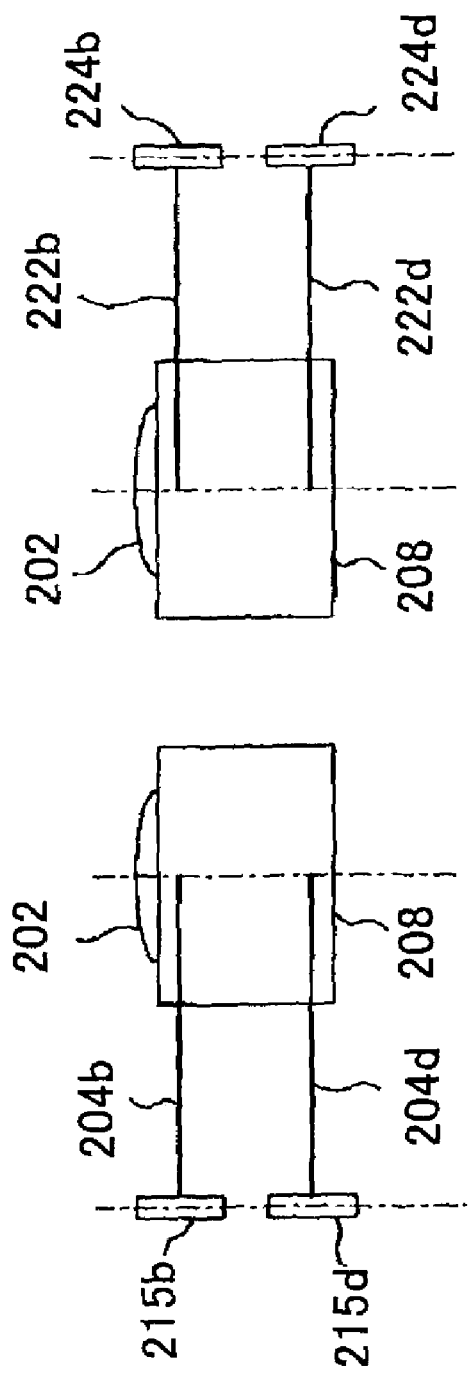
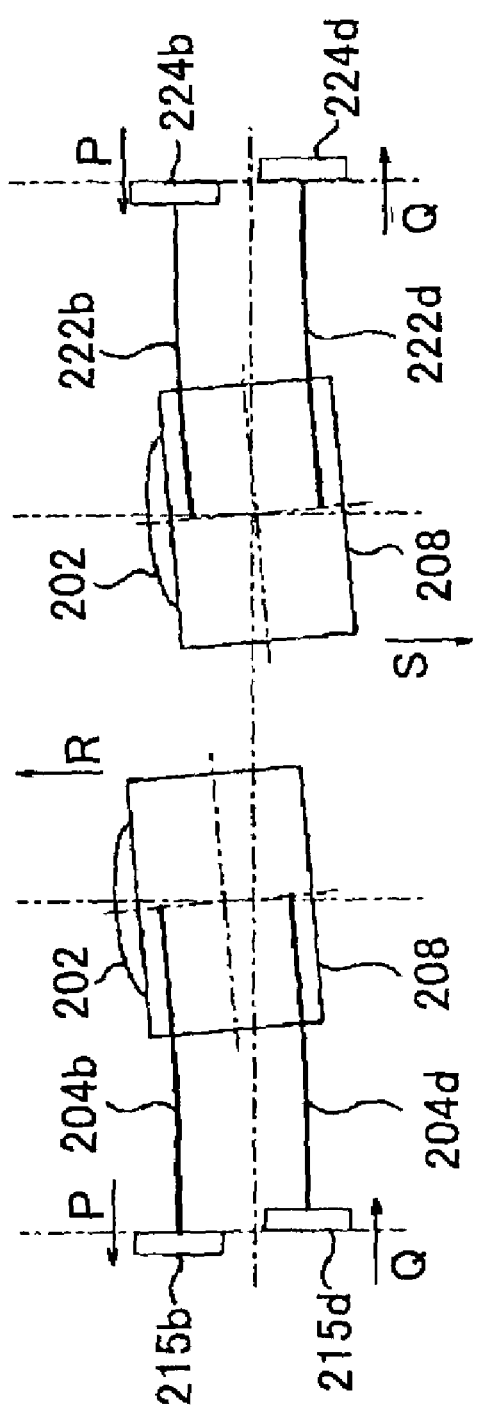
FIG.43A
FIG.43B

FIG.46A    FIG.46B
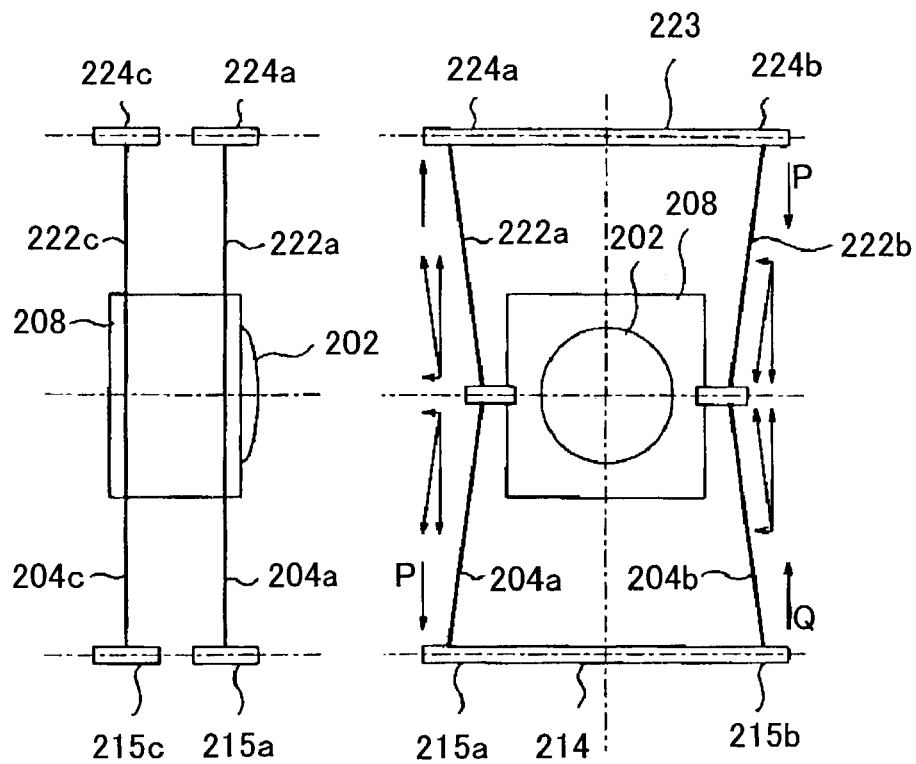
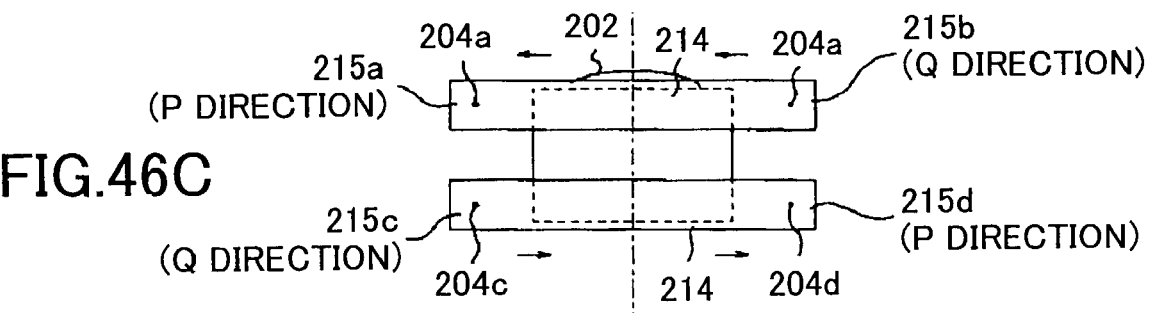
FIG.46C
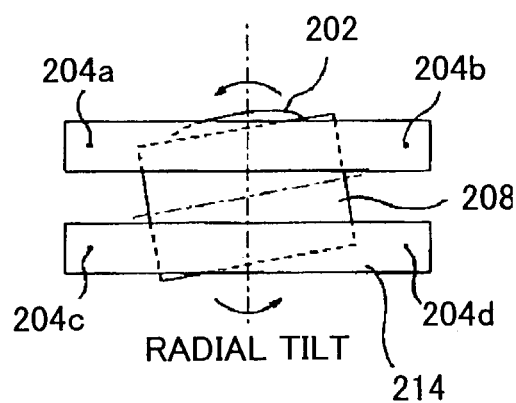
FIG.46D

FIG.74A
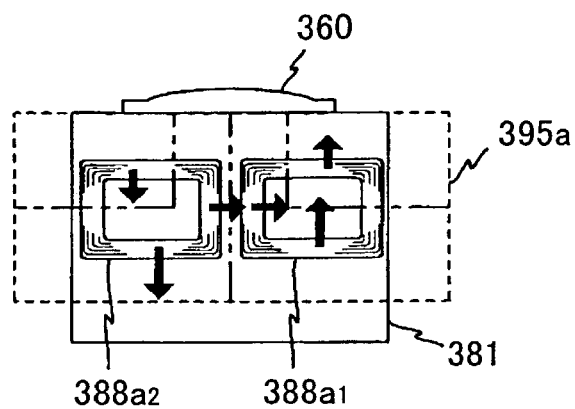
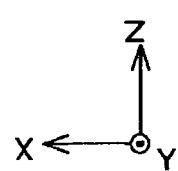
FIG.74B
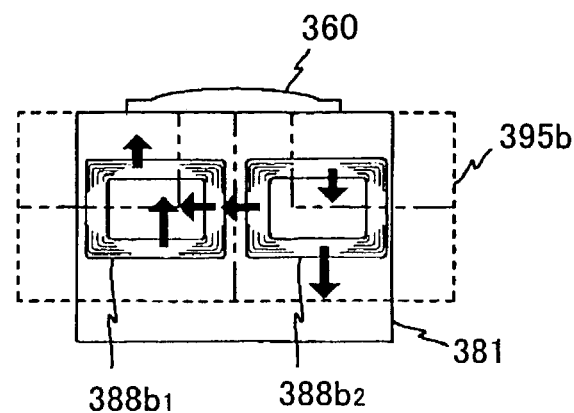
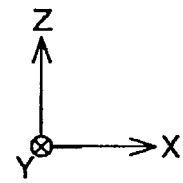

OBJECTIVE LENS DRIVE APPARATUS WITH OBJECTIVE LENS PORTION MOVABLE ALONG SUPPORT MEMBER AXIAL DIRECTION

BACKGROUND OF THE INVENTION

1. Surface of the Invention

The present invention relates to an objective lens drive apparatus provided to focus a light beam from an objective lens onto an optical disk as a light spot in order to perform recording/reproduction of the optical disk, and relates to an optical pickup device incorporating the objective lens drive apparatus, and an optical disk drive incorporating the optical pickup device.

2. Description of the Related Art

Conventionally, in the optical disk drive, the laser light beam, output from the laser light source, is focused with the objective lens on the optical disk as a light spot, and information is read from the optical disk by carrying out the opto-electric conversion of the reflected light from the optical disk.

The objective lens drive apparatus, which is provided in the optical disk drive, drives the objective lens in the focusing direction and the tracking direction using the control signal obtained from the reflected light, and causes the proper light spot to be formed on the recording surface of the optical disk by controlling the movement of the objective lens to follow the motion of the surface inclination of the optical disk or the eccentricity thereof.

In recent years, with the trend of high-density information recording, there is the demand to form the small light spot on the optical disk. To realize this, it is necessary to enlarge the NA (numerical aperture) of the objective lens or to shorten the wavelength of laser.

However, if the NA is enlarged or the wavelength of laser is shortened, the perpendicularity of the optical axis of the objective lens to the optical disk is shifted, and the coma aberration will easily be generated and the quality of the light spot will deteriorate. This causes the quality of recording/reproduction to deteriorate.

In order to attain high-density information recording, it is necessary to raise the inclination accuracy between the optical disk and the objective lens.

On the other hand, when processing mass data with the trend of high-density information recording, the improvement of the speed of recording/reproduction is desired, and it is necessary to carry out high-speed rotation of the optical disk.

When the high-speed rotation of the optical disk with which the surface inclination or the eccentricity exists is carried out, the acceleration becomes very large. In order to make the objective lens follow the optical disk with sufficient accuracy, the objective lens drive apparatus that is capable of generating a large force is needed.

There are some conceivable methods to correct the inclination between the optical disk and the objective lens. One of such methods is to make the movable portion of the objective lens drive apparatus containing the optical disk follow the inclination of the optical disk. This method will provide the high-speed capability to follow the rotational speed of the optical disk, with low cost.

For example, in the case of the method, consideration is given to incline the movable portion of the objective lens drive apparatus in the radial direction and the tangential direction. To realize this, the mechanism to drive the movable portion in the four axial directions, including the focusing direction and the tracking direction, is needed for the objective lens drive apparatus. In the objective lens drive apparatus with the multi-axial direction driving mechanism, the support rigidity will be made small so that it may be easy to carry out movement at least in a desired driving direction. This will easily affect the driving of the objective lens drive apparatus in the other directions.

For this reason, the cross talk generated between the driving axes becomes large, and it will not be negligible. The main cross talk which will not be negligible is as follows: (1) the cross talk of the radial and tangential rotation directions which is generated by the focusing and tracking movement drive; (2) the cross talk of the tracking movement direction which is generated by the radial movement drive; (3) the cross talk of the tangential rotation direction which is generated by the focusing movement drive; (4) the cross talk of the tangential movement direction which is generated by the focusing and tracking movement drive; and (5) the cross talk of the tangential movement direction which is generated by the tangential rotation drive.

Japanese Laid-Open Patent Application No. 10-275354discloses the objective lens drive apparatus which is configured to reduce the cross talk. FIG. 34 shows such a conventional objective lens drive apparatus.

As shown in FIG. 34, a pair of support members 101 and 102 which have the same structure are arranged on the plane 105 which is perpendicular to the optical axis of the objective lens 104. The ends 101a and 102a of the support members 101 and 102 are fixed to the side surfaces of the lens holder 106, respectively. The other ends 101b and 102b of the support members 101 and 102 are fixed to the stationary portion 107.

The support member 101 is composed of the first rod-like member 108 extending from the stationary portion 107 and the second rod-like member 110 extending from the lens holder 106 and being at right angles the end of the first rod-like member 108. The support member 102 is composed of the first rod-like member 109 extending from the lens holder 106 and the second rod-like member 111 extending from the lens holder 106 and being at right angles to the end of the first rod-like member 109.

The rigidity of the objective lens 104 in the tangential rotation direction is set such that the rigidity on the side of the ends 101a, 102a of the support members 101, 102 is smaller than the rigidity on the side of the other ends 101b, 102b of the support members 101, 102.

The drive magnets 112 and 113 are fixed to the lens holder 106. The drive coils 114 and 115 (the focusing coil, the tracking coil, the radial drive coil and the tangential drive coil) are provided on the stationary portion 107. By supplying electric current to the drive colis 114 and 115 respectively, the lens holder 106 including the objective lens 104 is driven in the four axial directions.

With such composition of the conventional objective lens drive apparatus, it is possible to form the movable portion into a thin structure and it is possible to provide the design in which the objective-lens principal point, the center of inertia of the movable portion and are made to be in proximity. It is possible for the conventional objective lens drive apparatus to reduce the cross talk of the tangential rotation direction which is generated when driving the lens holder 106 in the focusing direction.

However, in the conventional technique of Japanese Laid-Open Patent Application No. 10-275354, it is difficult to manage the rotation rigidity in the tangential tilt direction of the attachment section of the rod-like members 108,109 on the side of the lens holder 106 with the composition of the conventional objective lens drive apparatus of FIG. 34.

Furthermore, the lens holder is supported with the rod-like members 108 and 109. When it is configured by using the moving coil method, the wiring of the current to the lens holder 106 will run short. The conventional objective lens drive apparatus of FIG. 34 is applicable only by using the moving magnet method.

The mass of the movable portion increases when the moving magnet method is used since the magnet is provided on the side of the movable portion including the lens holder 106. The acceleration sensibility becomes small, and it is difficult to follow the optical disk which is rotated at high speed.

When the moving coil method is used, the density of the magnetic fluxs passing through the coil can be increased by enlarging the magnet in order to make sensibility increase. However, when the moving magnet method is used, it is difficult to make sensibility increase since the mass of the movable portion increases when the magnet is enlarged. It is difficult to ensure adequate level of the acceleration which can follow the surface inclination or eccentricity of the optical disk.

With the composition of the conventional objective lens drive apparatus of Japanese Laid-Open Patent Application No. 10-275354, the movable portion is configured into a thin structure, and the magnitude of the mechanical components cannot be secured enough and there is the problem that the output acceleration is low.

Structurally, the focusing operation and the tangential tilt operation tend to influence mutually, and the occurrence of the tangential tilt is caused by the focusing operation. There is also the problem that the servo control becomes unstable.

Japanese Patent No. 3029616 discloses another objective lens drive apparatus. FIG. 35 shows the composition of the main part of the conventional objective lens drive apparatus of Japanese Patent No. 3029616.

In the composition of FIG. 35, the movable portion 122 containing the objective lens 121 is supported by the ends of the four rod-like elastic support members 123–126 (two pieces on one side) which are substantially in parallel. By using the electromagnetic drive unit (not shown), the objective lens 121 can be driven in the focusing direction, the tracking direction, the radial tilt direction and the tangential tilt direction as indicated by the arrows P1 and P2 in FIG. 35.

The other ends of the rod-like elastic support members 123–126 are independently fixed to the elastic arm 129. The elastic arm 129 is provided so that it is rotatable around one of the axis 127 and the axis 128, which are parallel to the tracking direction, in the directions indicated by the arrows M1 and M2 in FIG. 35.

With the composition of FIG. 35, it is possible for the objective lens drive apparatus of Japanese Patent No. 3029616 to reduce the cross talk of the tangential tilt direction generated when the movable portion 122 is driven in the focusing direction.

However, in the conventional objective lens drive apparatus of FIG. 35, the composition of movable parts 129 and 130 on the side of the stationary portion are complicated, and the elastic properties are not stabilized. Similar to the composition of FIG. 34, in order to deal with the tilt compensation, the four rod-like elastic support members 123–126 are needed, and the wiring of current supply will run short. Hence, the composition of FIG. 35 is applicable only by using the moving magnet method. There is the problem that is the same as that of the composition of FIG. 34.

In addition, Japanese Utility Model No. 2579715 and Japanese Laid-Open Patent Application No. 6-162540 disclose the objective lens drive apparatus in which the movable portion containing the objective lens is supported by the plurality of rod-like elastic-support members. With such composition, the movability and the stability of the support are improved.

However, in the composition of Japanese Utility Model No. 2579715 or Japanese Laid-Open Patent Application No. 6-162540, when the movable portion containing the objective lens is diren in one direction, the movement of the objective lens in the other directions becomes unstable or the movement is impossible.

Moreover, Japanese Published Utility Model Application No. 5-4096 and Japanese Laid-Open Patent Application No. 11-316963 disclose the objective lens drive apparatus in which the end of the rod-like elastic support member on the side of the stationary portion is fixed to the reaf spring member.

In the composition of Japanese Published Utility Model Application No. 5-4096 or Japanese Laid-Open Patent Application No. 11-316963, the direction in which the objective lens can stably be driven is restricted to a specific direction, and the position of the light spot on the optical disk is changed when the objective lens is driven in the direction.

SUMMARY OF THE INVENTION

An object of the present invention is to provide an improved objective lens drive apparatus in which the above-described problems are eliminated.

Another object of the present invention is to provide an objective lens drive apparatus which can drive the objective lens with sufficient accuracy at high speed.

Another object of the present invention is to provide an optical pickup device that is appropriate for use with an objective lens drive apparatus so that the objective lens drive apparatus can drive the objective lens with sufficient accuracy at high speed.

Another object of the present invention is to provide an optical disk drive that is appropriate for use with an optical pickup device and stably carries out accessing of an optical disk with the optical pickup device with sufficient accuracy at high speed.

The above-mentioned objects of the present invention are achieved by an objective lens drive apparatus comprising: a stationary member; a movable portion having an objective lens, an objective-lens holding member holding the objective lens, and driving coils or magnets generating a first force in a first direction parallel to an optical axis of the objective lens and a second force in a second direction perpendicular to the optical axis of the objective lens; and a plurality of rod-like elastic support members each having an axial direction parallel to a third direction perpendicular to both the first direction and the second direction, the support members elastically supporting the movable portion so that the movable portion is movable to the stationary member in the first direction and the second direction, wherein the movable portion is supported by the support members on both sides of the movable portion in the third direction, the support members are arranged on different planes perpendicular to the first direction, and the movable portion is arranged to be movable in the third direction with the support members, so that the objective lens is rotatable around an axis of the second direction.

The above-mentioned objects of the present invention are achieved by an objective lens drive apparatus comprising: a stationary member; a movable portion having an objective lens, an objective-lens holding member holding the objective lens, and driving coils or magnets; and a plurality of rod-like elastic support members provided between the stationary member and the movable portion, each support member having an axial direction that is parallel to a third direction perpendicular to both a first direction and a second direction, the support members elastically supporting the movable portion to be movable to the stationary member, wherein the movable portion is supported by the support members on both sides of the movable portion, and the support members are arranged on a single plane perpendicular to the first direction and in the third direction symmetrically with respect to an optical axis of the objective lens.

The above-mentioned objects of the present invention are achieved by an objective lens drive apparatus comprising: a stationary member; a movable portion having an objective lens, an objective-lens holding member holding the objective lens, and driving coils or magnets; and a plurality of rod-like elastic support members provided between the stationary member and the movable portion, each support member having an axial direction that is parallel to a third direction perpendicular to both a first direction and a second direction, the support members being arranged in the first direction apart from each other and elastically supporting the movable portion to be movable to the stationary member at least in a tilt direction of the third direction, wherein the movable portion is supported by the support members on both sides of the movable portion, and the support members are arranged on a single plane perpendicular to the first direction and in the third direction symmetrically with respect to an optical axis of the objective lens, the end on the side of the stationary member which supported the movable portion by the support members from both sides in the third direction, and is estranged in the first direction in the support member, it is fixed to the part from which the radius of gyration on the elastic board which the width of face of the focusing direction is formed narrowly partially, respectively, and rotates the shaft of the tracking direction as a center differs, the objective lens drive apparatus is configured so that the elastic board is rotatable corresponding to tangential tilt operation of the movable portion.

The above-mentioned objects of the present invention are achieved by an optical pickup device comprising: an objective lens drive apparatus; a laser light source outputting a laser light beam to an optical disk; a light-receiving optical unit receiving a reflected light beam from the optical disk; and an objective-lens control unit outputting a control signal to the objective lens drive apparatus based on the reflected light beam received by the light-receiving optical unit, the objective lens drive apparatus comprising: a stationary member; a movable portion having an objective lens, an objective-lens holding member holding the objective lens, and driving coils or magnets generating a first force in a first direction parallel to an optical axis of the objective lens and a second force in a second direction perpendicular to the optical axis of the objective lens; and a plurality of rod-like elastic support members each having an axial direction parallel to a third direction perpendicular to both the first direction and the second direction, the support members elastically supporting the movable portion so that the movable portion is movable to the stationary member in the first direction and the second direction, wherein the movable portion is supported by the support members on both sides of the movable portion in the third direction, the support members are arranged on different planes perpendicular to the first direction, and the movable portion is arranged to be movable in the third direction with the support members, so that the objective lens is rotatable around an axis of the second direction.

The above-mentioned objects of the present invention are achieved by an optical disk drive in which an optical pickup device, a rotation drive unit controlling rotation of an optical disk, and a pickup drive unit moving the optical pickup device in a radial direction of the optical disk, the optical pickup device comprising: an objective lens drive apparatus; a laser light source outputting a laser light beam to the optical disk; a light-receiving optical unit receiving a reflected light beam from the optical disk; and an objective-lens control unit outputting a control signal to the objective lens drive apparatus based on the reflected light beam received by the light-receiving optical unit, the objective lens drive apparatus comprising: a stationary member; a movable portion having an objective lens, an objective-lens holding member holding the objective lens, and driving coils or magnets generating a first force in a first direction parallel to an optical axis of the objective lens and a second force in a second direction perpendicular to the optical axis of the objective lens; and a plurality of rod-like elastic support members each having an axial direction parallel to a third direction perpendicular to both the first direction and the second direction, the support members elastically supporting the movable portion so that the movable portion is movable to the stationary member in the first direction and the second direction, wherein the movable portion is supported by the support members on both sides of the movable portion in the third direction, the support members are arranged on different planes perpendicular to the first direction, and the movable portion is arranged to be movable in the third direction with the support members, so that the objective lens is rotatable around an axis of the second direction.

According to the objective lens drive apparatus of the present invention, it is possible to correct the inclination error of the optical disk and the objective lens. By making it possible to generate the driving force which can follow the optical disk under high-speed rotation to carry out the independent drive at each shaft orientations, the movability of the tangential tilt direction can be made good, and the sensibility can be made small.

The optical disk drive of the present invention can perform stable control and it sets to the objective lens drive apparatus dealing with inclination compensation. The cross talk between the drive shafts which are easy to pose the problem can be reduced. Specifically, it is possible to reduce the cross talk including the cross talk of the tangential rotation direction generated by focusing translation drive, the cross talk of the tangential movement direction generated by focusing or tracking translation drive, and the cross talk of the tangential movement direction generated by the tangential rotation drive.

BRIEF DESCRIPTION OF THE DRAWINGS

Other objects, features and advantages of the present invention will be apparent from the following detailed description when read in conjunction with the accompanying drawings.

FIG. 43A and FIG. 43B are diagrams for explaining the cancellation of the cross-action in the direction of the jitter.

FIG. 46A, FIG. 46B, FIG. 46C and FIG. 46D are diagrams for explaining the tilt compensation operation in the objective lens drive apparatus of FIG. 45.

FIG. 74A and FIG. 74B are diagrams for explaining the operations of the radial tilt coils of FIG. 73A and FIG. 73B.

DETAILED DESCRIPTION OF PREFERRED EMBODIMENTS

A description will now be provided of the preferred embodiments of the present invention with reference to the accompanying drawings.

Figure 1:
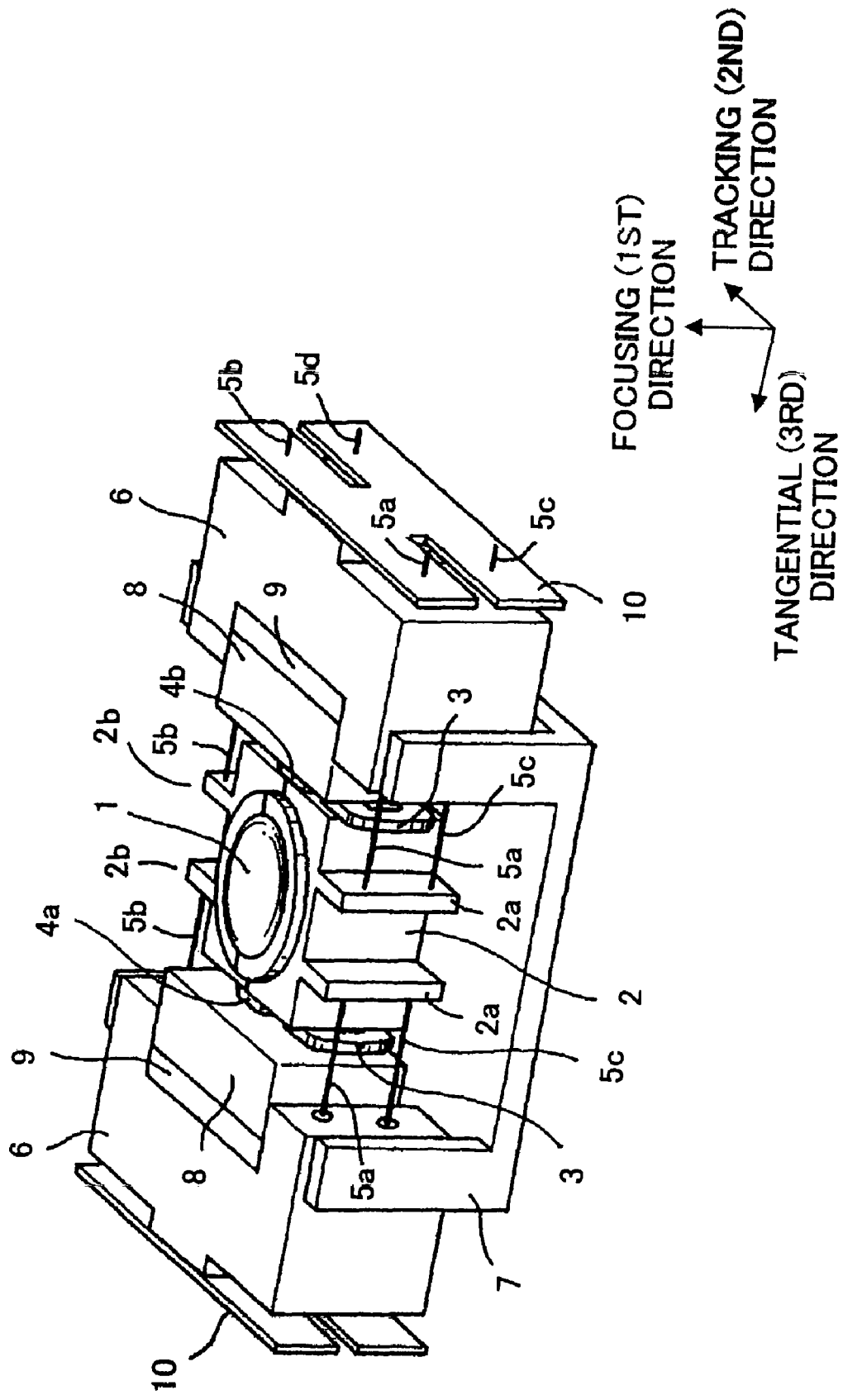
FIG. 1 is a perspective FIG. of the objective lens drive apparatus of one preferred embodiment of the present invention.
Figure 2:
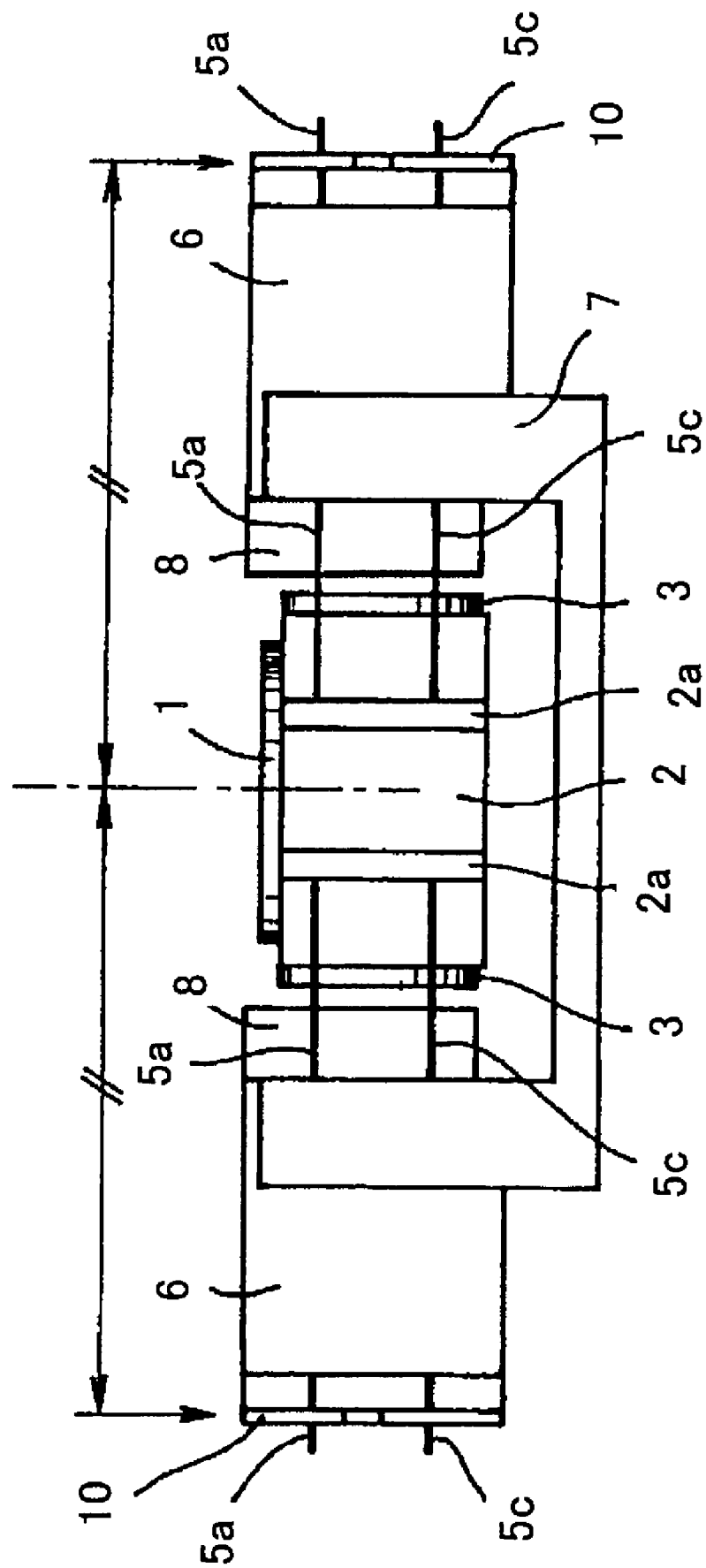
FIG. 2 is a front FIG. of the objective lens drive apparatus of FIG. 1.

FIG. 1 shows the objective lens drive apparatus of one preferred embodiment of the present invention. FIG. 2 is a front FIG. of the objective lens drive apparatus of FIG. 1.

In FIG. 1 and FIG. 2, reference numeral 1 indicates the objective lens, and reference numeral 2 indicates the objective-lens holding member which forms a movable portion in which the objective lens 1 is mounted at the central upper part of the movable portion. The focusing coils 3 (only two pieces on one side are shown) are held on the objective-lens holding member 2.

In the objective lens drive apparatus of FIG. 1, the tracking coils 4a and 4b are held on the objective-lens holding member 2. The plural wire springs 5a–5d form the rod-like elastic supporting member which holds the objective-lens holding member. The wire springs 5a–5d serve as the movable-portion supporting member which supports the movable portion. In the present embodiment, the eight wire springs 5a–5d are provided, and the four of them are provided on one side of the tangential direction, and the remaining four are provided on the other side (but they are not shown).

The objective lens drive apparatus of FIG. 1 includes the stationary members 6, the base member 7, the magnets 8, the yoke portions 9 and the elastic boards 10. The magnets 8 are arranged on the inside walls of the stationary members 6 so that they are opposed to the focusing coils 3 and the tracking coils 4a and 4b. Each of the elastic boards 10 is formed by a flexible circuit board.

In FIG. 1 and FIG. 2, the objective-lens holding member 2 which holds the objective lens 1 is elastically supported by the eight wire wprings 5a–5d at the support projections 2a and 2b which project from the holding member 2 in the opposing directions. The axial directions of the wire springs 5a–5d are parallel to the tangential direction which is perpendicular to both the focusing direction and the tracking direction. The four of the wire springs 5a–5d are arranged on one side of the tangential direction of the optical disk which is a recording/reproduction medium, and the remaining four are arranged on the opposite side of the tangential direction. The eight wire springs in total are arranged in parallel and at the symmetrical positions on the two surfaces that are perpendicular to the focusing direction.

The four focusing coils 3 and the two tracking coils 4a and 4b are attached to the corners of the objective-lens holding member 2. The objective-lens holding member 2 with the focusing coils 3 and the tracking coils 4a and 4b attached serves as the movable portion to the stationary members 6.

The wire springs 5a–5d are made of a conductive substance, and the ends of the wire springs 5a–5d are secured to the elastic board 10 by soldering. The wire springs 5a–5d serve as the current supply members which respectively supply the current to the drive coils 3, 4a, 4b from the ends of the wire springs 5a–5d on the side of the stationary members 6.

The elastic boards 10 are formed by flexible circuit boards. The flexible circuit boards 10 are provided with the wiring that is used to supply the current to the drive coils (the focusing coil 3 and the tracking coils 4a and 4b) through the wire springs 5a–5d.

As shown in FIG. 1, the focusing direction is parallel to the direction of the optical axis of the objective lens 1 and corresponds to the first direction in the claims. The tracking direction is perpendicular to the direction of the optical axis of the objective lens 1 and corresponds to the second direction in the claims. The tangential direction is perpendicular to both the focusing direction and the tracking direction and parallel to the axial directions of the wire springs 5a–5d, and corresponds to the third direction in the claims.

The portions of the elastic boards 10 to which the wire spring ends are secured are arranged so that the wire springs 5a–5d are displaceable in the axial directions of the wire springs (which are parallel to the tangential direction). The elastic boards 10 are attached to the stationary members 6 which are fixed to the base member 7.

The base member 7 is the magnetic substance and forms the yoke section 9 by bending the part. The magnetic circuit is formed so that the magnetic flux may pierce in each drive coil with the magnet 8 fixed to this yoke section 9.

It is possible to drive the movable portion to the focusing direction, the radial tilt direction, and the tangential direction by attaching four focusing coils 3 in the four corners of the objective-lens holding member 2, and adjusting the current passed in each focusing coil 3.

Moreover, by passing the current in the tracking coils 4a and 4b, it is possible to drive the movable portion containing the objective-lens holding member 2 to the tracking direction, the face deflection in the optical disk which rotates at high speed, eccentricity, the curvature, etc. can be followed, and it is possible to form the good light spot in the optical disk side.

When it is going to drive the objective lens 1 only to the focusing direction, by making four focusing coils 3 generate equivalent driving force, the driving force to the focusing direction occurs at the center in the objective-lens holding member 2.

On the other hand, since the part which differs from the driving force generating part with the wire springs 5a–5d to the stationary members 6 is supported, the moment will generate the objective-lens holding member 2 by the difference in the position of the driving point and the supporting point.

However, since the objective-lens holding member 2 in the present embodiment is the symmetrical configuration as a center, and are the both sides of the tangential direction and the optical axis of the objective lens 1 is supported in the equivalent distance, the moment which occurred on both sides of the tangential direction will be canceled mutually.

Therefore, even if it makes small rotation rigidity (or rigidity in the tangential movement direction) in the tangential direction in order to carry out tilt compensation since the moment will not occur in the objective-lens holding member 2 as a whole, it does not rotate to the tangential direction.

In the present embodiment, the cross talk of the tangential direction generated by focusing translation drive can be reduced.

Moreover, with the composition which makes rotation rigidity in the tangential direction small, since it is what makes small rigidity in the shaft orientations of the wire spring, it becomes easy to generate the optical-axis gap in the tangential movement direction.

Moreover, since the wire spring is bent by the usual wire support method when the objective-lens holding member is moved to the focusing direction or the tracking direction, it will become short to shaft orientations and the objective lens will move to the tangential direction.

However, in the present embodiment, since the objective-lens holding member 2 is supported on tangential-direction both sides and rigidity (spring modulus of each part) is also set up equally, it is possible for the force of shaft orientations (tangential direction) when the objective-lens holding member 2 moves to the focusing direction or the tracking direction to balance, and to suppress movement to the tangential direction of the objective lens 1.

In the present embodiment, the cross talk of the tangential movement direction generated by focusing translation drive can be reduced.

Figure 3:
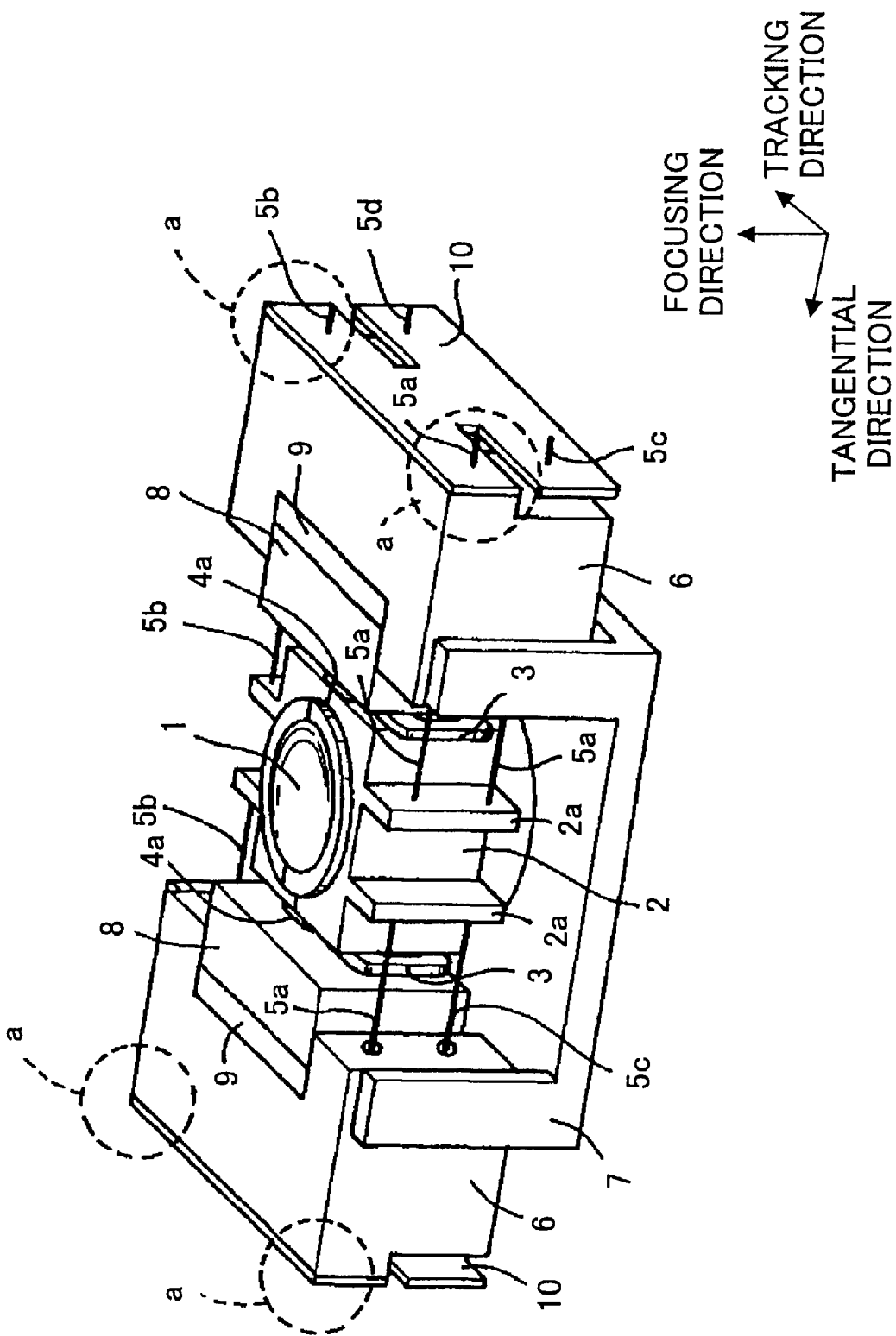
FIG. 3 is a perspective FIG. of the objective lens drive apparatus of another preferred embodiment of the present invention.
Figure 4:
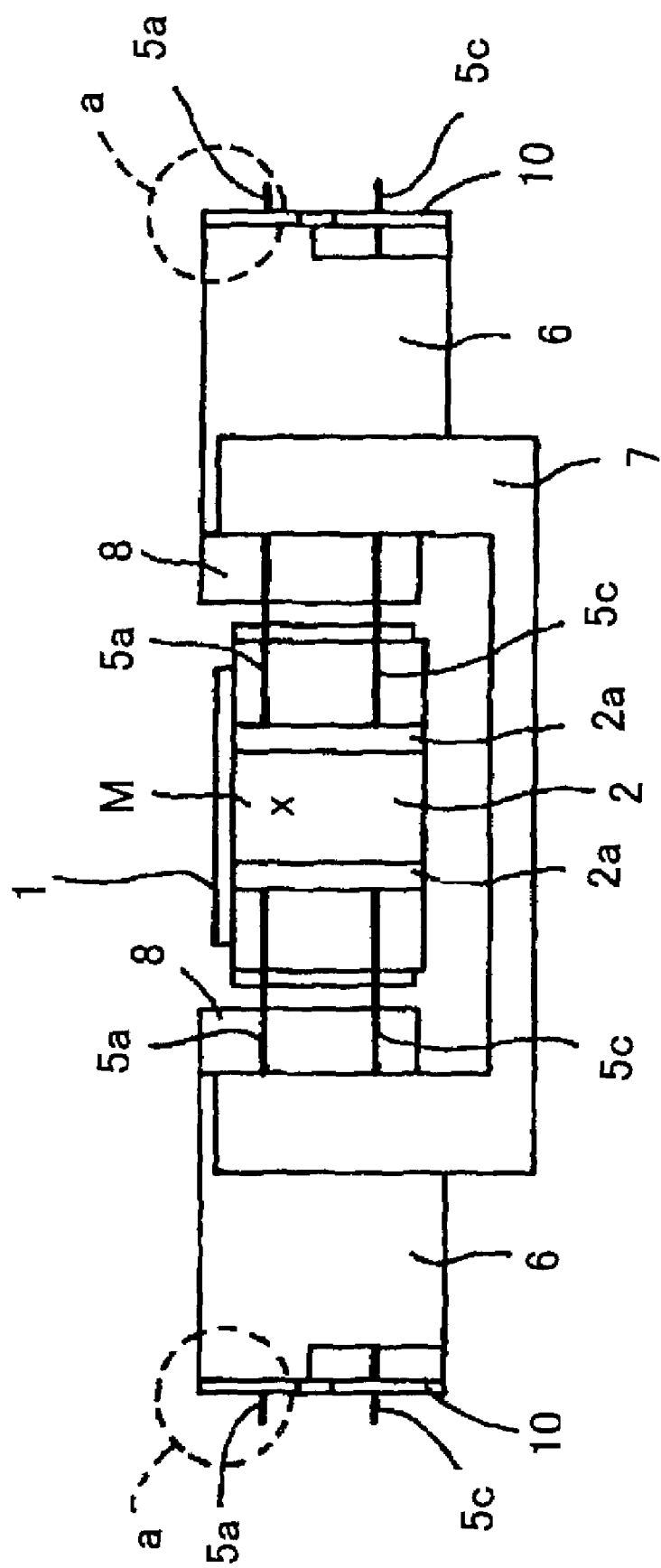
FIG. 4 is a front FIG. of the objective lens drive apparatus of FIG. 3.

FIG. 3 is a perspective view of the objective lens drive apparatus of another preferred embodiment of the present invention. FIG. 4 is a front view of the objective lens drive apparatus of FIG. 3.

In FIG. 3 and FIG. 4, the elements which are essentially the same as corresponding elements in FIG. 1 are designated by the same reference numerals, and a description thereof will be omitted.

In the objective lens drive apparatus to which tilt compensation is performed, the cross talk of the tangential movement direction occurs also by carrying out the tangential-tilt drive.

This will be generated when the center of rotation in the tangential direction is distant from the principal point of the objective lens.

In the preferred embodiment of FIG. 3, in order to carry out the center of rotation in the tangential direction near the principal point of the objective lens 1, the previous embodiment is modified and and the following composition is adopted.

In FIG. 3 and FIG. 4, the wire springs 5a–5d are opposed to the focusing direction (the direction of the optical axis of the objective lens 1) on two perpendicular virtual planes.

The elastic board 1 to which the edge of the wire springs 5a and 5b arranged considering the tangential direction as a lengthening joint, constitutes one of the two virtual surfaces in which the wire springs 5a–5d are arranged so that the principal point M of the objective lens 1 may be included, and are arranged in the virtual plane is fixed.

It is set up so that rigidity of the tangential direction may be enlarged (or it sets up so that it may become the rigid body).

It is made to specifically regulate the motion of the elastic board 10 by the stationary members 6 like the section shown in FIG. 3.

Moreover, it sets up so that rigidity of the tangential direction of the elastic board to which the wire springs 5c and 5d arranged to the virtual side of another side are fixed may be made small.

When the driving force of the tangential direction occurs in the objective-lens holding member 2, it is possible to carry out the tilt at the center of the principal point M of the objective lens 1.

In the present embodiment, the cross talk of the tangential movement direction generated by the tangential rotation drive can be reduced.

The direction made to extend to near the optical axis of the objective lens 1 as much as possible tends to carry out the tilt drive of the fixed end on the side of the wire springs 5a–5d at the projections 2a and 2b of the objective-lens holding member 2.

It is also possible to suppress the occurrence of the cross talk of the tangential tilt generated by the focusing movement and the tangential movement direction by supporting the both sides of the tangential direction symmetrically to the objective-lens holding member 2.

In the above-mentioned embodiments, it is possible to support the rotation of the objective-lens holding member 2 by fixing the fixed-end section on the side of the stationary member 6 in the wire springs 5a–5d to the elastic boards 10 which can be displaced to the tangential direction.

In order to give elasticity to the tangential movement direction, it is possible to form the wire spring as follows.

Figure 5:
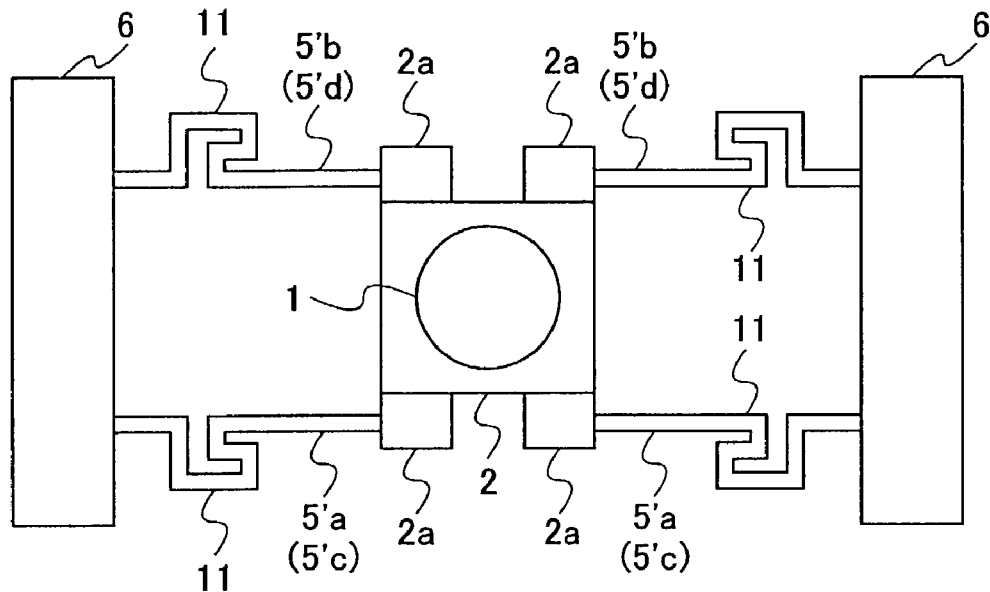
FIG. 5 is a diagram showing the objective lens drive apparatus of another preferred embodiment of the present invention.

FIG. 5 shows the main part of the objective lens drive apparatus of another preferred embodiment of the present invention.

In the present embodiment, the end on the side of the stationary members 6 in the wire springs 5a–5d in the preferred embodiment 1 is fixed to the stationary members 6 which does not move to the tangnetial axis direction.

As the wire springs 5'a–5'd, the flat spring formed of not the rounded wire but etching processing or fine-punching processing of the lamina sheet metal is used, and it is the bending bent portion 1 about the middle of wire springs 5'a–5'd.

The objective-lens holding member 2 is supported in elasticity to the tangnetial axis direction by forming 1 and forming the part which is easy to bend in the tangential direction.

The other composition of the present embodiment is the same as the composition of the previous embodiment.

Since it is unnecessary to attach to the elastic boards 10 by giving the elasticity of the tangential direction to the wire springs 5'a–5'd which include the flat spring, the attaching operation can be made easy.

Figure 6:
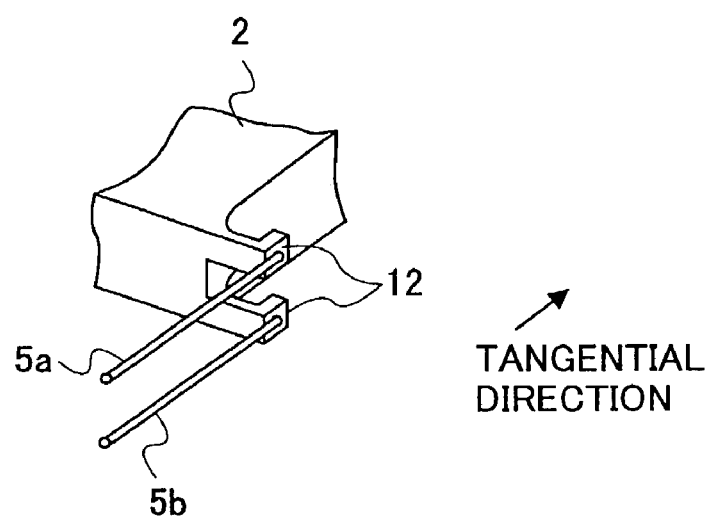
FIG. 6 is a diagram showing the main portion of the objective lens drive apparatus of another preferred embodiment of the present invention.

FIG. 6 shows the main part of the objective lens drive apparatus of another preferred embodiment of the present invention.

The end on the side of the stationary members 6 in the wire springs 5a–5d is fixed to the stationary members 6 which does not move to the tangential direction. Moreover, the end on the side of the objective-lens holding member 2 in the wire springs 5a–5d.

It attaches in the lobe 12 which is easy to bend in the tangential direction (the direction of the arrow head), and is formed in the objective-lens holding member 2 at it, or attaches in the flexible member (not shown) which is fixed to the objective-lens holding member 2, and can bend in the tangential direction.

It becomes possible like the preferred embodiment 1 and the preferred embodiment 2 to support the objective-lens holding member 2 in elasticity to the tangnetial axis direction.

In addition, the composition of others in the preferred embodiment 4 is the same as the composition of the previous embodiment 1.

Figure 7:
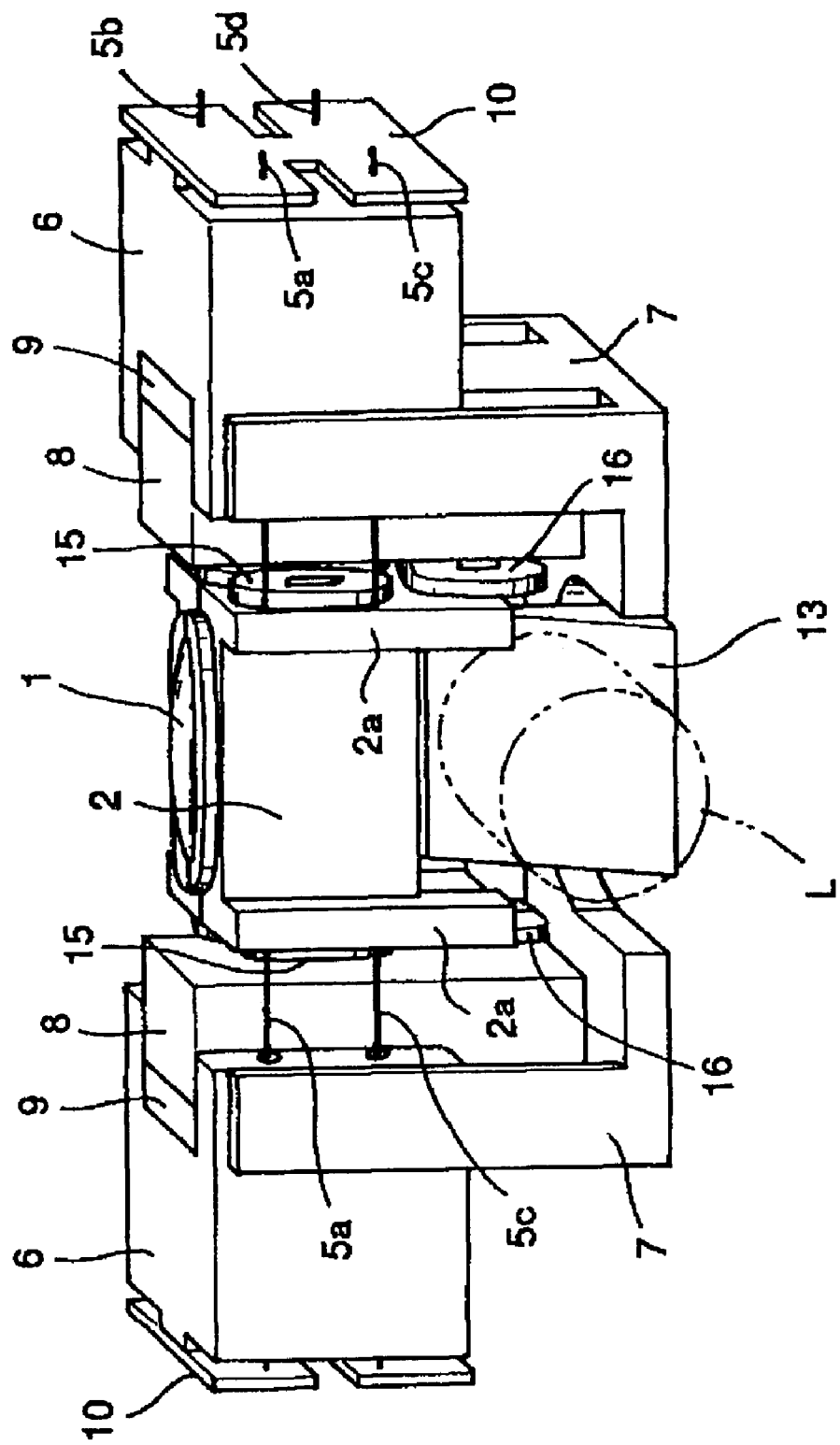
FIG. 7 is a perspective FIG. of the objective lens drive apparatus of another preferred embodiment of the present invention.
Figure 8:
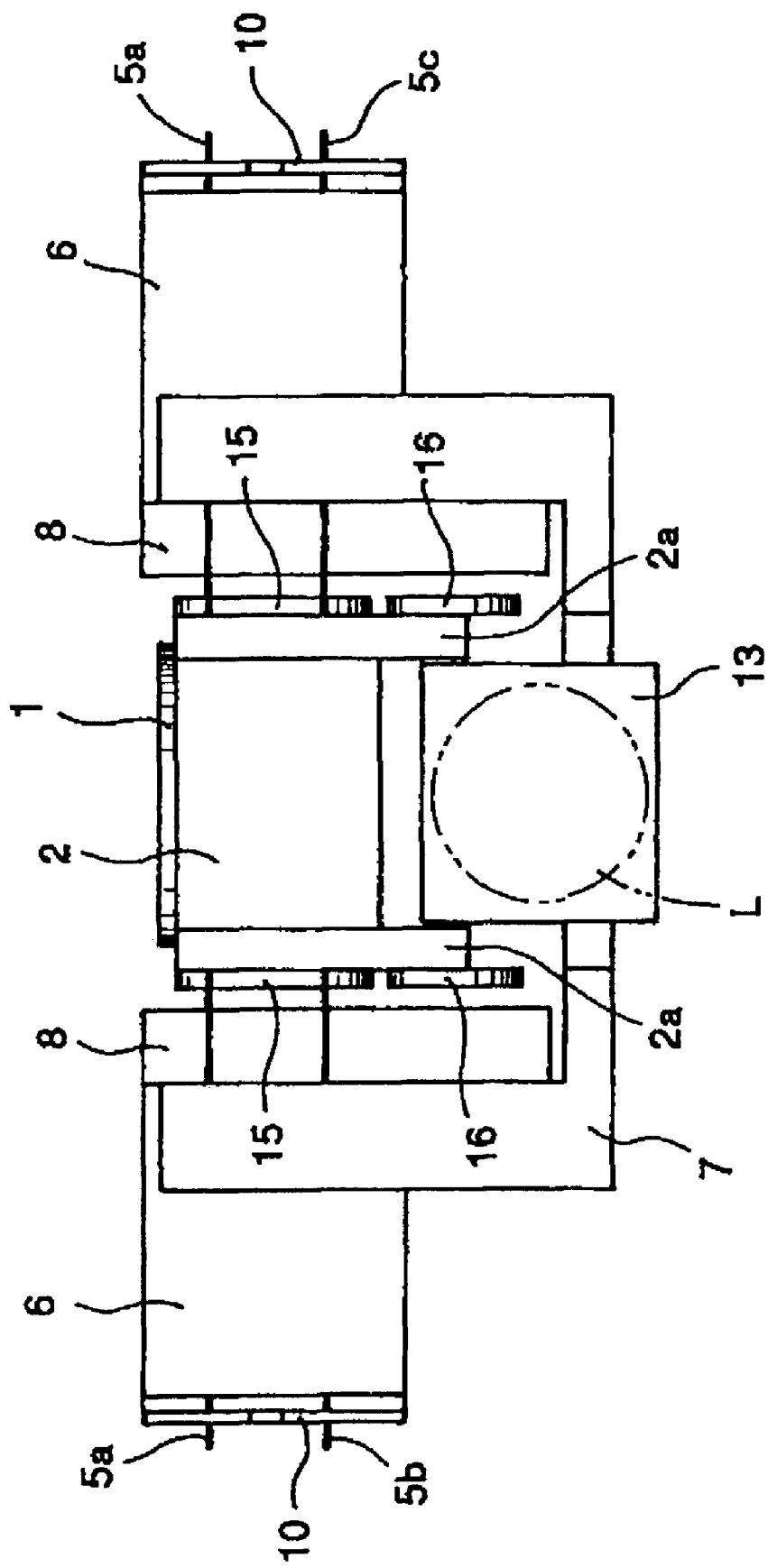
FIG. 8 is a front FIG. of the objective lens drive apparatus of FIG. 7.

FIG. 7 shows the objective lens drive apparatus of another preferred embodiment of the present invention. FIG. 8 is a front FIG. of the objective lens drive apparatus of FIG. 7.

In the present embodiment, a thin structure of the objective lens drive apparatus is attained by arranging the objective lens drive apparatus and the optical system in the same surface in the height direction.

In the present embodiment, the support composition of the objective-lens holding member 2 can adopt all of the composition of the preferred embodiments.

In the objective lens drive apparatus in which inclination compensation is possible, the objective-lens holding member 2 will be thinly formed in the focusing direction in order to locate the drive center and the center of inertia (center of gravity) near the principal point of the objective lens 1, it is difficult to secure the driving force.

Although the driving force of the objective lens drive apparatus is generated by constituting so that the drive coil passes through the magnetic flux, when driving the two shafts of the focusing direction and the tracking direction at least, the direction of the magnetic flux arranges the magnet 8 in many cases so that the direction perpendicular to the tangential direction, may be generated.

For this reason, it is more efficient to arrange the front face (large surface) of the magnet 8 to the virtual flat surface and parallel which pass along both the shafts of the focusing direction and the tracking direction.

Moreover, although the layout which bends the laser light beam L which carries out incidence to the objective lens 1 using the starting mirror 13 which deflects the laser light beam L upwards in the lower part (the optical disk installation side and opposite side) of the objective lens 1 the 90 degrees is common in order to make equipment form thinly.

With the composition with which the thin structure is important and the magnetic circuit is arranged at the tangential-direction both sides in the objective-lens holding member 2, in order that the magnetic-circuit part may interrupt the laser light beam L, it is not suitable.

Then, it is made composition which does not arrange the components to the one side of the objective lens 1, and from the one side, incidence of the laser light beam L can be carried out, and the thin structure can be attained by arranging the objective lens drive apparatus and the optical system to the same surface.

However, in order for the high order resonance by the movable portion, such as the objective lens 1 and the objective-lens holding member 2, carrying out the elastic deformation in the drive high frequency range by the objective lens drive apparatus of composition of supporting the objective lens 1 by the one side in this way to get worse and to degrade the servo property remarkably, it becomes difficult to make it follow with high precision at high speed.

That is, the direction which arranges the objective lens 1 at the center of the objective-lens holding member 2, and arranges the magnetic circuit on both sides tends to secure the high order resonance property.

However, if this configuration is made thin, the superficial content of the magnetic circuit becomes small, and since the space of the drive coil arranged decreases, the problem will arise that it is hard to acquire large driving force.

Only the focusing coil 3 does not need to make the center of gravity of the objective-lens holding member 2 in agreement with the focusing direction in the drive coil.

Therefore, the magnetic circuit is formed in the focusing direction for a long time, the drive coil 15 as the tracking drive coil, the radial drive coil, and a tangential drive coil is arranged to the optical disk installation side, and it is the focusing coil in the optical disk installation side and the opposite side.

By arranging 16, it is the focusing coil from the objective-lens holding member 2.

Although 16 projects in the opposite side the optical disk installation side of the focusing direction, from the radial direction in the objective-lens holding member 2, space will be vacant.

The optics portion of the objective lens drive apparatus can be arranged in the same surface in the focusing direction by turning up the 90 degrees to the optical disk installation side by the mirror 13 by carrying out incidence of the laser light beam L from the radial direction in this part, and rising in the part pinched by the lower part of the focusing coil 16 or the magnetic circuit. It is possible for the present embodiment to form the whole equipment thinly.

Figure 9:
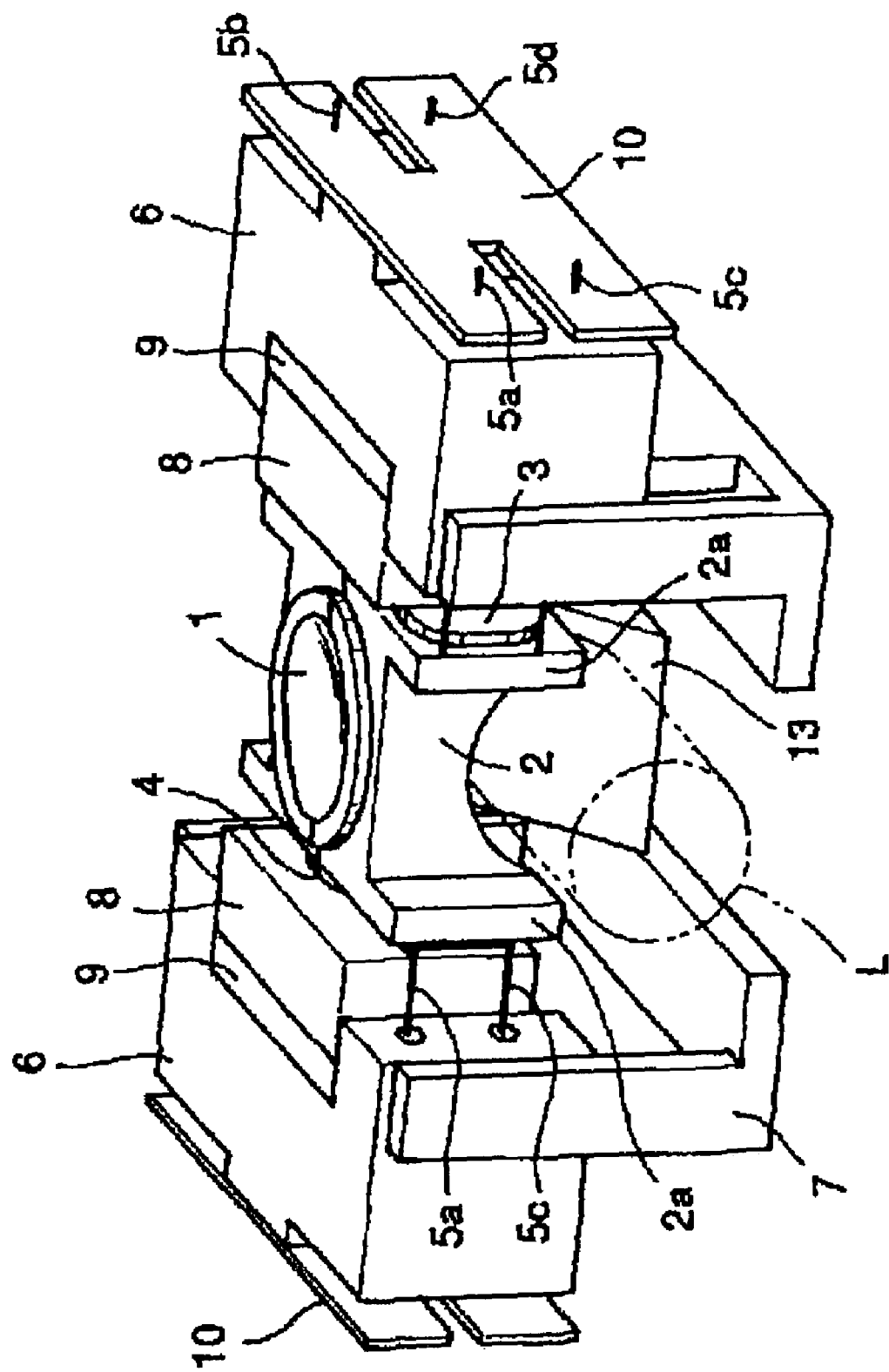
FIG. 9 is a perspective FIG. of the objective lens drive apparatus of another preferred embodiment of the present invention.
Figure 10:
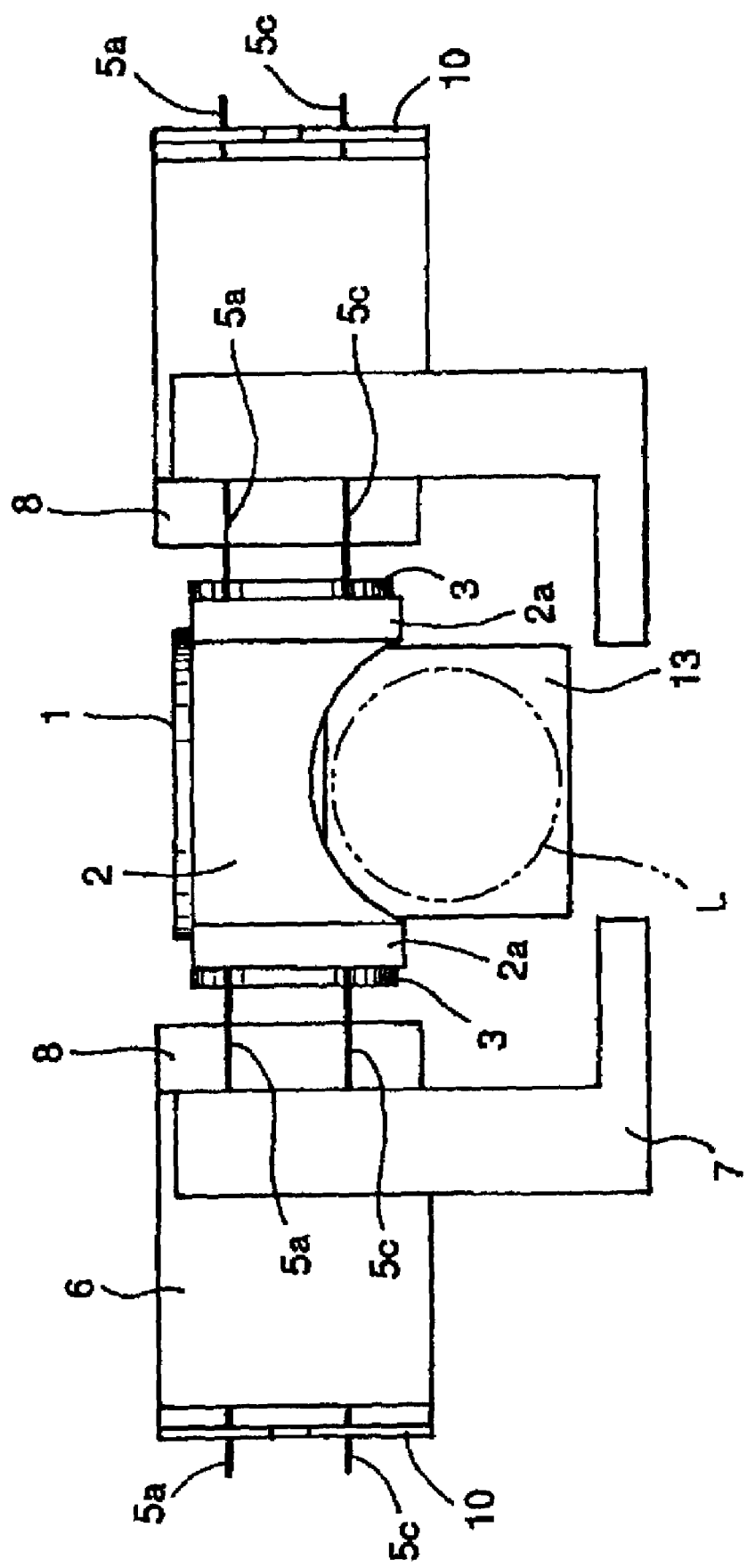
FIG. 10 is a front FIG. of the objective lens drive apparatus of FIG. 9.

FIG. 9 shows the objective lens drive apparatus of another preferred embodiment of the present invention. FIG. 10 is a front view of the objective lens drive apparatus of FIG. 9.

In the present embodiment, the modification of the previous preferred embodiment is the objective-lens holding member.

By taking a large width of the spacing of the support projections 2a and 2b near the center of the objective-lens holding member 2 in the tangential direction for the wire springs 5a–5d, it becomes possible to make the laser light beam L from the tracking direction to be incident to the spacing. By piling up a part of the optical system and the objective lens drive apparatus in the height direction, it is possible to make the height of the whole equipment small.

In the present embodiment, the configuration of the moving coil method is adopted. However, the present invention is also applicable even if it is the moving magnet method which installs the magnet in the objective-lens holding member as an electromagnetic drive unit.

Figure 11:
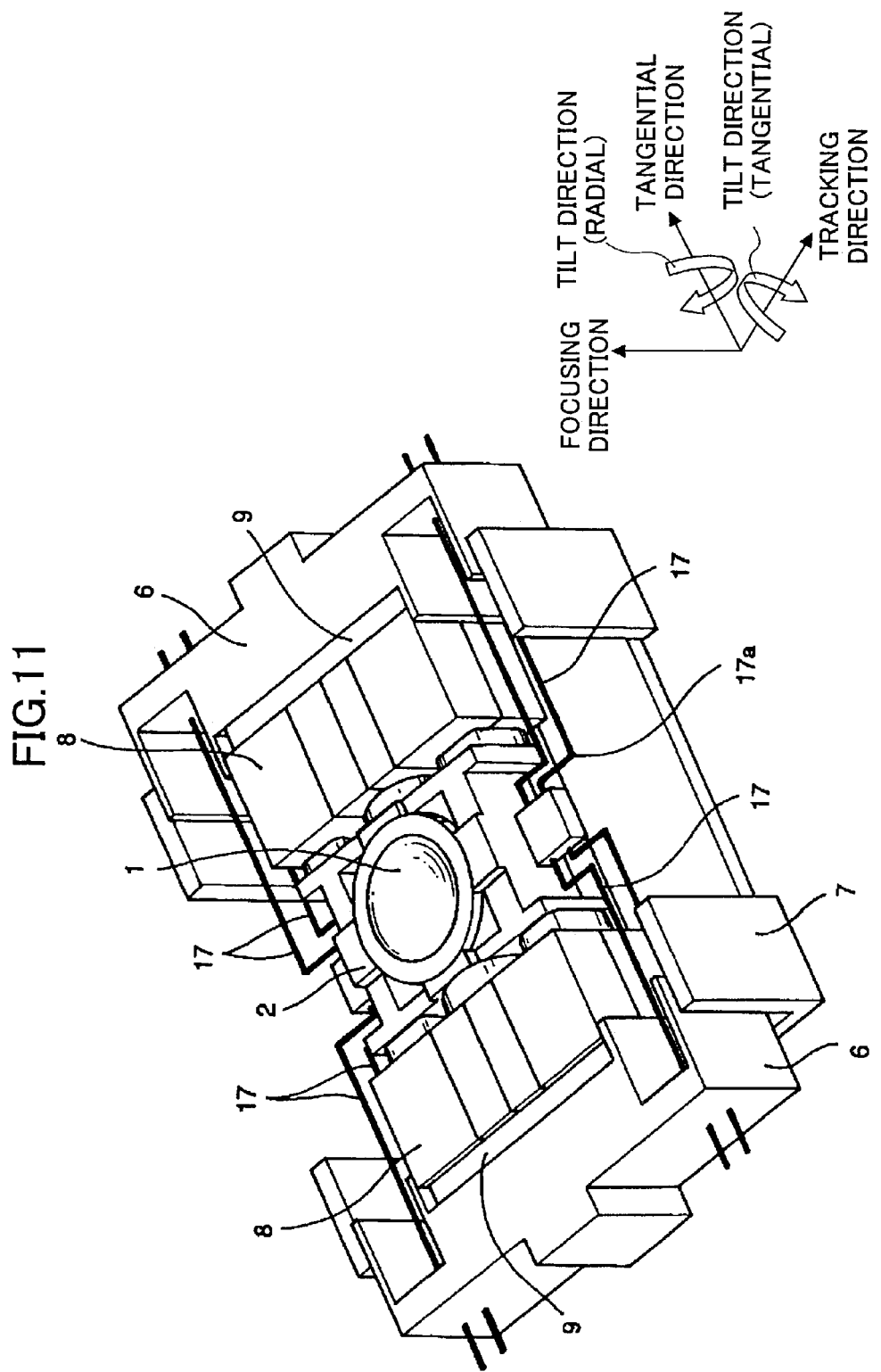
FIG. 11 is a perspective FIG. of the objective lens drive apparatus of another preferred embodiment of the present invention.
Figure 12:
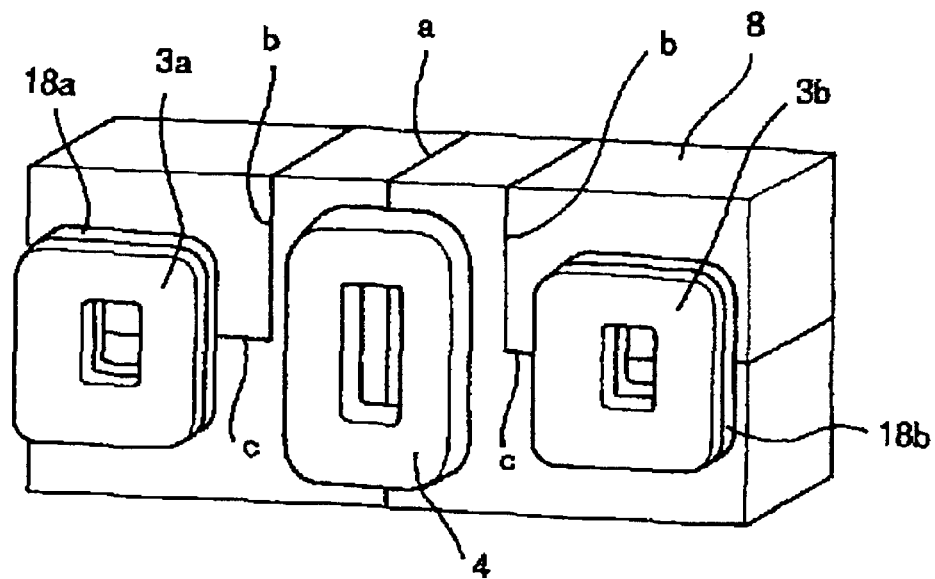
FIG. 12 is a diagram showing the electromagnetic drive unit in the objective lens drive apparatus of FIG. 11.
Figure 13:
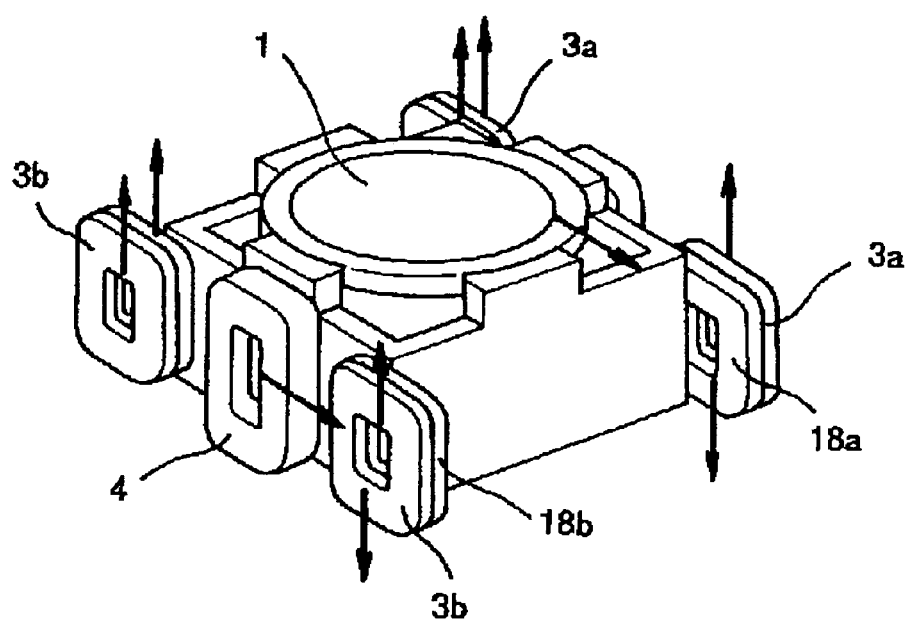
FIG. 13 is a diagram showing the objective lens holding member in the objective lens drive apparatus of FIG. 11.

FIG. 11 shows the objective lens drive apparatus of another preferred embodiment of the present invention. FIG. 12 shows the main part of the electromagnetic drive unit in the preferred embodiment of FIG. 11. FIG. 13 shows the objective-lens holding-member in the preferred embodiment of FIG. 11.

In the present embodiment, the objective-lens holding member 2 holding the objective lens 1 is supported in elasticity by the rod-like flat spring 17 which is the rod-like elastic-support object which makes the tangential direction the lengthening joint.

The bent portion 17a is formed in part, and the rod-like flat spring 17 is allotted on the one flat surface perpendicular to the focusing direction, and it totals it four on both sides of the tangential direction and the radial direction focusing on the optical axis of the objective lens 1. Eight are arranged in parallel.

In FIG. 12 and FIG. 13, the aspect of the tangential direction of the objective-lens holding member 2 is equipped with four types of drive coils including the first focusing coil 3a, the second focusing coil 3b, the tracking coil 4 between the focusing coils 3a, 3b, and the radial tilt coils 18a and 18b connected to the focusing coils 3a and 3b, and the movable portion is thus constituted.

The base member 7 is made of the magnetic substance and forms the yoke section 9 by bending the part.

The driving magnet 8 fixed to the yoke section 9 is arranged at the both sides of the tangential direction in the objective-lens holding member 2, and it is arranged so that the magnetic flux may pass through both the focusings coils 3a and 3b, the tracking coil 4, and the radial tilt coils 18a and 18b, and the magnetic circuit is thus formed.

The divisional magnetization of the magnet 8 is carried out by the magnetization boundary line a of the focusing direction in the center of the tracking direction. The division magnetization of the both sides of the magnetization boundary line a is further carried out by the magnetization boundary line b of the focusing direction perpendicular to the end surface on the side of the optical disk installation in the magnet 8, and the magnetization boundary line c perpendicular to the aspect of the tracking direction in the magnet 8 in the L-shaped formation.

The first focusing coil 3a and second focusing coil 3b are wound around the axis of the tangential direction, and they are arranged at the both sides in the tracking direction of the magnetization boundary line a of the magnet 8.

The part to which the current flows to the two tracking directions of the focusing coils 3a and 3b is arranged at the both sides in the focusing direction of the magnetization boundary line c, respectively, and the part to which the current flows to the focusing direction is arranged ranging over the magnetization boundary line b.

The tangential direction is wound around the tracking coil 4 as a shaft, the magnet 8 is countered, and the part to which the current flows to the tracking direction is constituted ranging over the magnetization boundary line a.

The radial tilt coils 18a and 18b are wound around the axis of the tangential direction, and they are arranged at the both sides of the magnetization boundary line a.

It is constituted so that the part to which the current flows to the tracking direction on the side of optical disk installation ranges over the magnetization boundary line b of the magnet 8, while the part to which the current flows to the focusing direction of the side far from the magnetization boundary line a ranges over the magnetization boundary line c of the magnet 8.

The movable portion can be driven to the focusing direction by passing the equivalent current to the first focusing coil 3a and the second focusing coil 3b.

Moreover, driving to the tangential tilt direction is possible by giving the difference to the current passing through the first focal coil 3a and the current passing through the second focusing coil 3b.

Moreover, it can drive in each direction by passing the current through the tracking coil 4 and the radial tilt coils 18a and 18b.

Figure 14:
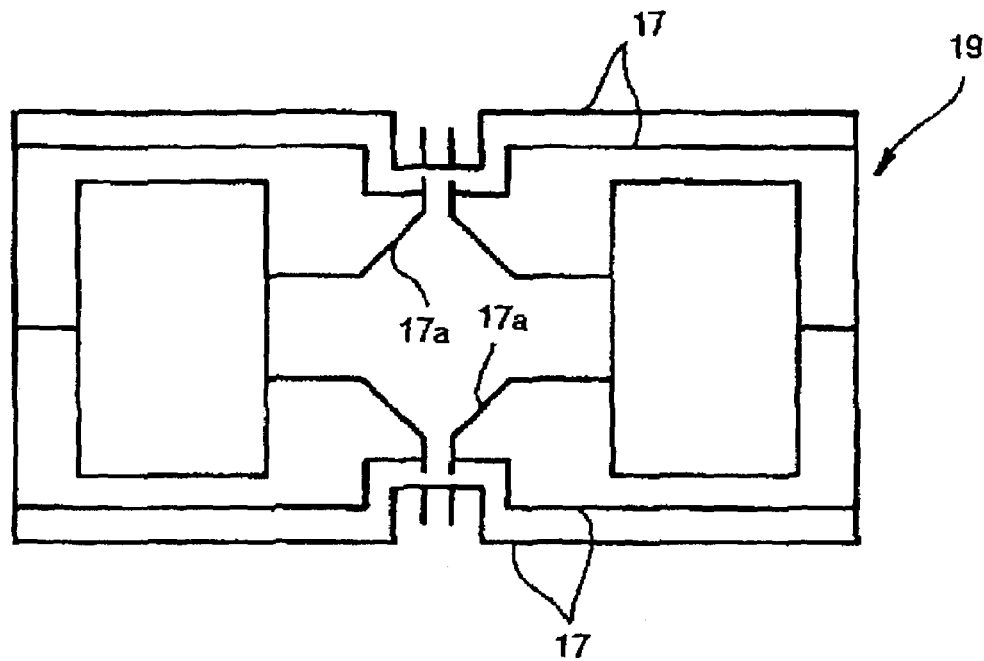
FIG. 14 is a diagram showing the rod-like flat spring in the objective lens drive apparatus of FIG. 11.

The eight rod-like flat springs. 17 are manufactured by etching or precision sheet metal work, are setting thickness to about 50 micrometers, and as shown in the plan showing in FIG. 14, after they really cast the one plate-like member 19 by this example to the objective-lens holding member 2 and the stationary members 6, they can form it by excising the unnecessary part by it.

By doing in this way, the positioning accuracy to the span between each rod-like flat spring 17 or the objective-lens holding member 2, and the stationary members 6 improves, and it becomes possible further to also make small struggling between the individuals of the rod-like flat spring 17.

While the movability improves by crookedness section 17a prepared in a part of rod-like flat spring 17, the deformation of the lengthening joint in the rod-like flat spring 17 at the time of operation can be absorbed, and struggling in primary resonance frequency or displacement sensibility can be reduced.

Figure 15:
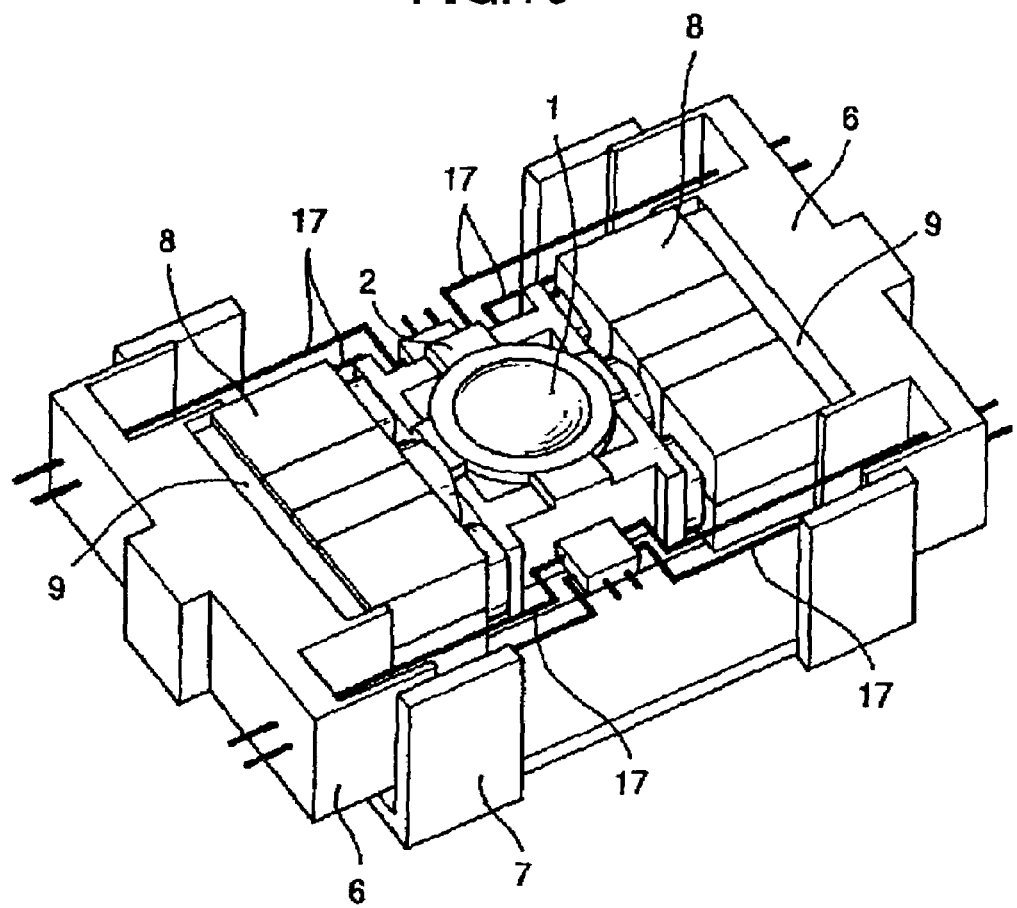
FIG. 15 is a perspective FIG. of the objective lens drive apparatus of another preferred embodiment of the present invention.
Figure 16:
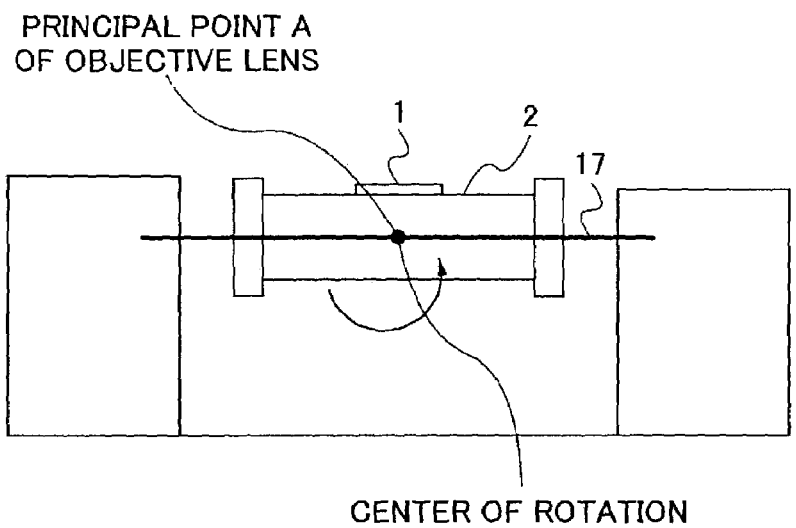
FIG. 16 is a diagram showing the objective lens holding member in the objective lens drive apparatus of FIG. 15.

FIG. 15 is a perspective view of the objective lens drive apparatus of another preferred embodiment of the present invention, and FIG. 16 is a diagram showing the objective-lens holding member in the preferred embodiment of FIG. 15. In FIG. 15 and FIG. 16, the elements which are essentially the same as corresponding elements in the previous embodiment are designated by the same reference numerals, and a description thereof will be omitted.

In the present embodiment, apart from the previous embodiment, it is arranged so that it may become small (thinly) on the whole in the focusing direction, and the rod-like flat spring 17 is arranged on the flat surface near the principal-point A of the objective lens 1.

Therefore, the support center will be arranged near the principal-point A of the objective lens 1.

When the center of gravity of the movable portion is given the radial tilt driving force or tangential-tilt driving force to the movable portion by arranging it near the principal point A of the objective lens 1, the rotation operation is performed on the center of the principal point A of the objective lens 1.

Since the light spot on the optical disk focused with the objective lens 1 is not fluctuated to the tracking direction or the tangential direction, stable servo operation is attained.

Figure 17:
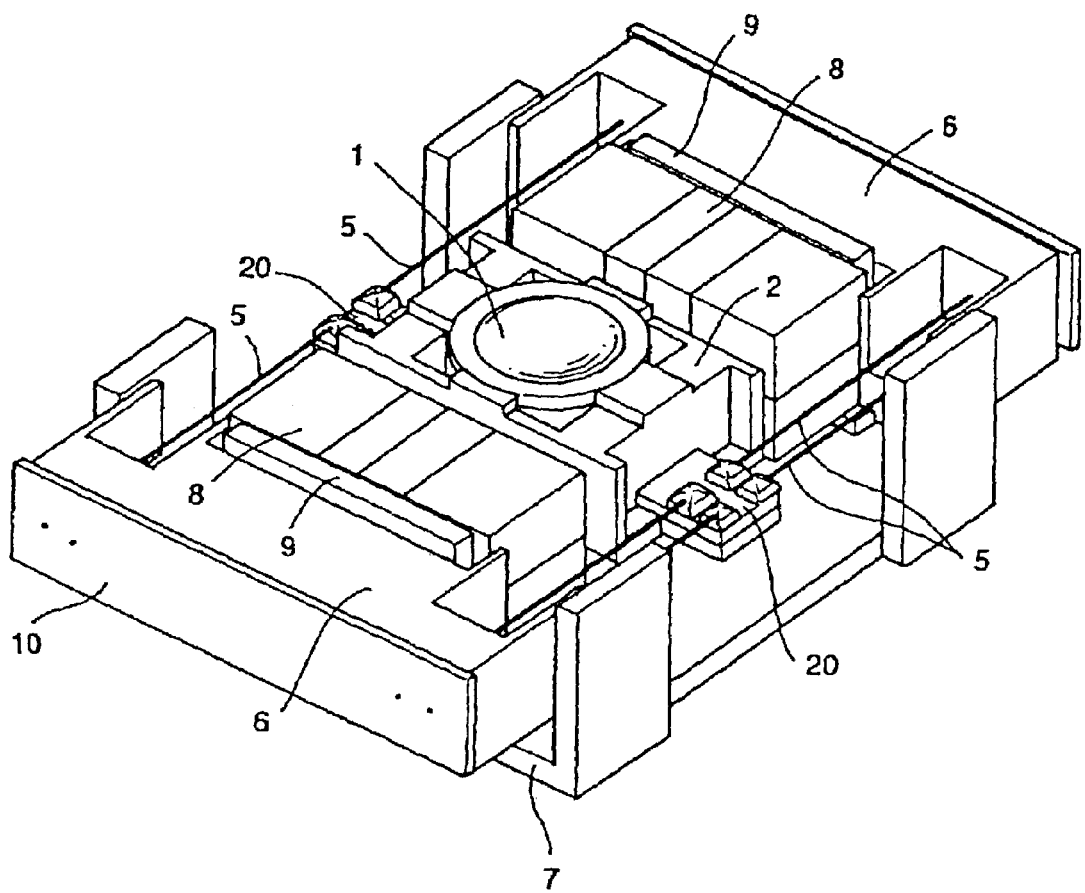
FIG. 17 is a perspective FIG. of the objective lens drive apparatus of another preferred embodiment of the present invention.

FIG. 17 shows the objective lens drive apparatus of another preferred embodiment of the present invention. FIG.

18 is an enlarged view of the printed circuit board part of the objective-lens holding member in the embodiment of FIG. 17.

The objective-lens holding member 2 holding the objective lens 1 is supported in elasticity in the preferred embodiment 9 with the wire springs 5 which makes the tangential direction the lengthening joint.

Four a total of eight are arranged in parallel by the both sides of the tangential direction and the radial direction focusing on the optical axis of the objective lens 1 on one flat surface with the wire springs 5 perpendicular to the focusing direction.

After arranging two wire springs 5 with the tangential direction for each of the both sides respectively and carrying out solder fixation of the one wire spring from the first at the movable portion and the stationary portion of the objective lens drive apparatus, it is possible by excising the unnecessary section to raise the positioning accuracy to the span or the objective-lens holding member 2, and the stationary members 6.

Figure 18:
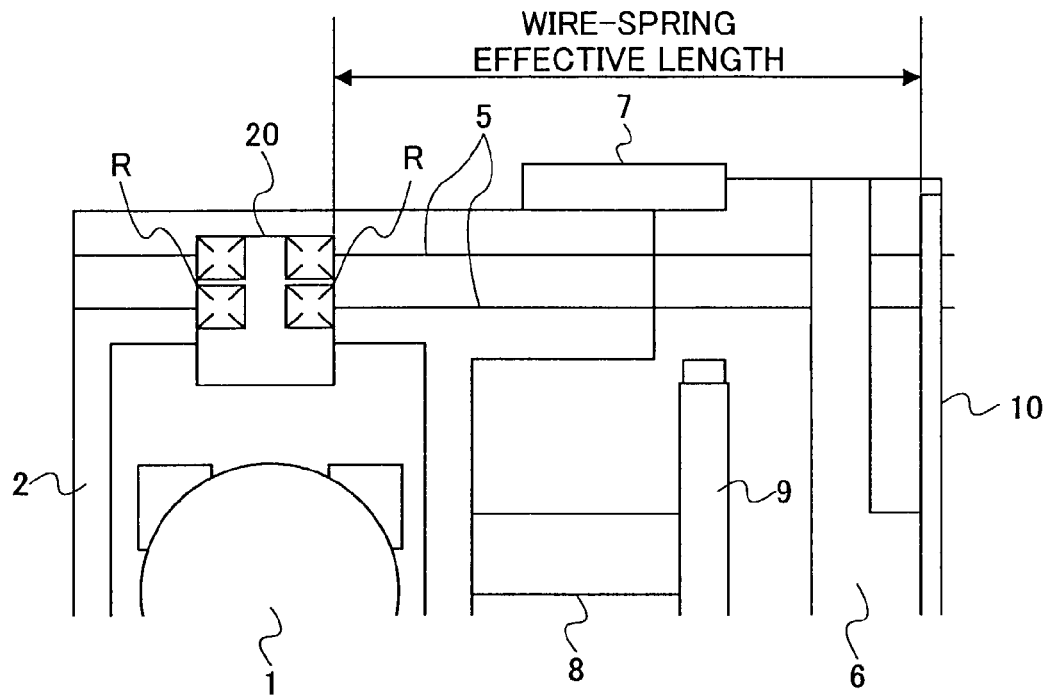
FIG. 18 is a diagram showing the main portion of the objective lens holding member in the objective lens drive apparatus of FIG. 17.

It is made for the edge of the tangential direction in the land of the printed circuit board 20 by which solder fixation is carried out and the wire spring 5 which adjoins further is being fixed to the land of the printed circuit board 20 arranged at right angles to the focusing direction in the radial-direction both sides of the objective-lens holding member 2 to be located in the same ridgeline R, as the fixed-end section on the side of the movable portion in eight wire springs 5 is as shown in FIG. 18.

Since the effective length in the wire spring 5 is decided in the board 10 of the stationary members 6 and the ridgeline R which fix the other edges of 5, struggling in the die length of the wire spring 5 can be suppressed to the minimum.

Figure 19:
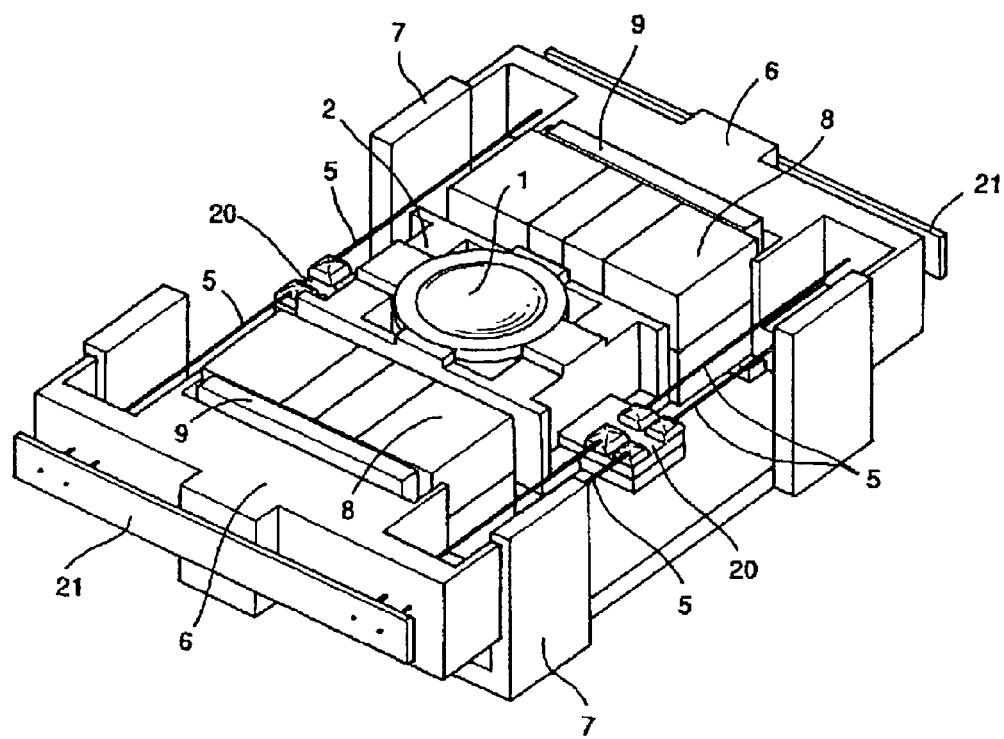
FIG. 19 is a diagram showing the structure of the wire spring and the elastic board in the objective lens drive apparatus of FIG. 17.

The fixed-end section on the side of the stationary members 6 of the wire spring 5 may be made to carry out solder fixation at the elastic board 21 which has flexibility in the shaft orientations of the wire spring 5, and is moved slightly to them, as shown in FIG. 19. It is possible to improve the movability by this composition.

Figure 20:
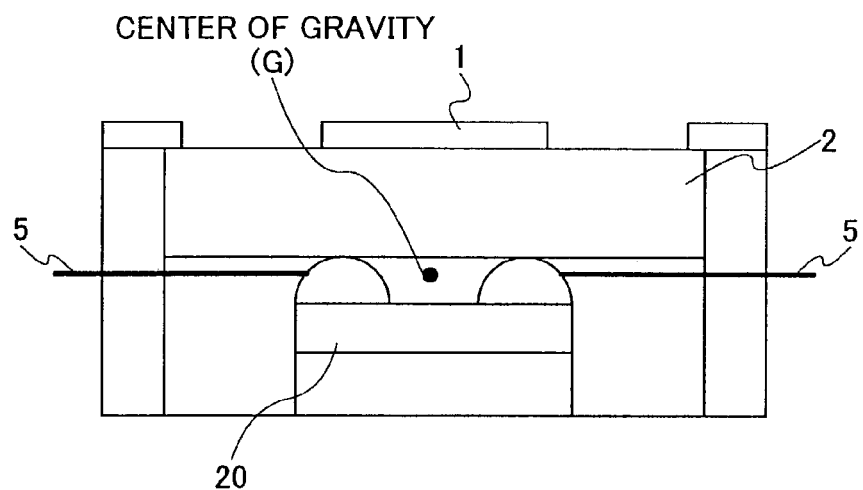
FIG. 20 is a diagram showing the structure of the printed circuit board in the objective lens drive apparatus of FIG. 17.

Moreover, the printed circuit board 20 of the objective-lens holding member 2 is arranged in the objective lens 1 on both sides of the center of gravity G of the movable portion at the opposite side (lower part side), as shown in FIG. 20.

Usually, since the objective lens 1 with large mass is arranged at the optical disk installation side, the center of gravity G of the movable portion tends to approach the optical disk installation side.

Although it is necessary to attach the weight for the balancers in the lower part of the movable portion in order to make this center of gravity G in agreement with the support center and the drive center, in the present embodiment, by making the printed circuit board 20 serve a double purpose as a balancer, components mark are reduced and it makes it possible to reduce the weight of the movable portion.

The stationary member in the rod-like elastic member (the wire springs 5, 5a–5d, and the rod-like flat spring 17) if it is in the objective lens drive apparatus of composition of supporting the movable portion by the spring member, in order to make the primary resonance detected from the support system and the moving-part mass property usually decrease.

The viscoelasticity ingredient is prepared in the end on the side of six in many cases.

Figure 21:
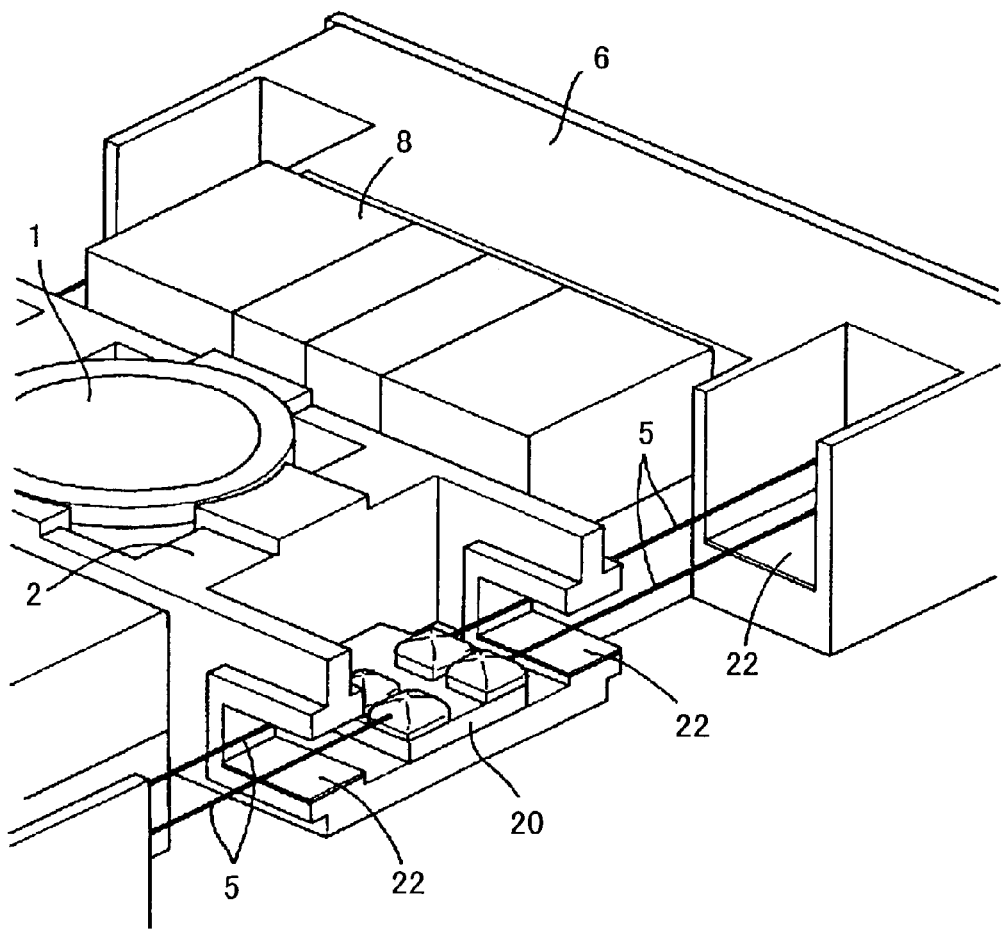
FIG. 21 is a diagram showing the main portion of the objective lens drive apparatus of another preferred embodiment of the present invention.

Then, as shown in the perspective diagram showing the principal part of the objective lens drive apparatus for explaining the preferred embodiment of FIG. 21, in order to make resonance of the tangential tilt direction fully decrease, the deformation of the wire spring 5 on the side of the movable portion has formed the viscoelasticity ingredient 22 in the large part, and the large damping effect is made to be acquired in the preferred embodiment.

In addition, if the viscoelasticity material 22 is formed also in the edge of the wire spring 5 on the side of the stationary members 6, the damping effect will increase further.

Figure 22:
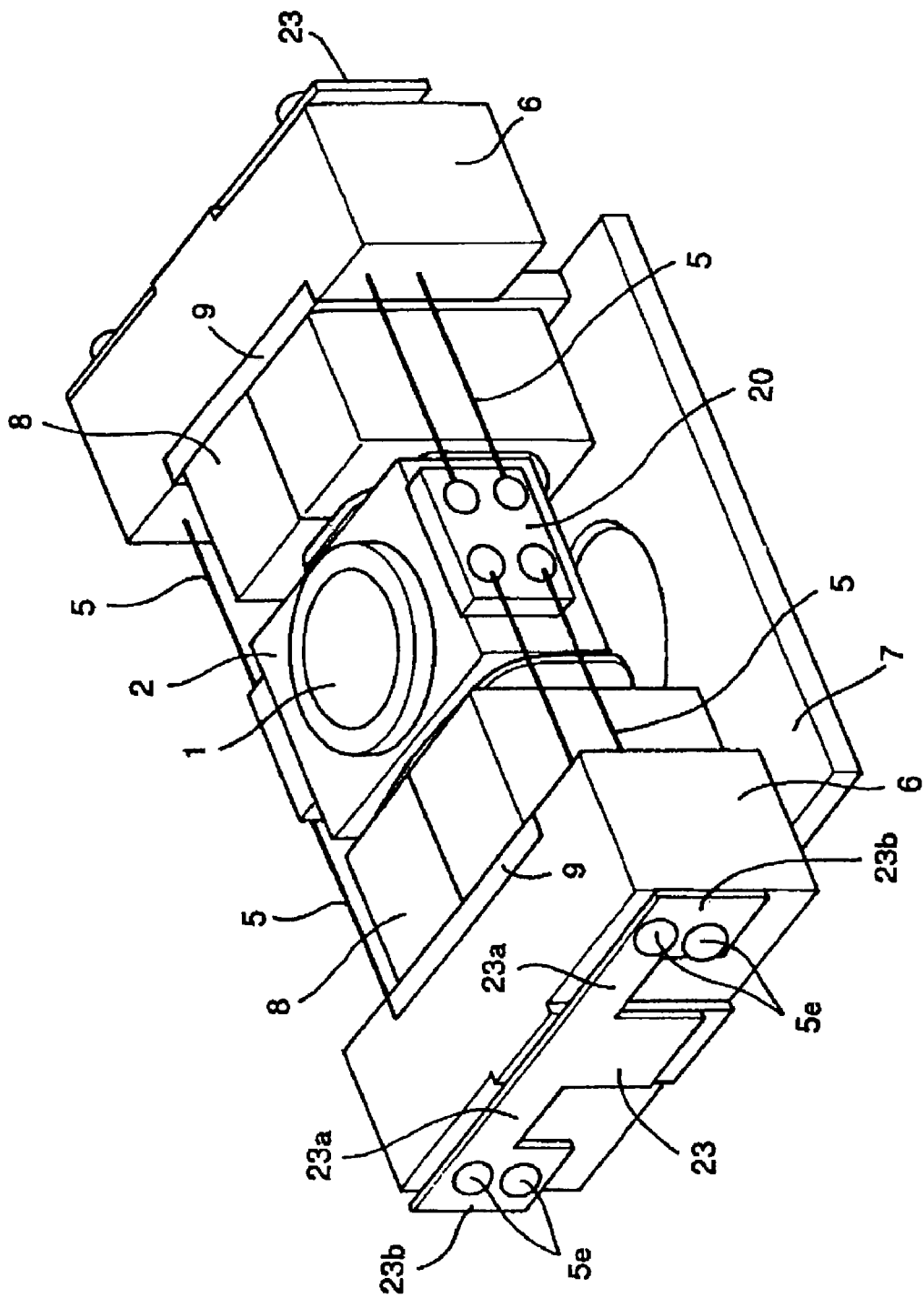
FIG. 22 is a perspective FIG. of the objective lens drive apparatus of another preferred embodiment of the present invention.
Figure 23:
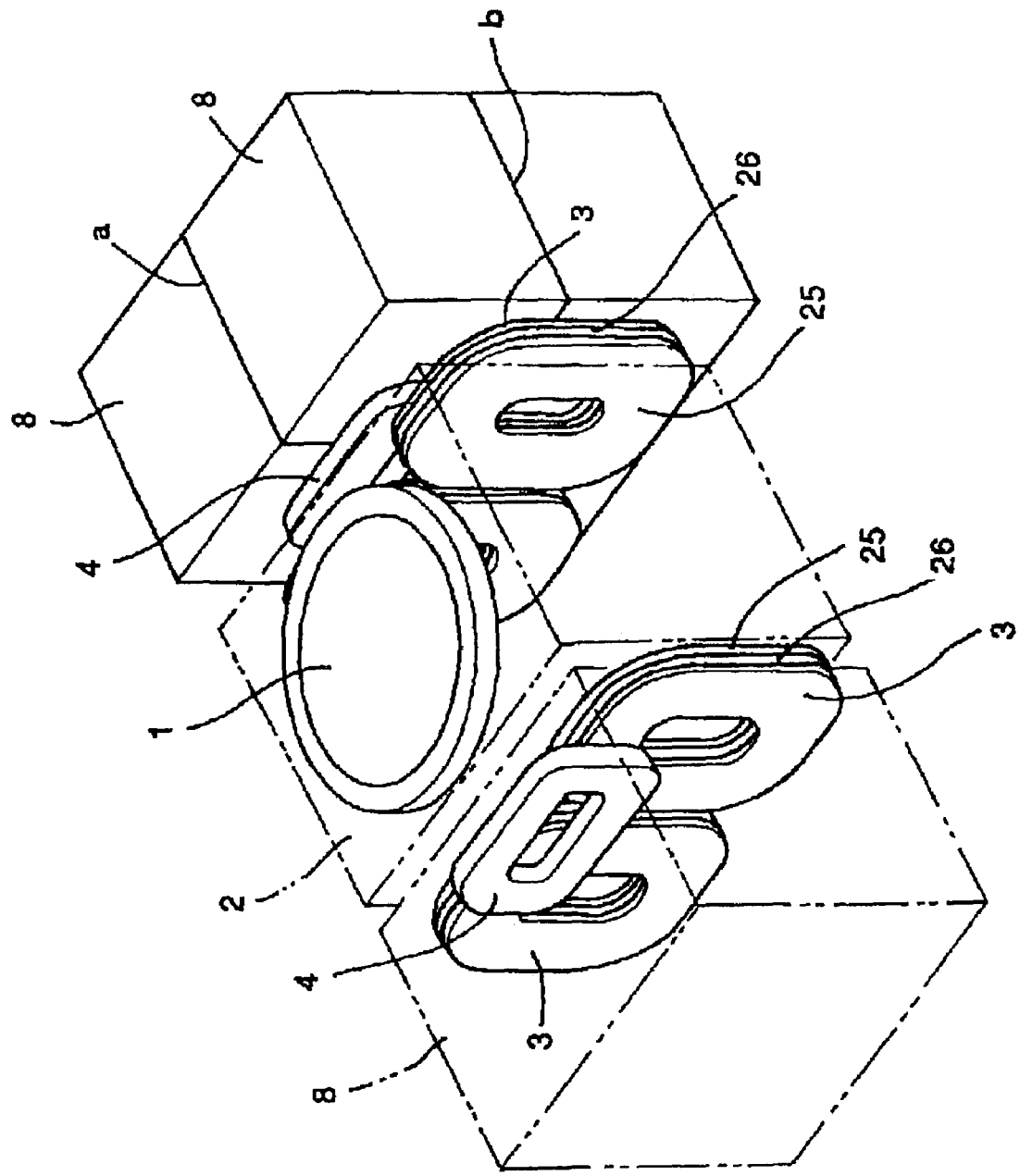
FIG. 23 is a diagram showing the electromagnetic drive unit in the objective lens drive apparatus of FIG. 22.

FIG. 22 shows the objective lens drive apparatus of another preferred embodiment of the of the present invention, and FIG. 23 shows the electromagnetic drive unit in the objective lens drive apparatus of FIG. 22.

As shown, the movable portion includes the objective-lens holding member 2 holding the objective lens 1 and the drive coil is supported in elasticity in the present embodiment with the wire spring 5 which makes the tangential direction the lengthening joint to the stationary portion.

The wire spring 5 is estranged to two in the focusing direction, and a total of eight are installed four symmetrically with each of the tangential direction and the radial direction focusing on the optical axis of the objective lens 1.

As shown in FIG. 23, in the mechanical component, the both-sides aspect of the tangential direction of the objective-lens holding member 2 is equipped with the focusing coil 3 which is the flat-surface-like drive coil wound around the axis of the tangential direction, the tracking coil 4, the radial tilt coil 25, and the tangential-tilt coil 26.

The focusing coil 3, the radial tilt coil 25, and the tangential-tilt coil 26 are isomorphism-like 4 ream coils, and each generates the thrust of the focusing direction.

However, it is made for the direction of the thrust to have differed by changing the polarity of the current which flows in each coil.

Namely, for all the four coils for which the focusing coil 3 passes the current the thrust is generated in the same direction and the movable portion is driven to the focusing direction.

The radial tilt coil 25 drives the movable portion to the radial tilt direction by generating the thrust of the opposite direction in the both sides in the tracking direction on both sides of the optical axis of the objective lens 1.

Moreover, the tangential-tilt coil 26 is driven to the tangential-direction by generating the thrust of the opposite direction on both sides in the tangential direction on both sides of the optical axis of the objective lens 1.

In FIG. 22, the base member 7 includes the magnetic substance, and forms the yoke section 9 by bending the part.

The magnet 8 for the drive fixed to this yoke section 9 is arranged in the both sides in the tangential direction of the objective-lens holding member 2, and as shown in FIG. 23, the magnetic circuit is formed so that it may receive at right angles to the focusing coil 3, the tracking coil 4, the radial tilt coil 25, and the tangential-tilt coil 26 and the magnetic flux may pierce.

The direction perpendicular to the surface which division magnetization of the magnet 8 is carried out by the magnetization boundary line a of the focusing direction, and the magnetization boundary line b of the tracking direction at the shape of a cross joint, and contains the focusing direction and the tracking direction, and it is magnetized in the opposite direction in the adjacent range.

Moreover, the drive coils 3, 4, 25, and 26 can be arranged so that the magnetization boundary lines a and b may be straddled, and they can be driven now in the corresponding direction by passing the current in each of the drive coils 3, 4, 25, and 26.

As shown in FIG. 22, the end on the side of the stationary members 6 of the wire spring 5 is soldered to the elastic board 23 which is having the part fixed by the stationary members 6 attached in the base member 7.

The E-shaped configuration is carried out, the width of face of the focusing direction is narrow in 23a in part, and the elastic board 23 can carry out now rotation displacement of the tracking direction by being twisted as a main shaft by this partial 23a.

Corresponding to the tangential tilt operation of the movable portion, stationary-portion part 5e of the wire spring 5 of the elastic board 23 rotates by the edge of the wire spring 5 arranged on the different position in the focusing direction being fixed to position 23b from which the radius of gyration in the rotation part of the elastic board 23 differs, respectively.

It is made to have not displaced the spot to the tangential direction by the tangential tilt operation by arranging the main shaft with which the elastic board 23 is twisted here in the same position as the principal point of the objective lens 1 in the focusing direction.

Figure 24:
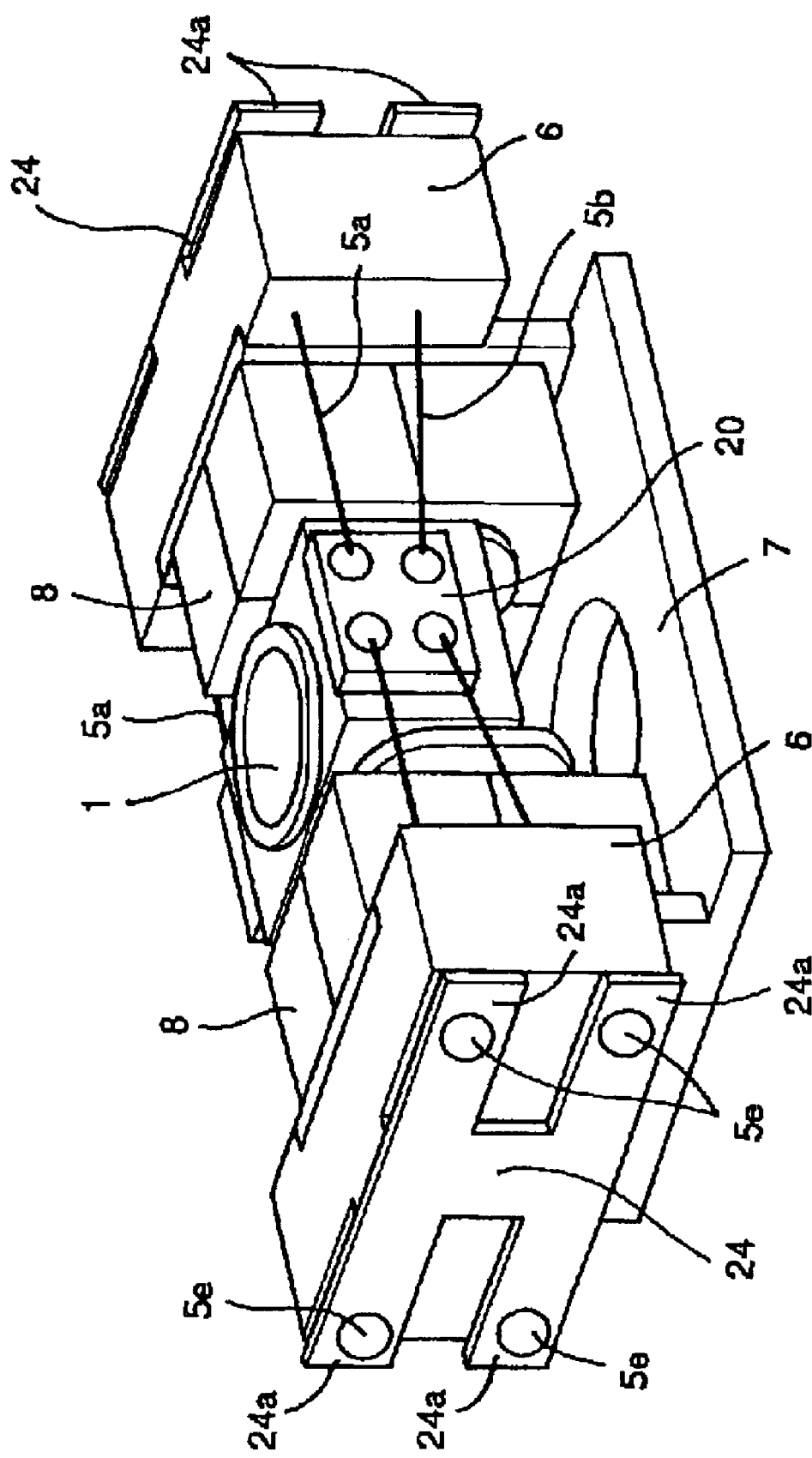
FIG. 24 is a perspective FIG. of the objective lens drive apparatus of another preferred embodiment of the present invention.

FIG. 24 shows the objective lens drive apparatus of another preferred embodiment of the present invention, and the objective-lens holding member 2 holding the objective lens 1 is supported in elasticity in the present embodiment 12 with the wire spring 5 which makes the tangential direction the lengthening joint.

Spacing is separated to the focusing direction, a total of eight are arranged symmetrically and in parallel four by the tangential direction and each radial direction on each flat surface focusing on the optical axis of the objective lens 1, and the wire spring 5 can set the end on the side of the stationary members 6 of the wire spring 5 in the both sides in the tangential direction of the movable portion to the elastic board 24 of the H character configuration by which a part for the center section is being fixed to the stationary members 6. It is soldered to four edges 24a, respectively.

Since it can displace to the tangential direction, the four edges 24a of the elastic board 24 make the tangential tilt operation of the movable portion possible.

The elastic board 24 of the H character configuration is manufactured by contour processing by the press die, and the span in the focusing direction of edge 24a possessing elasticity cannot be made not much narrow on the configuration of the die.

It is necessary to secure the width of face of the slot part about 1 mm.

When performing the tangential tilt operation of the movable portion, the amount of displacement to the direction of the axis of the wire spring 5 becomes the one where the span of the wire spring 5 in the focusing direction is narrower small.

The radius of gyration between the wire stationary portions on the side of the movable portion becomes small.

As for the deformation of the elastic board 24, the one where the span of the wire spring 5 in the focusing direction is narrower becomes small. That is, the movability will become good.

Then, it is made for the moving-part side to become narrow as much as possible in the present embodiment to having set widely the span in the focusing direction of the wire spring 5 as the processible grade at the elastic board 24 side.

Moreover, since the objective lens 1 is generally arranged in the wire spring 5 at the optical disk installation close-attendants side when setting up narrowly the span on the side of the movable portion rather than the stationary member 6 side.

Figure 25A:
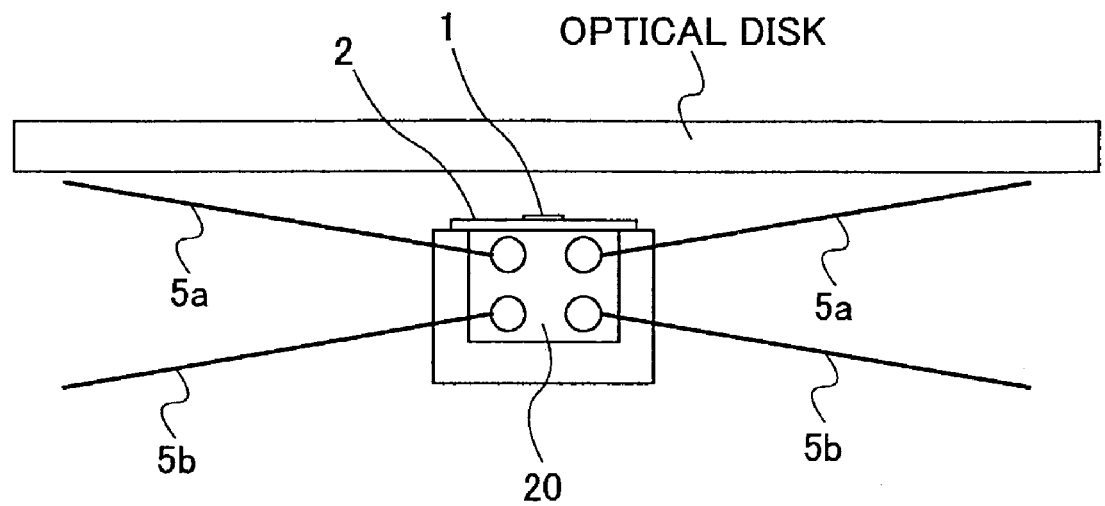
FIG. 25A and FIG. 25B are diagrams for explaining the arrangement of the wire springs in the objective lens drive apparatus of FIG. 24.
Figure 25B:
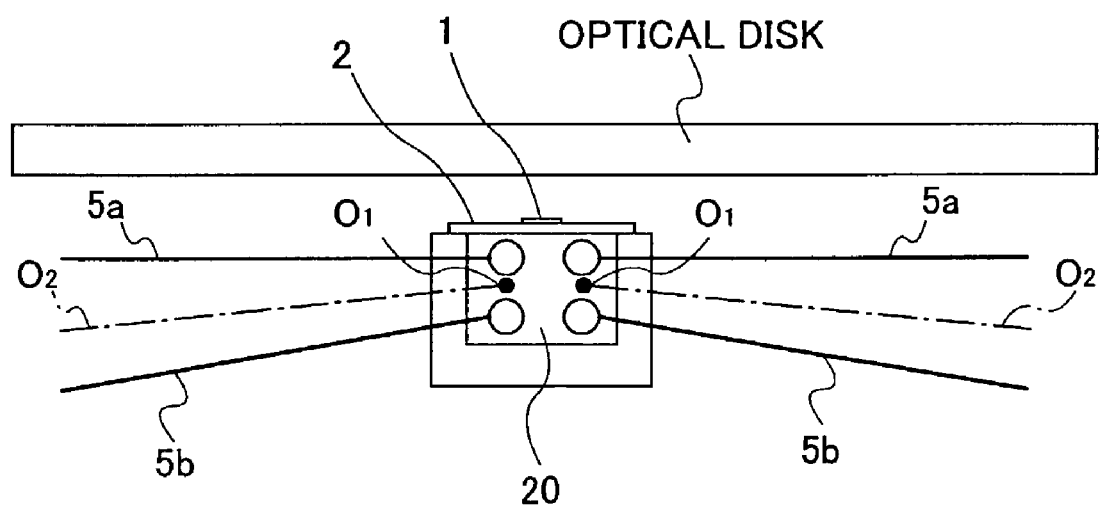

The wire spring 5a on the side of optical disk installation in the focusing direction is shown in FIG. 25A. As shown in FIG. 25B, rather than only the same include angle makes wire spring 5b of the opposite side incline in the opposite direction, respectively.

It is more desirable to install the wire springs 5a and 5b rather than the center O1 of the span between wire spring 5a on the side of the stationary members 6 and 5b, so that the method of center O2 of the span between wire spring 5a on the side of the movable portion and 5b may be on the optical disk installation side.

When the flexible board fleshed with the reinforcement member of suitable thickness is used for the elastic board 24, it becomes possible to enable it to also perform current supply to the movable portion.

Moreover, resonance can be made to decrease by arranging the viscoelasticity ingredient in the clearance between the movable part of the elastic board 24, and the stationary members 6.

Figure 26:
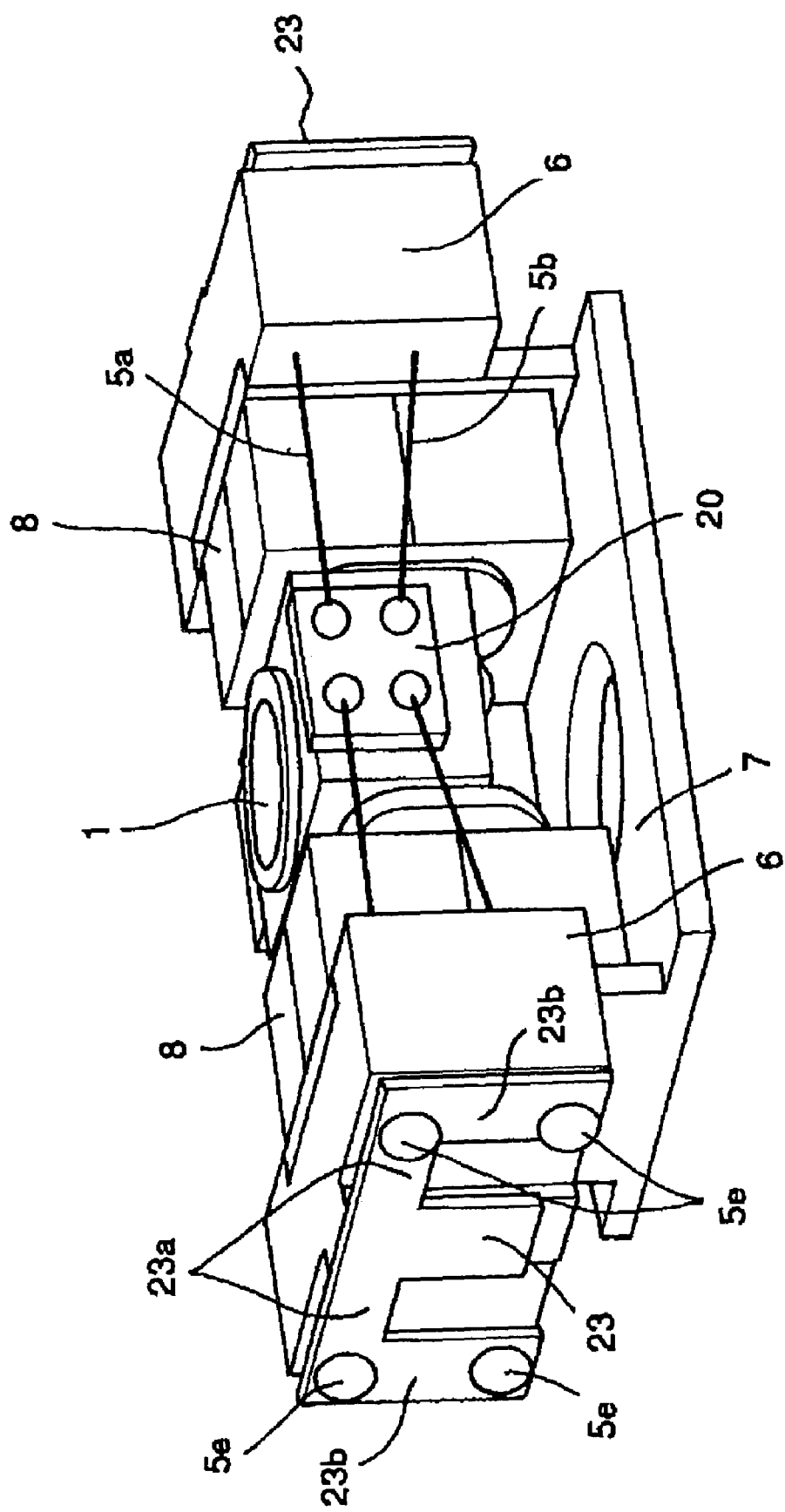
FIG. 26 is a perspective FIG. of the objective lens drive apparatus of another preferred embodiment of the present invention.

FIG. 26 is the perspective diagram of the objective lens drive apparatus for explaining the preferred embodiment 13 of the present invention.

As the preferred embodiment in which the elastic board 23 is carrying out the E-shaped configuration in the preferred embodiment of FIG. 22, and it is shown in FIG. 24.

It is made for the moving-part side to become narrow to having set widely the span in the focusing direction of the wire springs 5a and 5b as the processible grade at the elastic board 23 side.

In FIG. 26, the objective-lens holding member 2 holding the objective lens 1 is supported in elasticity with the wire springs 5a and 5b which make the tangential direction the lengthening joint.

The wire springs 5a and 5b separate spacing to the focusing direction as mentioned above. It centers on the optical axis of the objective lens 1, symmetrically with the tangential direction and each radial direction.

And a total of eight are arranged with four on each flat surface in parallel, and the end on the side of the stationary members 6 of the wire springs 5a and 5b is soldered to the elastic board 23 in the E-shaped configuration by which the part is being fixed to the stationary members 6 attached in the base member 7.

In 23a, the width of face of the focusing direction is narrow in part, and the elastic board 23 which carried out the E-shaped configuration can carry out now rotation displacement of the tracking direction by being twisted as a main shaft by this partial 23a.

The tangential tilt operation of the movable portion is made possible by the edge of the wire spring 5 arranged on the different position in the focusing direction being fixed to position 23b from which the radius of gyration in the rotation part of the elastic board 23 differs, respectively.

Although there are no restrictions on processing like the H mentioned already character type elastic board 24 in using the elastic board 23 which carried out the E-shaped type of the present embodiment, it becomes easy to be twisted by taking the large action radii of the rotation section of the elastic board 23.

Therefore, the movability of direction which takes the large span of the focusing direction in the wire springs 5a and 5b on the side of the elastic board 23 of the tangential tilt direction improves.

The amount of displacement to the shaft orientations of the wire spring 5 when the one where the span of the wire of the focusing direction on the side of the movable portion is narrower carries out the tangential tilt operation of the movable portion is small.

The radius of gyration of the movable portion and the wire stationary portion is small.

As for the deformation of the elastic board 23, the one where the span of the wire of the focusing direction on the side of the movable portion is narrower becomes small. That is, the movability becomes good.

Figure 27:
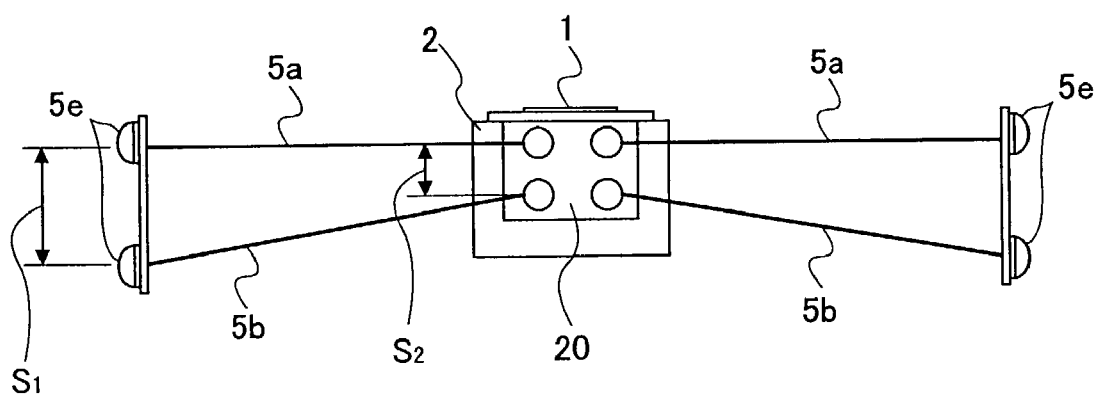
FIG. 27 is a diagram for explaining the arrangement of the wire springs in the objective lens drive apparatus of FIG. 26.

As shown in FIG. 27, in the preferred embodiment 13, the span in the focusing direction in the wire springs 5a and 5b is constituted so that the span S2 on the side of the movable portion may be narrowed as much as possible rather than the span S1 on the side of the elastic board 23.

Although the present embodiment 13 has composition of the preferred embodiment 11 and the preferred embodiment 12 which combined the configuration in part, the effectiveness will be further heightened by the above reasons by combining both.

It is possible to make it the light spot on the optical disk not displace the main shaft with which the elastic board 23 is twisted to the tangential direction by the tangential tilt operation like the preferred embodiment 11 by being arranged in the focusing direction in the same position as the principal point of the objective lens 1.

Figure 28:
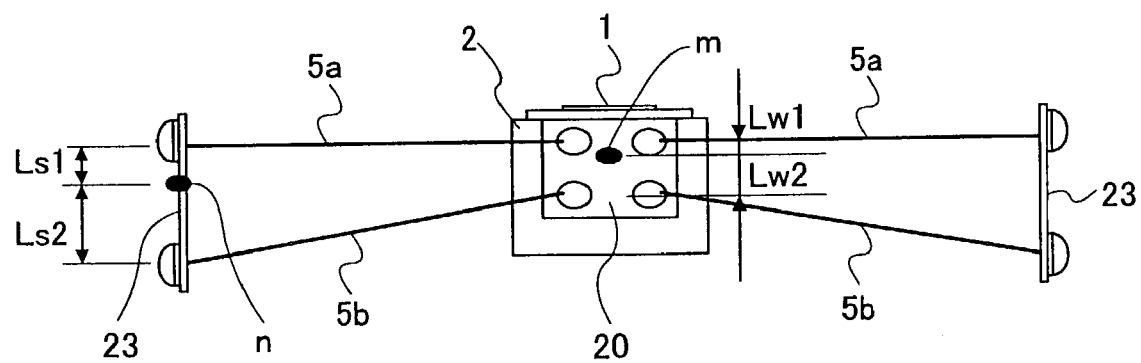
FIG. 28 is a diagram for explaining the arrangement of the wire springs in the objective lens drive apparatus of FIG. 26.

Moreover, as shown in FIG. 28, the Lw1, and the principal-point m of the objective lens 1 and the optical disk installation side set the distance between the edges on the side of the movable portion of wire spring 5b of the opposite side to Lw2 for the distance between the edges on the side of the movable portion in wire spring 5a on the side of the principal point m of the objective lens 1, and optical media installation.

When the Ls1, and twist center-of-rotation n and optical disk installation side sets distance between the fixed-end sections in wire spring 5b of the opposite side for the distance between the twist center of rotation n of the elastic board 23 in the focusing direction, and the fixed-end section in wire spring 5a on the side of optical disk installation to Ls2.

Also by arranging so that it may be set to Ls1/Ls2=Lw1/Lw2, the cross action of the tangential direction by the tangential tilt operation can be reduced, and the fluctuation of the light spot position on the optical disk can be made small.

In the preferred embodiments, the work attached by carrying out the solder of the predetermined part is difficult, and positioning the wire springs 5a and 5b using the jig in the case of attachment, since the wire springs 5a and 5b are arranged.

Figure 29:
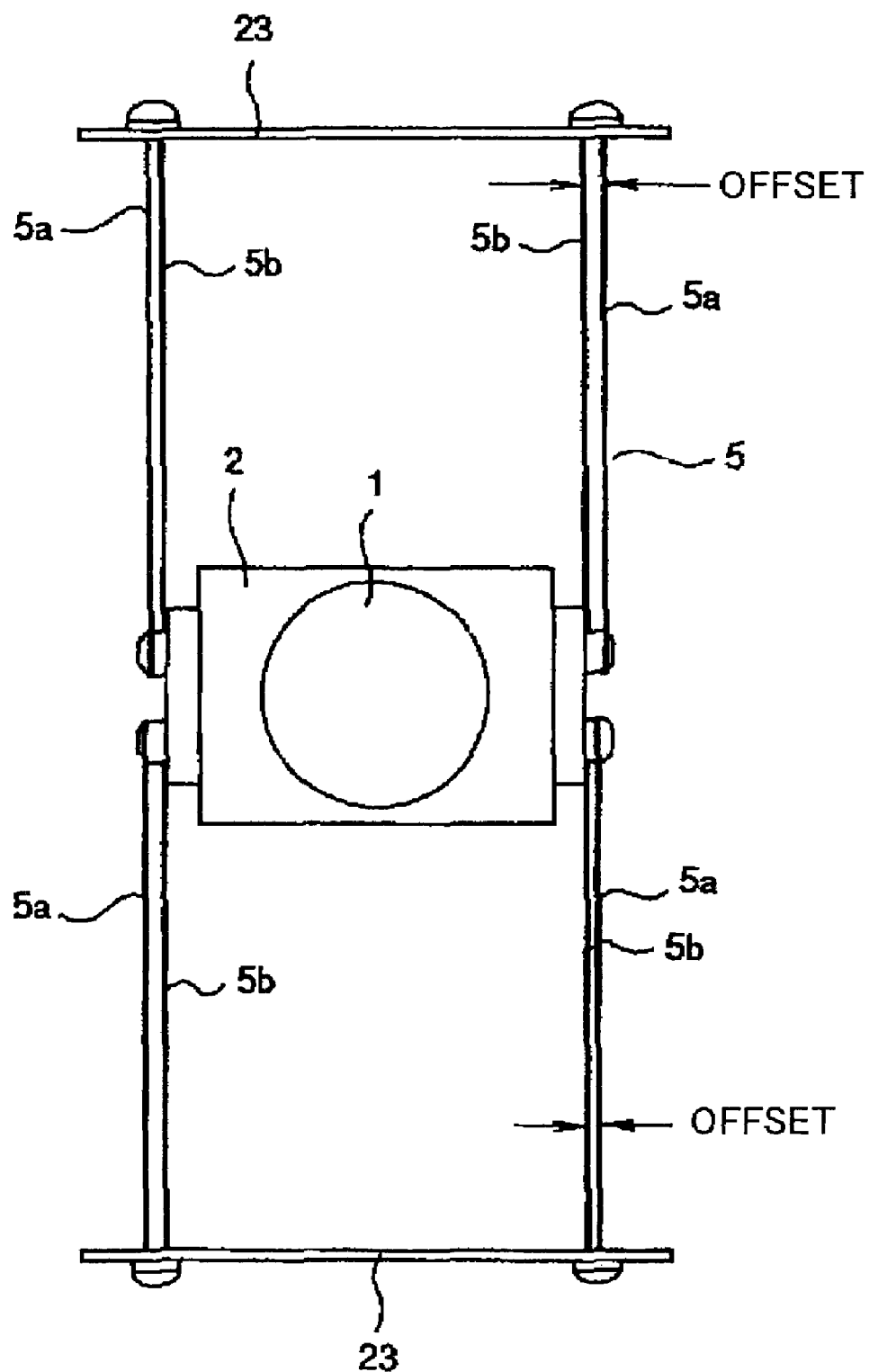
FIG. 29 is a diagram showing the objective lens holding member in the objective lens drive apparatus of another preferred embodiment of the present invention.

Then, it is good to make the wire springs 5a and 5b the composition which offsets to the tracking direction so that it may not interfere on each production at the support state of the objective-lens holding member in the preferred embodiment of FIG. 29 from the flat surface as a modification.

In the preferred embodiment, the support center of the tracking direction does not shift from the center of gravity or driving force center of the movable portion by arranging symmetrically to the flat surface parallel to the tangential direction including the optical axis of the objective lens 1.

Figure 30:
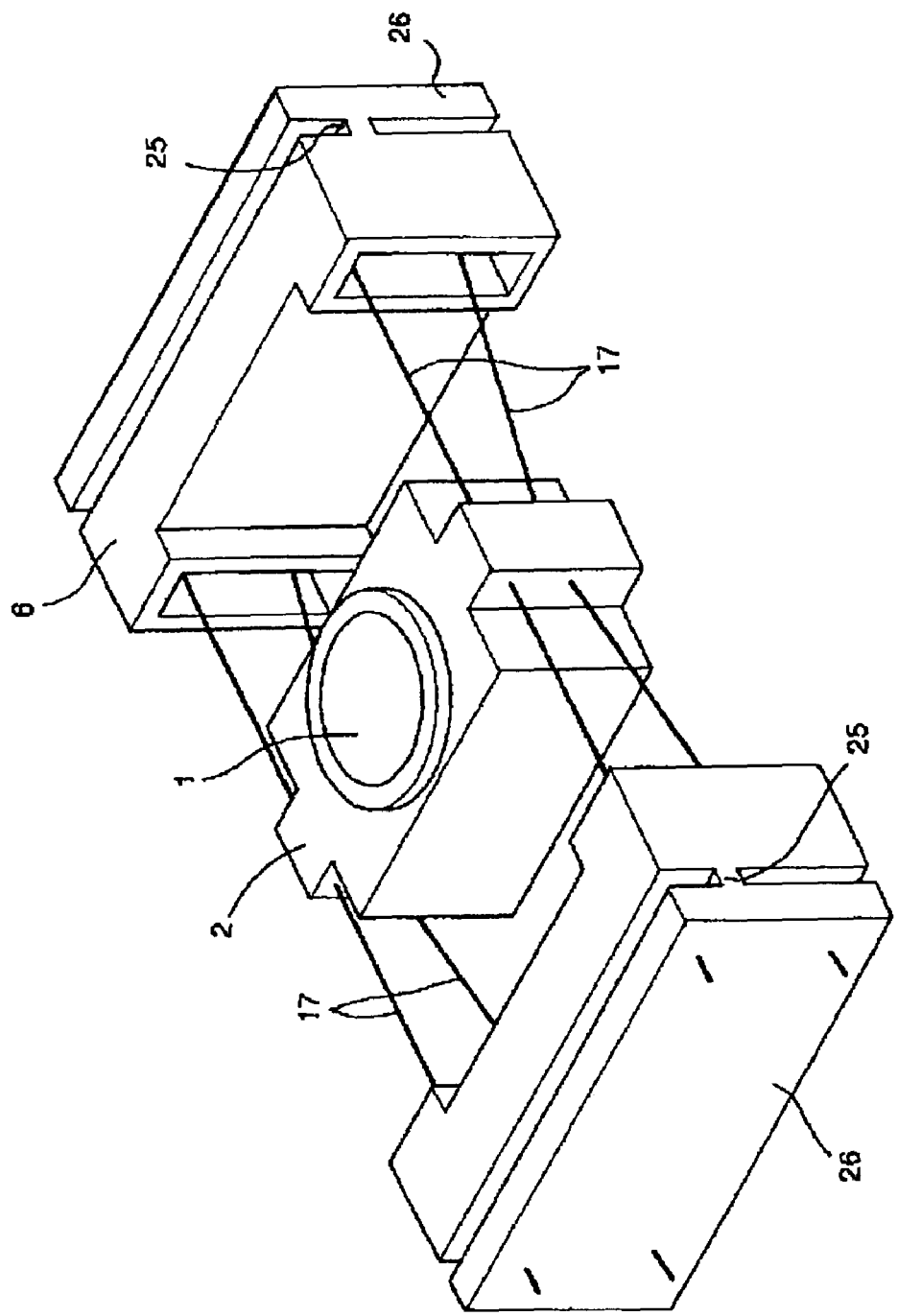
FIG. 30 is a diagram showing the objective lens holding member in the objective lens drive apparatus of another preferred embodiment of the present invention.

As shown in the perspective diagram which explains the support state of the objective-lens holding member in the preferred embodiment 15 shown in FIG. 30 as other examples of composition which avoid the interference at the time of attachment, the objective-lens holding member 2 is supported in the end section of the rod-like flat spring 17, and it is the hinge section about the other edges of the rod-like flat spring 17.

The composition fixed to the stationary member 26 in which 25 is prepared can be considered.

The preferred embodiment 15 is the rod-like flat spring manufactured by etching or precision sheet metal work.

It arranges on the both-sides aspect in the tracking direction of the movable portion by making into the direction of the flat surface the flat surface which makes the tracking direction the perpendicular for 17.

The rod-like flat spring 17 excises the unnecessary part by it, after thickness is making it about 50 micrometers and really casts the one plate-like member by this example to the objective-lens holding member 2 and the stationary member 26.

The hinge section 25 of the hinge configuration in which the part rotates the tracking direction as a shaft is formed in the stationary member 26, and rotation of the fixed-end section in the stationary member 26 of the rod-like flat spring 17 is attained.

By doing in this way, it is each rod-like flat spring.

The positioning accuracy to the span between 17 or the objective-lens holding member 2, and the stationary member 26 can improve, and struggling between the individuals can also be made small.

Figure 31:
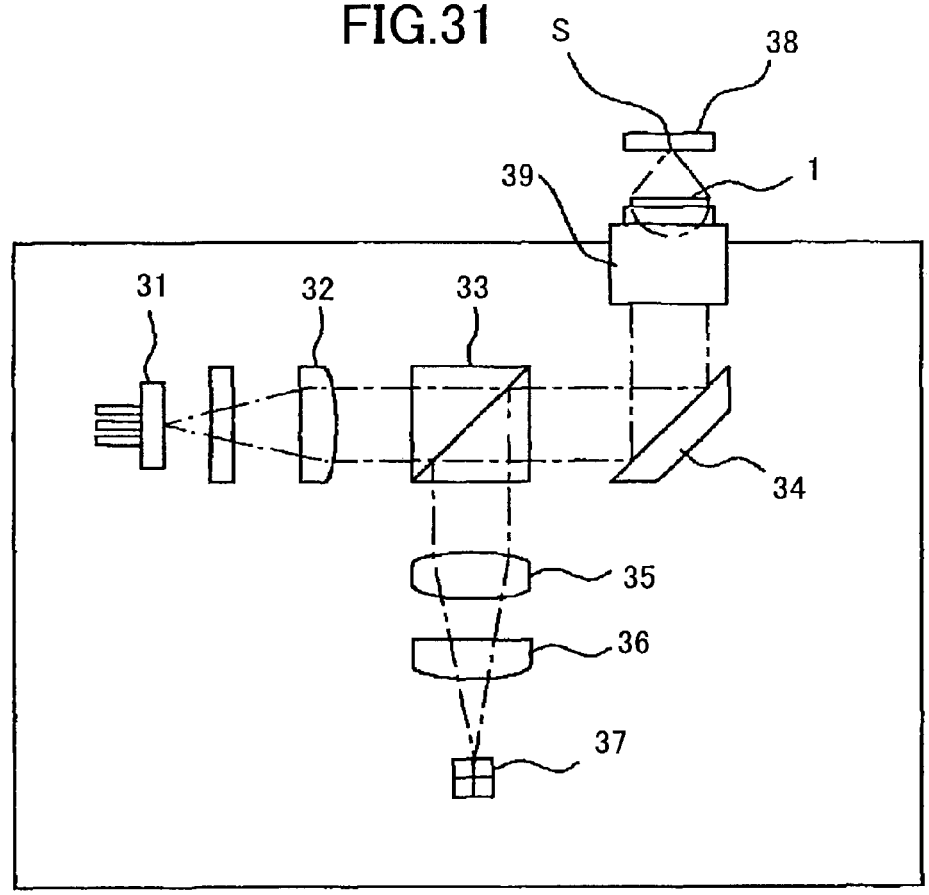
FIG. 31 is a diagram showing an optical pickup device in which the objective lens drive apparatus of one embodiment of the present invention is provided.

FIG. 31 is a diagram for explaining the preferred embodiment of the optical pickup device of the present invention which incorporates the objective lens drive apparatus of the preferred embodiment of FIG. 1.

In FIG. 31, 31 is the light source, 32 is the collimator lens, 33 is the beam splitter, 34 is the starting mirror, 35 is the focusing lens, 36 is the rod-like lens, 37 is the light-receiving component, 38 is the optical disk, and 39 is the objective lens drive apparatus of the preferred embodiment.

The divergent light from the light source 31 turns into parallel light by the collimator lens 32.

Then, it passes along the beam splitter 33 and the starting mirror 34 bends.

The parallel light bent by the starting mirror 34 is the objective lens drive apparatus 3.

Incidence is carried out to the objective lens 1 of 8, and the light spot S is formed on the optical disk 38.

After the reflected light of the light spot S from the optical disk 38 is deflected by the beam splitter 33 and passes along the focusing lens 35 and the rod-like lens 36, incidence of it is carried out to the light-receiving component 37.

Thus, it arranges so that the reflected light of the light spot S on the optical disk 38 may carry out incidence to the light-receiving component 37.

By generating the control signal and outputting to the objective lens drive apparatus 39 by objective-lens control means (not shown), such as the operation processing section, based on the signal acquired with the light-receiving component 37, the focusing coil and the tracking coil are driven and the information recorded on the optical disk 38 can be reproduced by making the objective lens 1 follow to the optical disk 38.

Furthermore, by the tilt sensor which is not illustrated detecting the inclination of the optical disk 28, and passing the current according to it in the tilt coil (not shown) of the objective lens drive apparatus 39, the objective lens 1 is made to incline to the optical disk 38, and tilt compensation is performed.

Here, the objective lens drive apparatus 39 is this objective lens drive apparatus 3, as it is the objective lens drive apparatus of the composition of each preferred embodiment explained by FIG. 1–FIG. 30 and being mentioned already.

Even when rotating surface blur, eccentricity, and the large optical disk 38 of the curvature at high speed by using 9, it becomes possible to make the objective lens 1 follow to the optical disk 38. That is, good recording or reproduction of the optical disk can be carried out at high speed.

Figure 32:
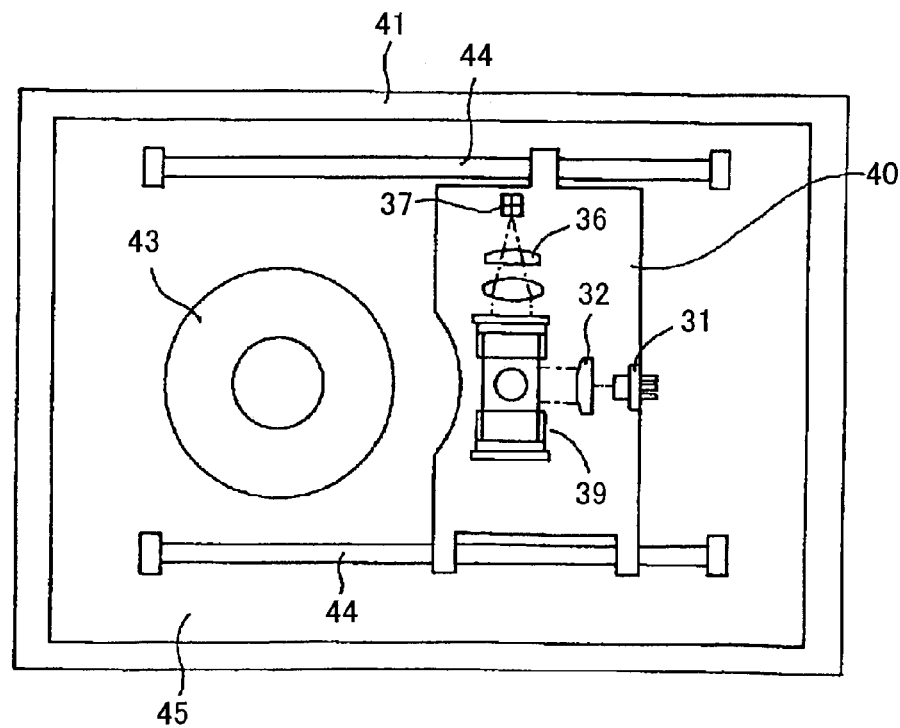
FIG. 32 is a diagram showing an optical disk drive in which the optical pickup device of FIG. 31 is provided.
Figure 33:
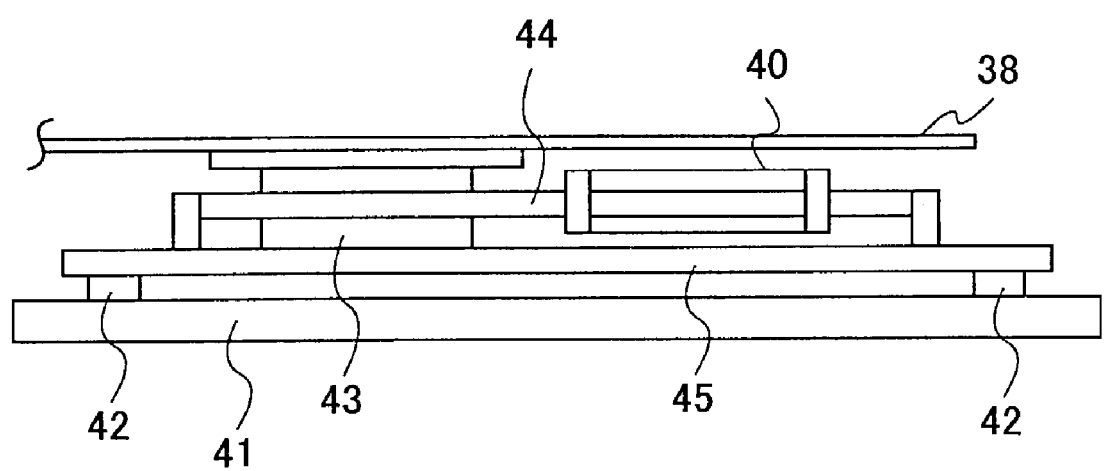
FIG. 33 is a front view of the optical disk drive of FIG. 32.
Figure 34:
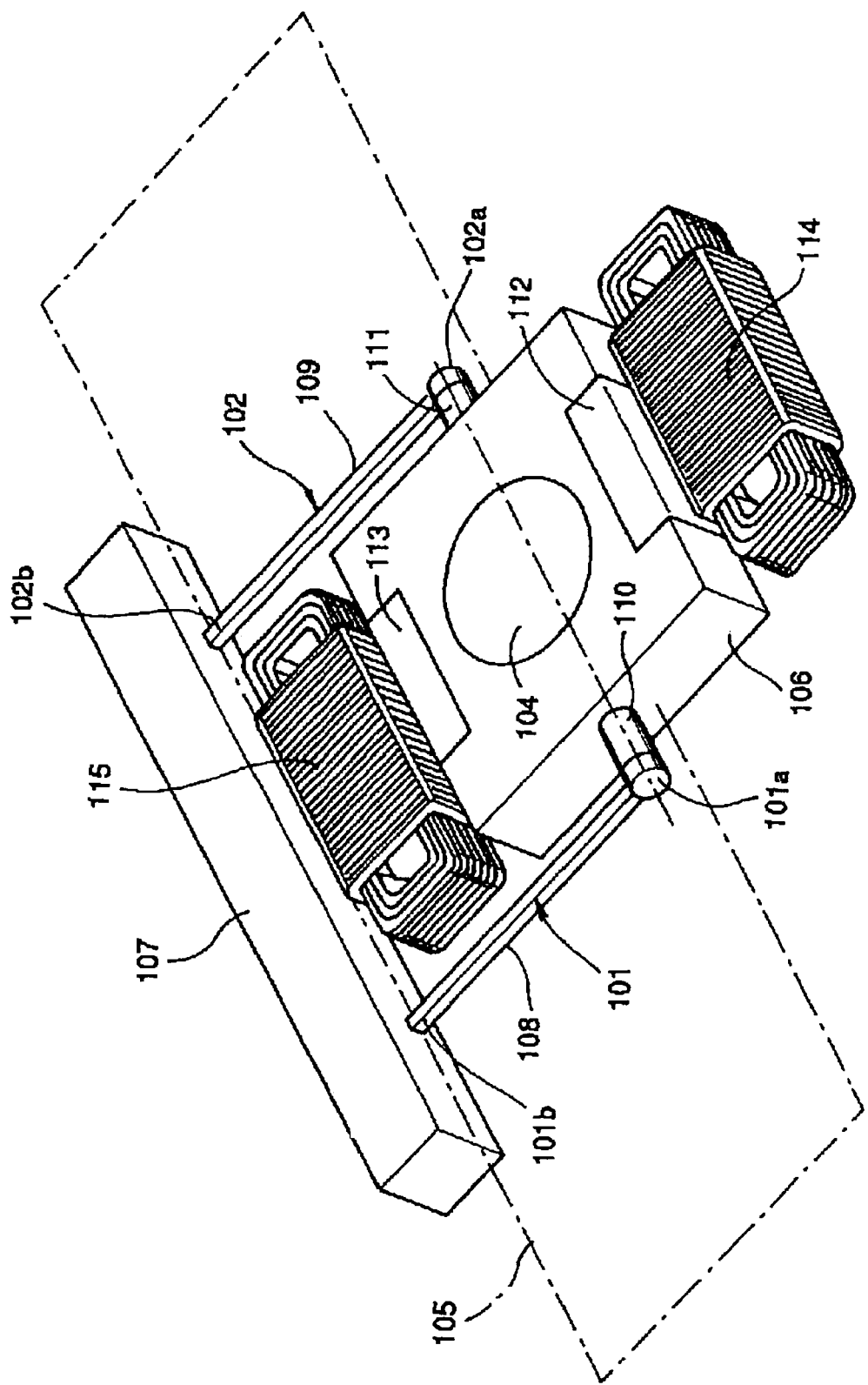
FIG. 34 is a diagram showing a conventional objective lens drive apparatus.
Figure 35:
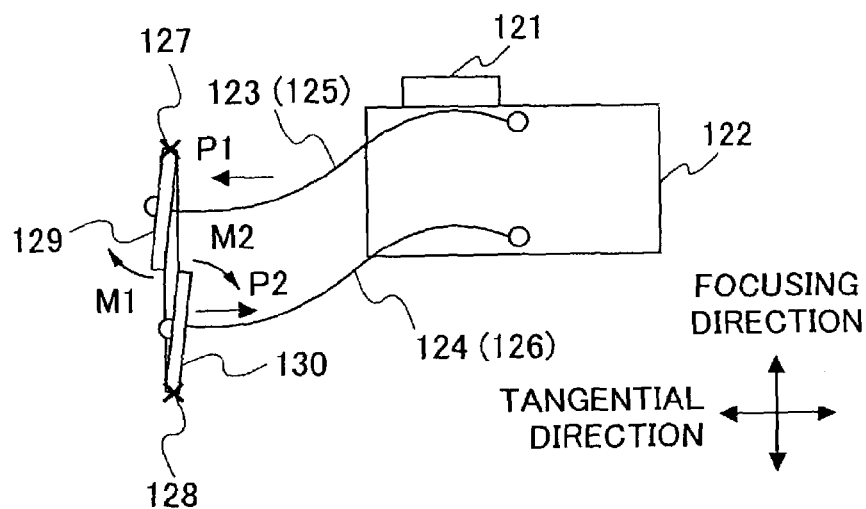
FIG. 35 is a diagram showing another conventional objective lens drive apparatus.

FIG. 32 shows an optical disk drive in which the optical pickup device of FIG. 31 is provided. FIG. 33 is a front view of the optical disk drive of FIG. 32.

In FIG. 32 and FIG. 33, reference numeral 40 indicates the optical pickup device explained with FIG. 31, and the optical pickup device 40 includes the light source 31, the collimator lens 32, the rod-like lens 36, the light-receiving component 37, the objective lens drive apparatus 39, etc.

Furthermore, reference numeral 41 indicates the housing of the optical disk drive, 42 indicates the cushion rubber, 43 indicates the spindle motor which is the rotation drive means of the optical disk 38, 44 indicates the seek rail, and 45 indicates the pickup module base. The pickup module base 45 is attached to the housing 41 of the optical disk drive through the cushion rubber 42.

The spindle motor 43 which carries out the rotation drive of the optical disk 38 is installed in the pickup module base 45.

Moreover, the optical pickup device 40 is carried in the seek rail 44 attached in the pickup module base 45.

The movement drive of the optical pickup device 40 is carried out in the radial direction of the optical disk 28 along the seek-rail 44 by the pickup drive means including the seeking motor (not shown).

The optical pickup device 40 provided in the optical disk drive shown in FIG. 32 and FIG. 33 can treat with the optical disk 38 about the objective lens 1, even when the optical disk 38 rotated at high speed has surface blur, eccentricity or a large curvature of the surface, and it is possible to make the optical pickup device follow to the optical disk 38.

Therefore, it enables the optical disk drive of this example of the preferred embodiment to perform recording/reproduction at high speed.

As described above, according to the objective lens drive apparatus of the present invention, it is possible to correct the inclination error of the optical disk and the objective lens. By making it possible to generate the driving force which can follow the optical disk under high-speed rotation to carry out the independent drive at each shaft orientations, the movability of the tangential tilt direction can be made good, and, the sensibility can be made small.

The optical disk drive of the present invention can perform stable control and it sets to the objective lens drive apparatus dealing with inclination compensation. The cross talk between the drive shafts which are easy to pose the problem can be reduced. Specifically, it is possible to reduce the cross talk including the cross talk of the tangential rotation direction generated by focusing translation drive, the cross talk of the tangential movement direction generated by focusing or tracking translation drive, and the cross talk of the tangential movement direction generated by the tangential rotation drive.

Figure 36:
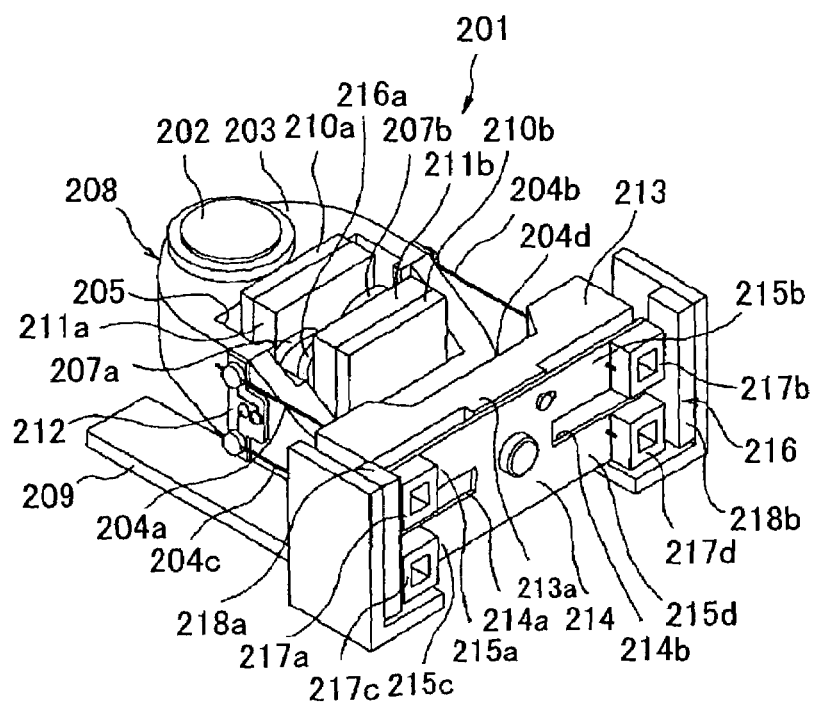
FIG. 36 is a perspective view of the objective lens drive apparatus of another preferred embodiment of the present invention.
Figure 37:
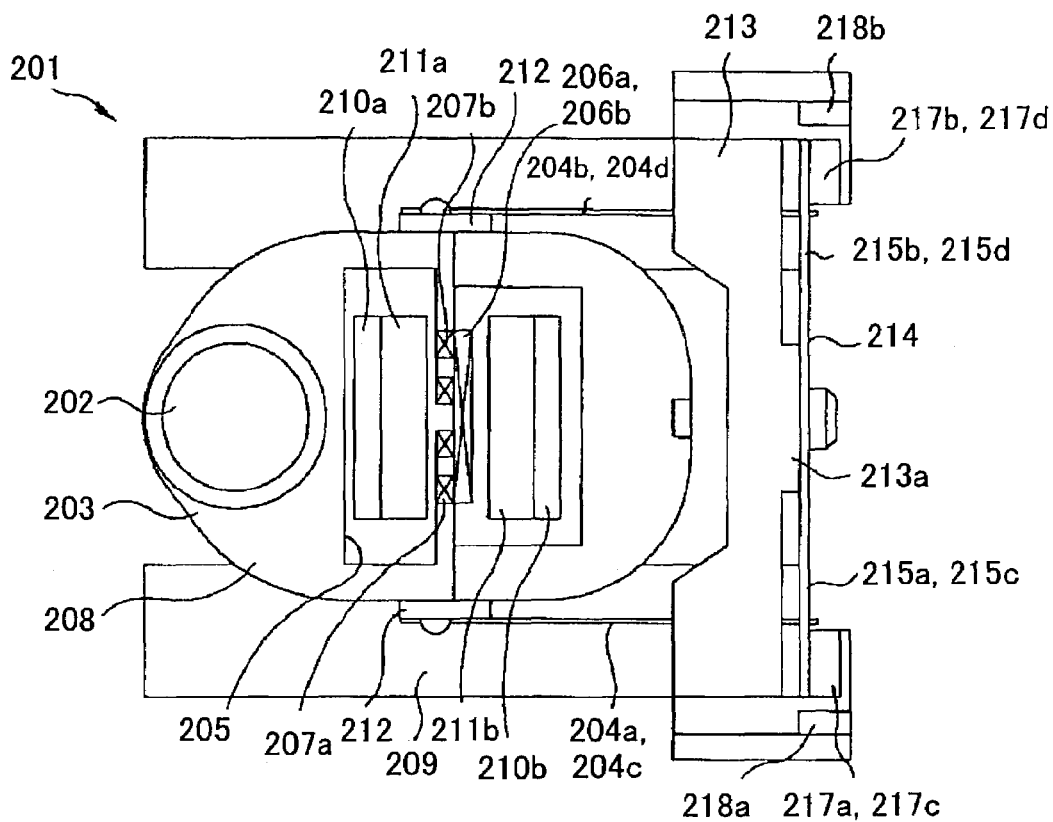
FIG. 37 is a top view of the objective lens drive apparatus of FIG. 36.
Figure 38:
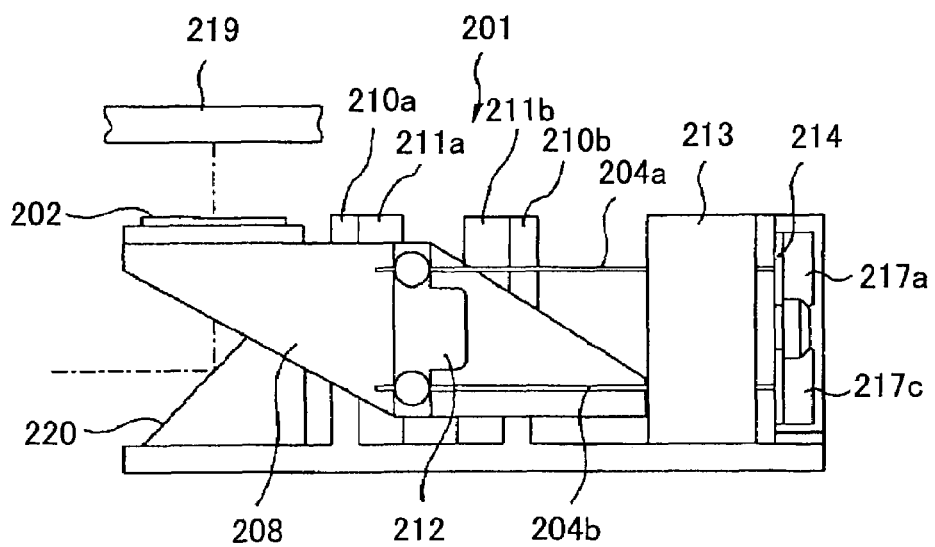
FIG. 38 is a side view of the objective lens drive apparatus of FIG. 36.
Figure 39:
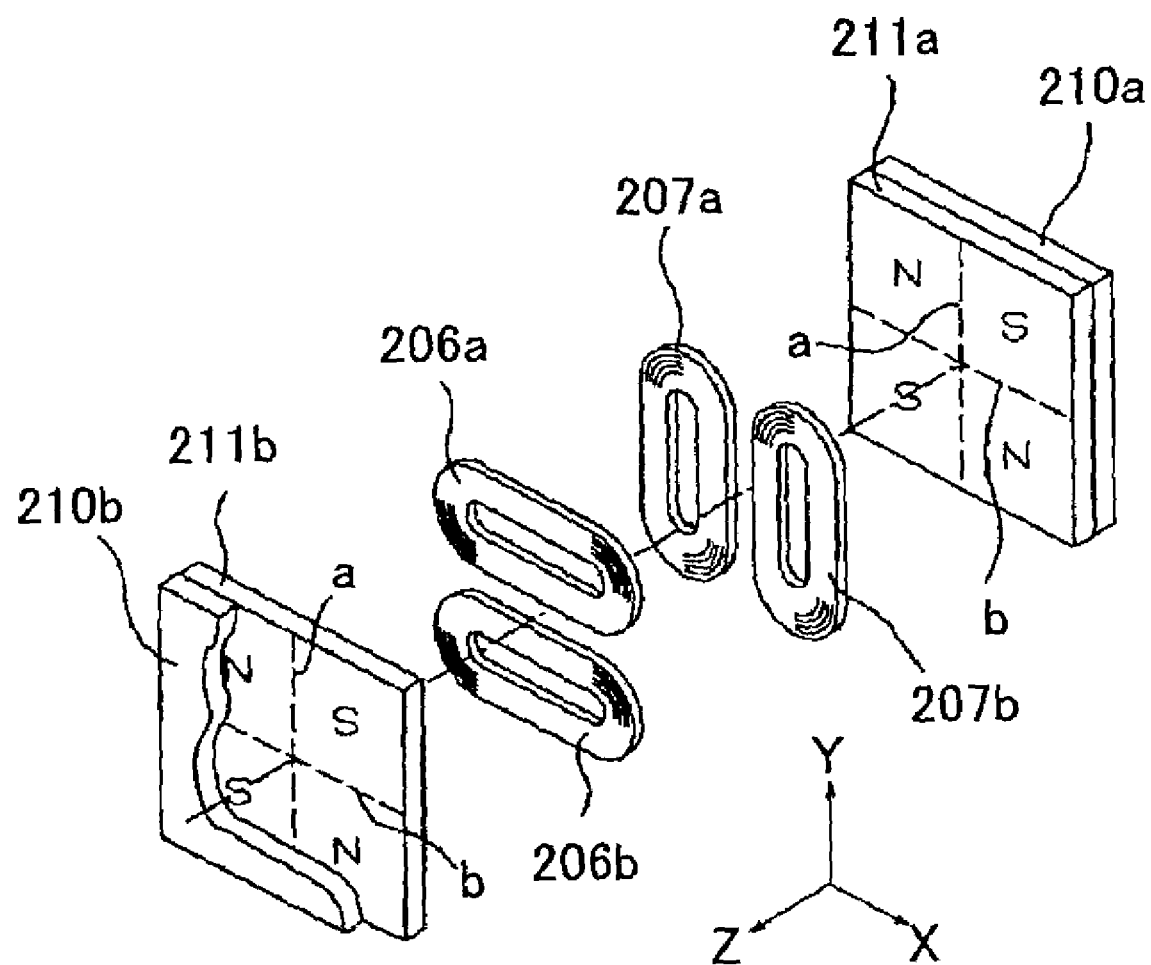
FIG. 39 is an exploded view of the coils, yokes and magnets in the objective lens drive apparatus of FIG. 36.

Next, FIG. 36 shows the objective lens drive apparatus of another preferred embodiment of the invention. FIG. 37 is a top view of the objective lens drive apparatus of FIG. 36. FIG. 38 is a side view of the objective lens drive apparatus of FIG. 36. FIG. 39 is an exploded view of the coils, yokes and magnets in the objective lens drive apparatus of FIG. 36. FIG. 40A through FIG. 40D are diagrams for explaining the tilt compensation operation.

The objective lens 202 is held by the objective-lens holding member 203 in the objective lens drive apparatus 201 of the present embodiment.

The objective-lens holding member 203 is elastically supported by four wire springs 204a, 204b, 204c and 204d which are the rod-like elastic support members. The through hole 205 of the shape of an angle made to penetrate in the vertical direction is formed in a part of objective-lens holding member 203.

The focusing coils 206a and 206b and the tracking coils 207a and 207b which are the driving coils by which the wire is wound to the shape of a flat-surface coil are fixed to the center section of the through hole 205.

Movable portion 208 is constituted by these objective lenses 202, the objective-lens holding member 203, the focusing coils 206a and 206b, and the tracking coils 207a and 207b.

Moreover, in the objective lens drive apparatus 201 of the present embodiment, the group base 209 made from the magnetic substance which makes a part of stationary member is formed.

The yokes 210a and 210b which project in the through hole 205 on both sides which interpose the coils 206a, 206b, 207a, and 207b are formed in one by bending some group bases 209.

Inside the yokes 10a and 10b, the coils 6a, 6b, 7a and 7b and the magnets 11a and 11b for the drive by the permanent magnet which forms the magnetic circuit with the yokes 10a and 10b so that the magnetic flux may pass through the inside are being fixed.

The relation between the coils 6a, 6b, 7a, and 7b and the magnets 11a and 11b for the drive is explained with reference to FIG. 39.

The magnets 11a and 11b for the drive are divided into four sections along with the cross-like magnetization boundary lines a and b (4-pole magnetization).

The magnetization direction is magnetized in the range and the opposite direction which are perpendicular (the direction of the Z-axis-direction=jitter), and adjoin each other to the surface containing the two axial directions of the direction of the focus (Y-axis direction), and the tracking direction (X-axis direction).

Furthermore, the magnets 11a and 11b for the drive are arranged so that the magnetization direction of the part which faces mutually on both sides of the focusing coils 6a and 6b and the tracking coils 7a and 7b may be in agreement.

Moreover, the four wire springs 4a–4d have the axial direction in parallel to the direction (the direction of the Z-axis-direction) perpendicualr to the surface containing the two axial directions of the focusing direction (Y-axis direction) and the tracking direction (X-axis direction).

On the flat surface (the first flat surface of the direction near the principal point of the objective lens 2) of the imagination which intersects perpendicularly in the direction of the focus, make the tracking direction estrange the wire springs 4a and 4b, and they are arranged in parallel.

The tracking direction is made to estrange the wire springs 4c and 4d on the flat surface (the second flat surface) of the imagination which intersects perpendicularly in the direction of the focus in the different position from the first flat surface, they are arranged in parallel, and support movable portion 8 (objective lens 2) in elasticity to the two axial directions of the direction of the focus, and the tracking direction.

The end-winding child board 12 is fixed to the both sides of the objective-lens holding member 3, and the wire springs [4a–4d] end side is being fixed to these end-winding child boards 12 by soldering.

The wire springs 4a–4d other end edge is being fixed to the elastic board 14 as a movable portion which penetrated the stationary member 13 which is fixed on the group base 9 and constitutes a part of stationary member, and is attached in this stationary member 13 by soldering.

It fills up with the silicon system gel for making the wire springs in the stationary member 13 4a–4d through hole part dump the wire here, and here, preventing resonance etc.

Moreover, the wire springs 4a–4d are formed of the conductive ingredient, and current supply of them is enabled at Coils 6a, 6b, 7a, and 7b through the elastic board 14 of board composition, the wire springs 4a–4d, and the end-winding child board 12.

Moreover, while the elastic board 14 is attached on heights 13a of the stationary member 13, the ends side notches 14a and 14b, the wire springs 4a–4d, it is constituted independently every as the deformation sections 15a–15d which can deform in the direction of the jitter.

It is fixed to the wire springs 4a–4d on the stationary-portion side at the one end edge, and the deformation sections 15a–15d, it is supported by possible displacement in the longitudinal direction (rod-like lengthening-joint=the direction of the jitter).

Moreover, near the deformation sections 15a–15d, it is the drive source 16 is provided for tilt compensation.

The flat-surface coil-like coils 17a–17d for the tilt drive with which the drive source 16 for tilt compensation is fixed to each of the deformation sections 15a–15d near the edge. The pole of N and S is is set up for the permanent magnet 18a fixed to some group bases 9 in the position which is set up in the direction of the jitter and carries out proximity opposite at the coils 17a and 17c for the tilt drive. The positions which similarly the pole of N and S is set up in the direction of the jitter, and carry out proximity opposite at the tilt drive coils 17b and 17d are contained with the permanent magnet 18b fixed to some group bases 9.

The control to the coils 17a–17d for the tilt drive of each deformation section 15a–15d is made possible to make the displacement in the direction of the jitter individually, and to carry out displacement in the opposite direction thereof or the direction of the jitter depending on the energization direction.

In addition, in FIG. 38, reference numeral 19 indicates the optical disk, and reference numeral 20 indicates the starting prism.

In such composition, the tilt compensation operation of the objective lens 2 will be explained.

The displacement of the deformation sections 15a and 15b which pass the current of the same direction and correspond to the coils 17a and 17b for the tilt drive is made to carry out in the direction (the direction of outside) of P, as shown in FIG. 5C.

In connection with this, it displaces in the direction (the direction of outside) of P whose other end therefore, wire (also itself) and edge of the wire springs 4a and 4b on the first flat surface currently fixed to the deformation sections 15a and 15b are in the longitudinal direction.

As shown in FIG. 5C, to the coils 17c and 17d for the tilt drive, the coils 17a and 17b for tilt drive is about the deformation sections 15c and 15d which pass the current of the same direction to the reverse polarity, and correspond to it. The displacement is made to carry out in the direction (the inner direction) of Q, as shown in FIG. 5C.

In the present embodiment, it displaces in the direction (the inner direction) of Q whose wire springs on the second flat surface currently fixed to the deformation sections 15c, 15c, 4c and 4d at the other end, the wire springs are in the longitudinal direction.

That is, displacement is carried out so that the wire springs, i.e., the wire springs 4a and 4b and the wire springs 4c and 4d, arranged in the position (the first flat surface and second flat surface) where the directions of the focus differ may offset the wire springs 4a–4d other end edge of each other to the longitudinal direction (the direction of the jitter).

As shown in FIG. 5C, rotation displacement of the movable portion 8 supported at the wire springs 4a–4d end side can be carried out to the tangential direction, and therefore, the compensation of the tangential tilt of the objective lens 2 is attained.

What is necessary is just to make the opposite direction offset at the time of the compensation of the tangential tilt of the opposite direction.

For this reason, it is necessary to be fixed to the wire springs 4a–4d stationary-portion side, and also just to have the drive source 216 for tilt compensation in which enable displacement of the one end edge in the direction of the jitter by each deformation sections 15a–15d of the elastic board 14, and the displacement is made to perform, the compensation of the tangential tilt can be realized, without giving the load to the movable portion 8.

Moreover, the thing for which the tangential tilt is corrected by carrying out displacement of the wire springs 4a–4d other end edge to the longitudinal direction with high rigidity. The displacement of the other end edge can also be told to the end side as it is, it becomes what has the good flattery nature on the side of the movable portion 8 supported at the end side which are the wire springs 4a–4d or good responsibility, and the tangential-tilt compensation which can respond also to high-speed operation is attained.

A description will be given of another preferred embodiment of the present invention with reference to FIG. 41 through FIG. 43B.

In the present embodiment, the elements which are essentially the same as corresponding elements in the previous embodiment are designated by the same reference numerals, and a description thereof will be omitted.

Figure 40A:
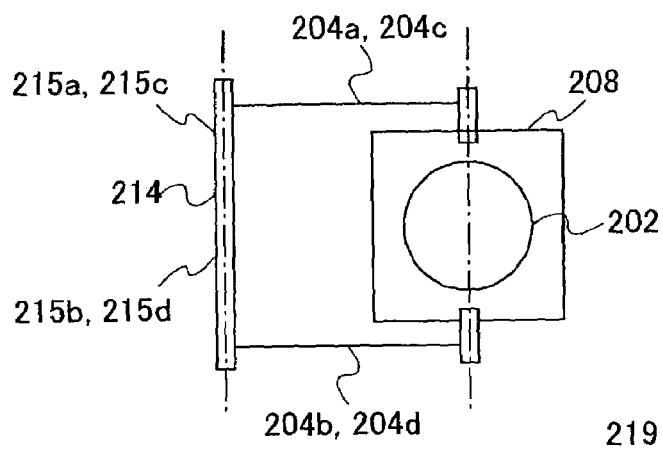
FIG. 40A, FIG. 40B, FIG. 40C and FIG. 40D are diagrams for explaining the tilt compensation operation in the objective lens drive apparatus of FIG. 36.
Figure 40B:
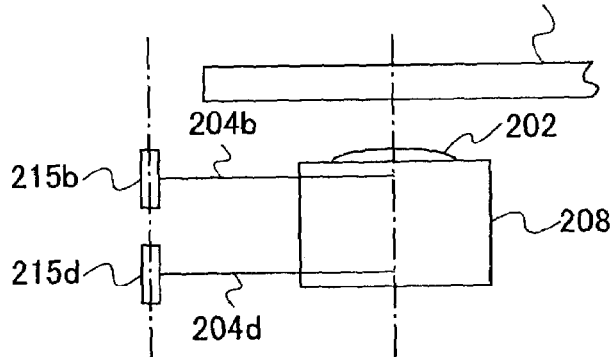
Figure 40C:
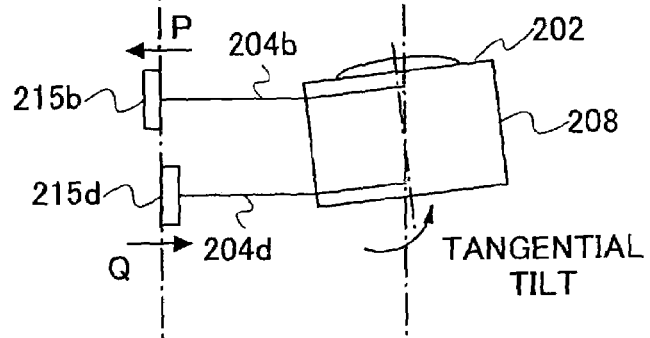
Figure 40D:
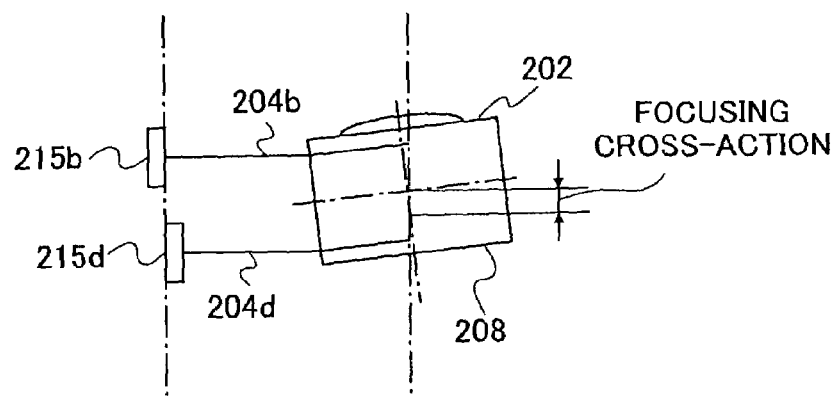
Figure 41:
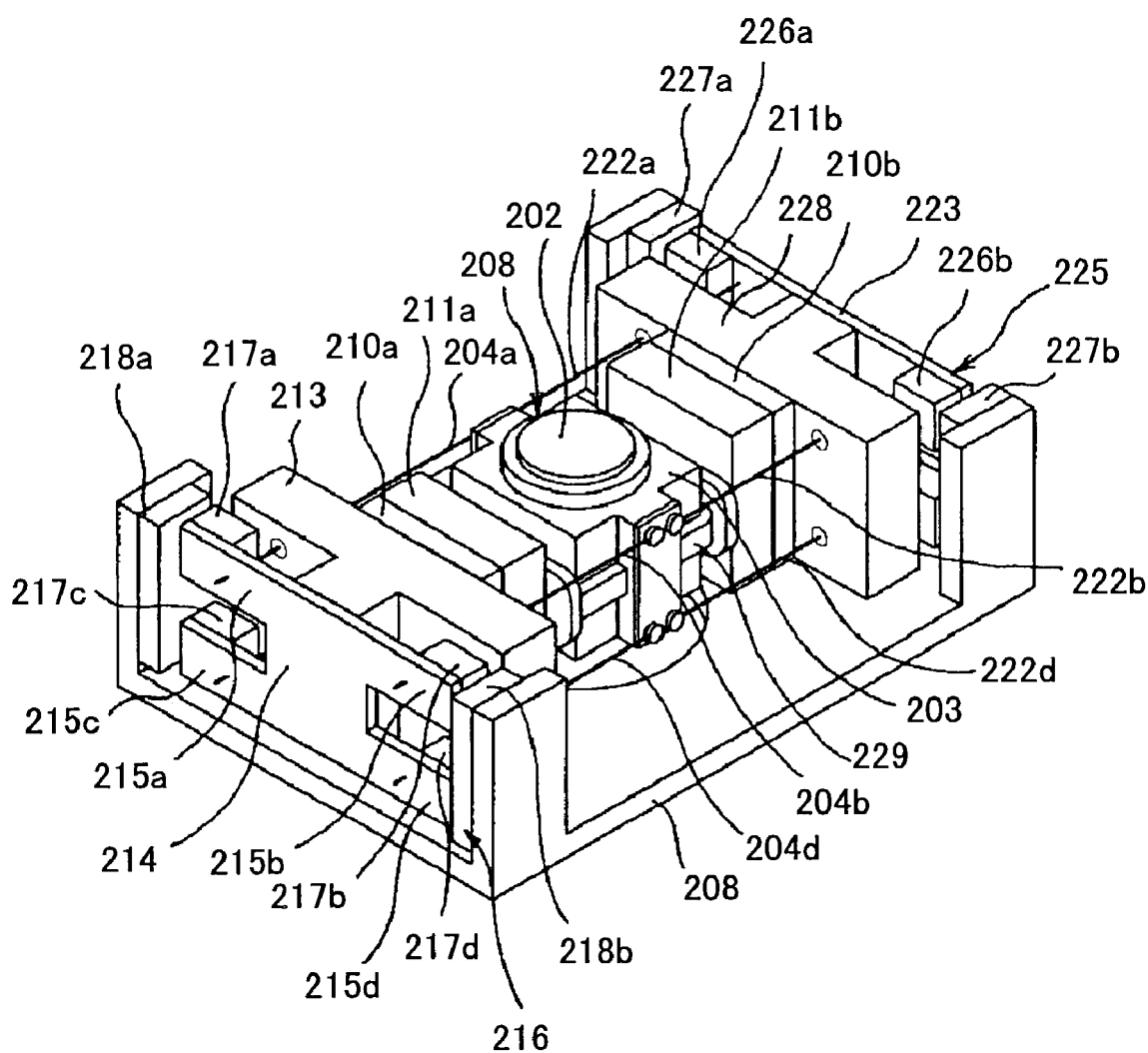
FIG. 41 is a perspective view of the objective lens drive apparatus of another preferred embodiment of the present invention.

When the movable portion 208 is supported by the cantilever type similar to the previous embodiment, in connection with the tangential drive, the present embodiment shows the composition in which the countermeasure is taken in consideration of the point that the objective lens 2 displaces in the direction of the focus as shown in FIG. 40D.

In the objective lens drive apparatus of the present embodiment, the objective lens 202 is considered as the composition of central arrangement, and the wire spring, the elastic board, and the drive source for tilt compensation are established in the both sides of the direction of the jitter of the movable portion 208 so that it may become symmetrical to the straight line of the tracking direction passing through the objective-lens center.

Specifically, in the present embodiment, the wire springs 204a–204d, the elastic board 214 (the deformation sections 215a–215d), the wire springs 222a–222d of the same composition corresponding to the source 216 (the tilt drive coils 217a–217d and the permanent magnets 218a and 218b) for the tilt drive compensation, the elastic board 223 (the deformation sections 224a–224d) and the source 225 (the tilt drive coils 226a–226d and the permanent magnets 27a and 27b) for the tilt drive compensation are provided in the reverse side in the direction of the jitter.

The stationary member 228 corresponding to the stationary member 213 is also provided.

Therefore, in the present embodiment, the wire springs 204a, 204b, 222a, and 222b are arranged on the first flat surface, and the wire springs 204c, 204d, 222c, and 222d are arranged on the second flat surface.

In addition, with the present embodiment, the yokes 210a and 210b and the magnets 211a and 211b for the drive are arranged in the both sides of the direction of the jitter on both sides of the objective lens 202, and the tracking coils 207a and 207b are also arranged in both sides.

But about the focusing coil, it replaces with the flat-surface coil-like focusing coils 206a and 206b, and the focusing coil 229 by which the wire is wound to the circumference of movable portion 208 in the shape of a cylinder is used.

Figure 42A:
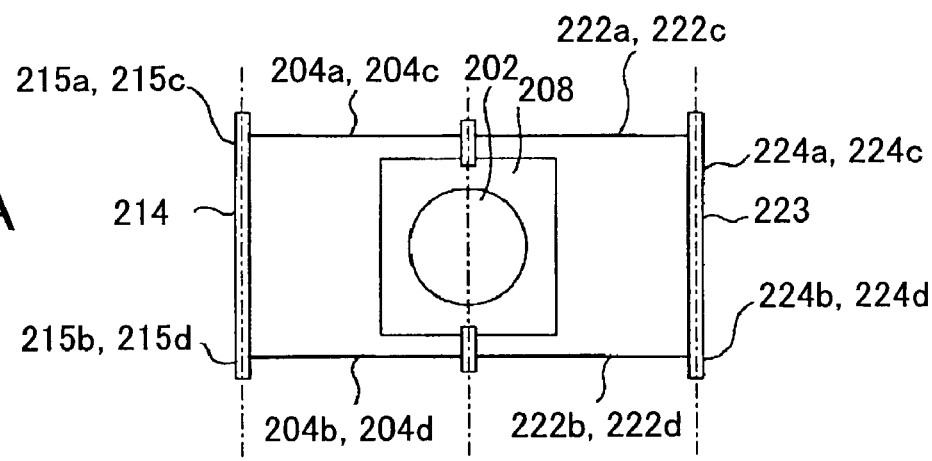
FIG. 42A, FIG. 42B and FIG. 42C are diagrams for explaining the tilt compensation operation in the objective lens drive apparatus of FIG. 41.
Figure 42B:
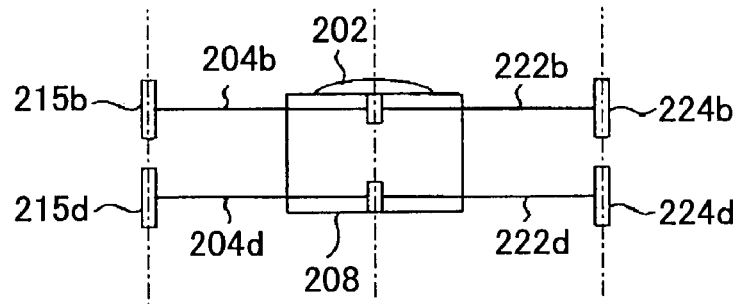

In such composition, tilt compensation operation of the objective lens 202 will be explained with reference to FIG. 42A–FIG. 42C.

Figure 42C:
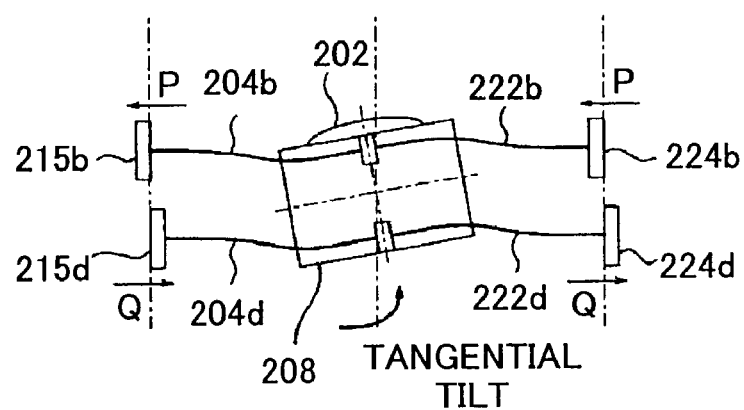

The displacement of the deformation sections 215a, 215b, 224a, and 224b which correspond by control to the coils 217a, 217b, 226a, and 226b for the tilt drive is made to carry out in the direction of P, as shown in FIG. 42C.

In the present embodiment, it displaces in the direction of P whose other end therefore, wire (also itself) and edge of the wire springs 204a, 204b, 222a, and 222b on the first flat surface currently fixed to the deformation sections 215a, 215b, 224a, and 224b are in the longitudinal direction.

On the other hand, the displacement of the deformation sections 215c, 215d, 224c, and 224d which correspond by control to the coils 217c, 217d, 226c, and 226d for the tilt drive is made to carry out in the direction of Q, as shown in FIG. 40C.

In the present embodiment, it displaces in the direction of Q whose wire springs on the second flat surface currently fixed to the deformation sections 215c, 215c, 224c, 224d, 204c, 204d, 222c, and 222d at the other end, the wire springs are in the longitudinal direction.

Namely, the wire springs arranged in the position (the first flat surface and second flat surface) where the directions of the focus differ in the wire springs 204a–204d and the other end edge (222a–222d).

That is, displacement is carried out so that the wire springs 204a and 204b, the wire springs 204c and 204d and the wire springs 222a and 222b, and the wire springs 222c and 222d may offset mutually to the longitudinal direction (the direction of the jitter).

As shown in FIG. 40C, rotation displacement of the wire springs 204a–204d and the movable portion 208 supported at the end 222a–222d side can be carried out to the tangential direction, and therefore, the compensation of the tangential tilt of the objective lens 202 is attained.

Of course, what is necessary is just to make the opposite direction offset at the time of the compensation of the tangential tilt of the opposite direction.

By the way, when it decomposes into every one side and such tangential-tilt compensation operation is considered, it comes to be shown in FIG. 43A and FIG. 43B.

Namely, considering tangential-tilt compensation operation on the side of the wire springs 204a–204d, as opposed to the direction cross action of the jitter occurring in the direction shown by the arrow head R to the objective lens 202 of the movable portion 208.

Considering tangential-tilt compensation operation on the side of the wire-springs 222a–222d, by the direction cross action of the focus occurring to the opposite direction as shown by the arrow head S to the objective lens 202 of the movable portion 208, and offsetting these direction cross actions of the focus.

The tangential-tilt compensation operation which the fluctuation of the direction of the focus does not produce as the whole is attained.

Moreover, in order to reduce the direction cross action of the jitter accompanying tangential-tilt compensation operation, in composition as shown in the form of the first operation, the amount of displacement to the direction of the jitter of the other end edge of the wire springs 204a and 204b of the direction near the principal-point side of the objective lens 202.

It is possible to make it bring the rotation center for tangential-tilt compensation close to the principal point of the objective lens 202 as much as possible by making it smaller than the amount of displacement to the direction of the jitter of the wire springs 204c and 204d of the one distant from the principal-point side of the objective lens 202 at the other end edge.

In this case, the thing for which reinforcement (rigidity) of the deformation sections 215a and 215b is made stronger than deformation sections 215c and 215d reinforcement (rigidity) although giving the difference to the amount can also be realized, according to adjustment of the amount of drive with the coils 217a, 217b, 217c, and 217d for the tilt drive, it can realize more easily.

Moreover, making the wire springs 204a and 204b, the wire springs 204c and 204d and the wire springs 222a and 222b, and the wire springs 222c and 222d offset in the direction of the jitter in tangential-tilt compensation operation, the other end edge of the wire springs 204a, 204b, 222a, and 222b may be position fixation.

Figure 44:
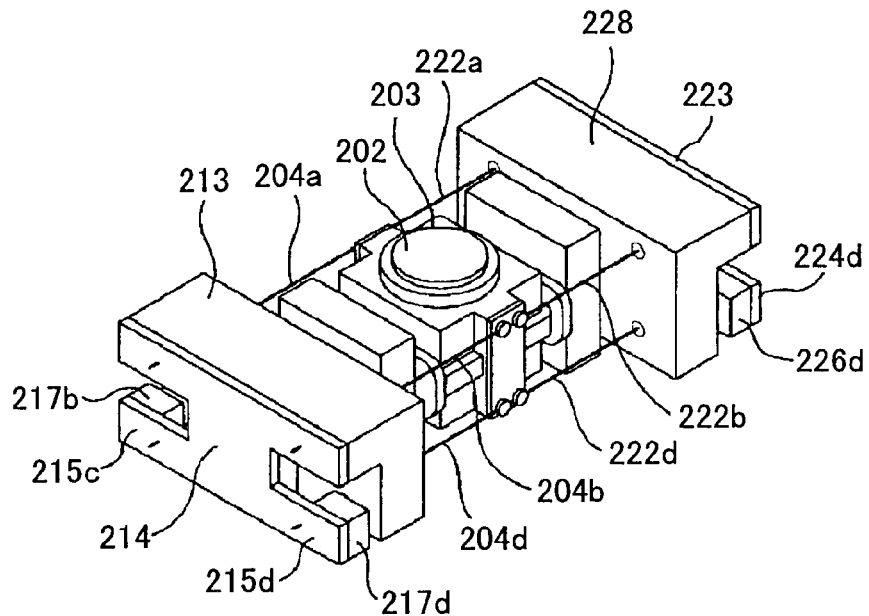
FIG. 44 is a diagram showing variation of the objective lens drive apparatus of FIG. 41.
Figure 45:
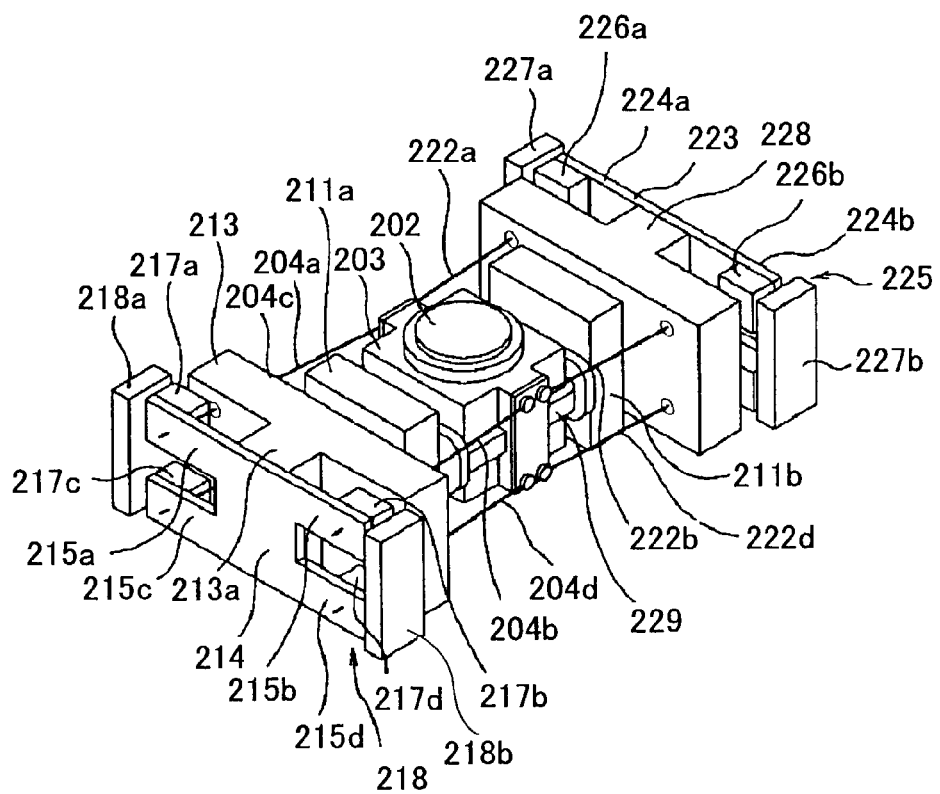
FIG. 45 is a perspective view of the objective lens drive apparatus of another preferred embodiment of the present invention.

FIG. 44 shows such modification in which it is the wire springs 204c, 204d, 222c and 222d at the other end edge, the deformation sections 215c, 215d, 224c and 224d, it fixes in the direction of the jitter (the longitudinal direction) possible, the coils 217c, 217d, 226c, and 226d for the tilt drive, and the permanent magnets 218a, 218b, 227a, and 227b.

In addition, the first flat surface of the imagination in which the wire springs 204a, 204b, 222a, and 222b are arranged is set as the position passing through the principal point of the objective lens 202.

The displacement only of the deformation sections 215c, 215d, 224c, and 224d is made to carry out in the direction of the jitter with the coils 217c, 217d, 226c, and 226d for the tilt drive, and the permanent magnets 218a, 218b, 227a, and 227b at the time of the compensation of the tangential tilt, and the displacement only of the wire springs other end edge is made to carry out in the direction of the jitter (the longitudinal direction).

The wire springs 204a, 204b, 222a and 222b side is fixed and it does not displace the movable portion 208 the near principal point of the objective lens 202, the rotation center carrying out the displacement for tangential-tilt compensation, the occurrence of the direction cross action of the jitter can be prevented.

In addition, this method is applicable similarly in the case of the single-sided support method like the previous embodiment of FIG. 36.

Next, a description will be given of another preferred embodiment of the present invention with reference to FIG. 45 and FIG. 46A–FIG. 46D.

The objective lens drive apparatus of the present embodiment takes into consideration not only the compensation of the tangential tilt but the compensation of the radial tilt.

The straight line of the direction of the jitter where the wire springs 204a–204d and 222a–222d pass along the objective-lens 202 optical axis by the objective lens drive apparatus of this embodiment on each flat surface although fundamental composition applies to the objective lens drive apparatus shown with the present embodiment, and it is made to incline and is arranged.

The configuration to which the wire springs 204a, 204b, 222a, and 222b are seen from the focus to the direction of the jitter which passes along the objective-lens 202 optical axis on the first flat surface, its moving-part 208 side is narrow, and the elastic board 214 and 223 side becomes large, and it is made to incline and is arranged.

In the direction of the focus to the direction of the jitter which is the same also as for the wire springs 204c, 204d, 222c, and 222d, and passes along the objective-lens 202 optical axis on the second flat surface, and elastic board 214 and 223 side becomes the movable portion side narrow widely, and it is made to incline and is arranged.

Also in such composition, it can carry out by the same control as the case where it mentions above, at the time of the compensation of the tangential tilt.

That is, the displacement of the deformation sections 215a, 215b, 224a, and 224b which correspond by control to the coils 217a, 217b, 226a, and 226b for the tilt drive as well as the case of FIG. 42C is made to carry out in the direction of P.

In connection with this, it displaces in the direction of P whose other end therefore, wire and edge of the wire springs 204a, 204b, 222a, and 222b on the first flat surface currently fixed to the deformation sections 215a, 215b, 224a, and 224b are in the longitudinal direction.

On the other hand, the displacement of the deformation sections 215c, 215d, 224c, and 224d which correspond by control to the coils 217c, 217d, 226c, and 226d for the tilt drive as well as the case of FIG. 42C is made to carry out in the direction of Q.

In connection with this, it displaces in the direction of Q whose wire springs on the second flat surface currently fixed to the deformation sections 215c, 215c, 224c, 224d, 204c, 204d, 222c, and 222d at the other end, the wire springs are in the longitudinal direction.

Namely, the wire springs arranged in the position (the first flat surface and second flat surface) where the directions of the focus differ in the wire springs 4a–4d and the other end edge (222a–222d).

That is, the displacement is carried out so that the wire springs 204a and 204b, the wire springs 204c and 204d and the wire springs 222a and 222b, and the wire springs 222c and 222d may offset mutually to the longitudinal direction (the direction of the jitter).

The rotation displacement of the wire springs 204a–204d and the movable portion 208 supported at the end 222a–222d side can be carried out to the tangential direction by this, and, therefore, the compensation of the tangential tilt of the objective lens 202 is attained.

On the other hand, the compensation operation of the radial tilt will be explained with reference to FIG. 46A–FIG. 46D.

In this case, what is necessary is just to carry out displacement relatively so that the groups may offset them mutually to the longitudinal direction, using as the group the wire springs arranged in the position where it is arranged in the position where the tracking directions differ, and the directions of the focus differ the other end edge of the wire spring fixed to the stationary-portion side.

For example, the displacement of the deformation sections 215a, 215d, 224b, and 224c which correspond by the control to the tilt drive coils 217a, 217d, 226b, and 226c is made to carry out in the direction of P, as shown in FIG. 46A–FIG. 46D.

In the present embodiment, it displaces in the direction of P whose other end therefore, wire and edge of the wire springs 204a, 204d, 222b, and 222c currently fixed to the deformation sections 215a, 215d, 224b, and 224c are also the direction of the jitter (the longitudinal direction).

On the other hand, the control to the coils 217b, 217c, 226a, and 226d for the tilt drive makes the displacement of the deformation sections 215b, 215c, 224a, and 224d which correspond as opposition control carry out in the direction of Q, as shown in FIG. 46B.

In the present embodiment, it displaces in the direction of Q whose wire springs which are being fixed to the deformation sections 215b, 215c, 224a, 224d, 204b, 204c, 222a, and 222d at the other end the wire springs are in the direction of the jitter (the longitudinal direction).

In such operation, each of the wire springs 204a–204d and 222a–222d is inclined, and the vector is as shown in FIG. 46A in the connection section to the movable portion 208, and the partial output to the tracking direction according to the direction is also produced.

As shown in FIG. 46C, when the partial-output component of this tracking direction is considered in the direction of the jitter, the moment to rotate in the radial tilt direction the movable portion 208 appears as shown in FIG. 46C. As shown in FIG. 46D, the compensation of the radial tilt of the movable portion 208 (the objective lens 202) is possible.

What is necessary is just to make the opposite direction drive at the time of the compensation of the radial tilt of the opposite direction.

Therefore, if it controls combining the compensation of the tangential tilt, the compensation of the tangential tilt of the objective lens 202 and the radial tilt will be attained.

For this reason, it carries out inclination arrangement in the symmetrical state to the straight line of the wire springs 204a–204d, the first which intersect perpendicularly 222a–222d in the direction of the focus, and the direction of the jitter which passes along the lens center on the second flat surface and is fixed to the stationary-portion side the one end edge the deformation sections 215a–215d and 224a–224d carrying out the sources 216 and 225, the compensation of the tangential tilt or the radial tilt can be realized without giving the load to the movable portion 208.

Moreover, the thing for which the compensation of the tangential tilt or the radial tilt is performed by carrying out displacement of the wire springs 204a–204d and the other end edge (222a–222d) to the longitudinal direction (the direction of jitter) with high rigidity.

It becomes what has the good flattery nature on the side of wire springs 204a–204d, 222a–222d the movable portion 208 supported at the end side or good responsibility, and the compensation of the tangential tilt which can respond also to high-speed operation, or the radial tilt is attained.

In addition, although cross action of the tracking direction may occur in the objective lens drive apparatus of the present embodiment when the positions of the center of rotation of the movable portion 208 and the principal point of the objective lens 202 differ at the time to the radial direction.

As the countermeasure, the wire springs 204a, 204b, 222a, 222b are made to arrange in the first direction near the principal point of the objective lens 202, and the displacement of the wire springs 204c, 204d, 222c, and 222d in the longitudinal direction are made to arrange in the second direction where the amount is distant from the principal point of the objective lens 202 in the longitudinal direction if it is made to become smaller than the amount.

Displacement operation for radial tilt compensation can be made to be able to perform as much as possible by the ability setting near the principal point of the objective lens 202 as the rotation center, and the direction cross action of the track can be made to mitigate.

This is the same also about the direction cross action of the jitter at the time of tangential-tilt compensation.

It is possible to make it the wire springs 204a, 204b, 222a and 222b the amount of displacement in the longitudinal direction become small as means for this by adjustment of the amount of drives by the drive sources 216 and 225 for tilt compensation.

The degree of slope angle of the wire springs 204a, 204b, 222a, and 222b made to arrange on the first direction near the principal point of the objective lens 202 is made smaller than the degree of slope angle of the wire springs 204c, 204d, 222c, and 222d made to arrange on the second direction distant from the principal point of the objective lens 202.

Even if it is the amount of the same drive, it is possible to make the wire springs 204a, 204b, 222a and 222b arranged with the amount of displacement in the longitudinal direction become small.

It is possible to make it arranged with the degree of slope angle=0. In the extreme example, the wire springs 204a, 204b, 222a, and 222b are made to arrange on the first direction near the principal point of the objective lens 202 in parallel.

Moreover, in compensation operation of the radial tilt or the tangential tilt, as long as it is relative to make the wire spring offset in the direction of the jitter, it may be good, for example, the other end edge of the wire springs 204a, 204b, 222a, and 222b may be position fixation.

It is fixed in the direction of the jitter (the longitudinal direction) with possible displacement by the deformation sections 215c, 215d, 224c and 224d. Namely, in the example shown in FIG. 44 applying correspondingly the wire springs 204c, 204d, 222c and 222d on the other end edge is possible.

The displacement drive is enabled with the coils 217c, 217d, 226c, and 226d for the tilt drive, and the permanent magnets 218a, 218b, 227a, and 227b.

It is possible to make it set the first flat surface of the imagination in which the wire springs 204a, 204b, 222a, and 222b are arranged as the position passing through the principal point of the objective lens 202.

According to this, displacement operation the object for tangential-tilt compensation and for radial tilt compensation can be made to be able to perform by the ability setting near the principal point of the objective lens 202 as the rotation center, and, therefore, the direction cross action of the jitter and the direction cross action of the track can be prevented.

In addition, in the present embodiment, the example of the both-sides support method has been explained to the movable portion 208 according to the previous embodiment, and in the case of the single-sided support method according to the previous embodiment, it is applicable similarly.

Moreover, it is possible to make the wire springs 204a–204d and 222a–222d incline in the shape of a character to which it sees in the direction of the focus conversely although the wire springs 204a–204d and 222a–222d are made to incline so that it may see in the direction of the focus with this embodiment and the elastic board 214 and 223 side may become the movable portion 208 side narrow widely, and the elastic board 214 and 223 side.

Moreover, although the example which attaches the coil in the elastic boards 214 and 223 side, and attaches the magnet in the group base 209 side is explained the drive sources 216 and 225 for tilt compensation with the present embodiment, the coil is attached in the group base 209 side, and it is possible to make it attach the magnet in the elastic boards 214 and 223 side conversely.

Furthermore, in order to reduce components mark and to raise attachment nature, the elastic boards 214 and 223 may be formed with the print coil, or you may constitute so that the magnetic leakage flux of the magnets 211a and 211b for the drive for the moving-part drive may pierce through the coil for the tilt drive.

Figure 47:
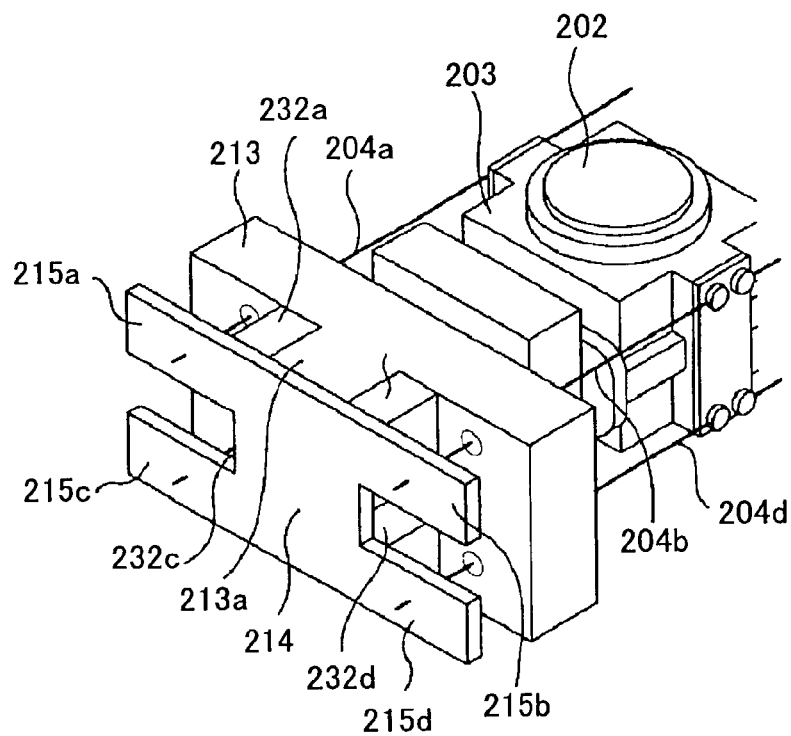
FIG. 47 is a diagram showing variation of the tilt compensation drive unit.

Moreover, the drive source for tilt compensation is provided as well as in the combination of such a magnet and a coil as in FIG. 47.

The piezoelectric devices 232a–232d made to intervene individually between each deformation sections 215a–215d of the elastic board 214 and the stationary member 213 are used as a drive source for tilt compensation.

Displacement of the each deformation sections 215a–215d leading edge is carried out, and it may be made to carry out displacement of the wire springs 204a–204d other edge to the longitudinal direction by the slight drive of the piezoelectric devices 232a–232d. According to this, highly precise tilt compensation is attained.

Figure 48:
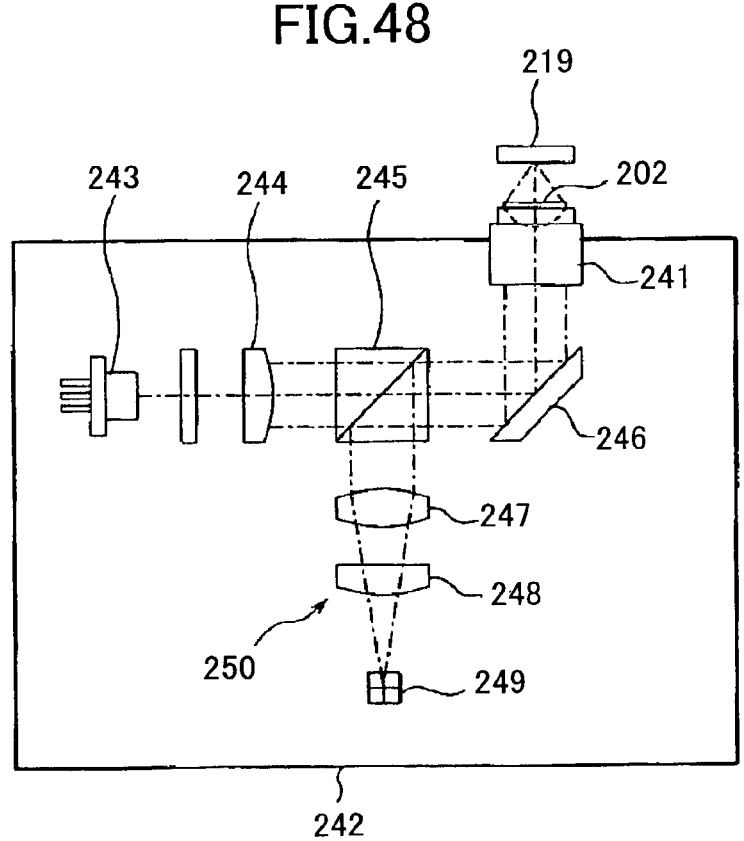
FIG. 48 is a diagram showing an optical pickup device in which the objective lens drive apparatus of one embodiment of the present invention is provided.

A description will be given of another preferred embodiment of the present invention wither reference to FIG. 48.

In the present embodiment, the example of application to the optical pickup device 242 equipped with the objective lens drive apparatus of one preferred embodiment of the present invention is shown.

The divergent light, output from the light source 243, such as a semiconductor laser carried in the optical pickup device 242, is converted into the parallel light by the collimator lens 244.

Then, it passes along the beam splitter 245 and the starting mirror 246 (it is equivalent to the starting prism 220) bends.

Incidence of the parallel light bent by the starting mirror 246 is carried out to the objective lens 202 of the objective lens drive apparatus 241 carried in the optical pickup device 242, and it forms the spot on the optical disk 219.

After the reflected light of the spot changes the direction and polarity which came by the beam splitter 245 and passes along the condenser lens 247 and the rod-like lens 248, it is incident to the 4-division light-receiving component 249.

It arranges so that the reflected light of the spot on the optical disk 219 may carry out incidence to the 4-division light-receiving component 249.

The information on the optical disk 219 can be acquired by making the objective lens 202 follow to the optical disk 219 by carrying out based on the signal acquired with the 4-division light-receiving component 249, and driving the focusing coils 206a and 206b and the tracking coils 207a and 207b of the objective lens drive apparatus 241.

The light-receiving optical system 250 is constituted by the condenser lens 247, the rod-like lens 248, and the 4-division light-receiving component 249.

Furthermore, the objective-lens control drive (not shown) which outputs the drive signal over the objective lens drive apparatus 241 based on the received light signal of the 4-division light-receiving component 249 is also provided.

The objective lens drive apparatus 241 in the optical pickup device 242 is one preferred embodiment of the present invention described above, and the objective lens 202 is made to follow to the optical disk 219 by the objective lens drive apparatus 241 as mentioned above and the information on the optical disk 219 is read. The control of the influence of the tangential tilt or the radial tilt of the objective lens drive apparatus 241 is attained at the time of the objective-lens drive.

A description will be given of another preferred embodiment of the present invention with reference to FIG. 49 and FIG. 50.

In the present embodiment, the example of application to the optical disk drive which incorporates the optical pickup device 242 mentioned above is shown.

Figure 49:
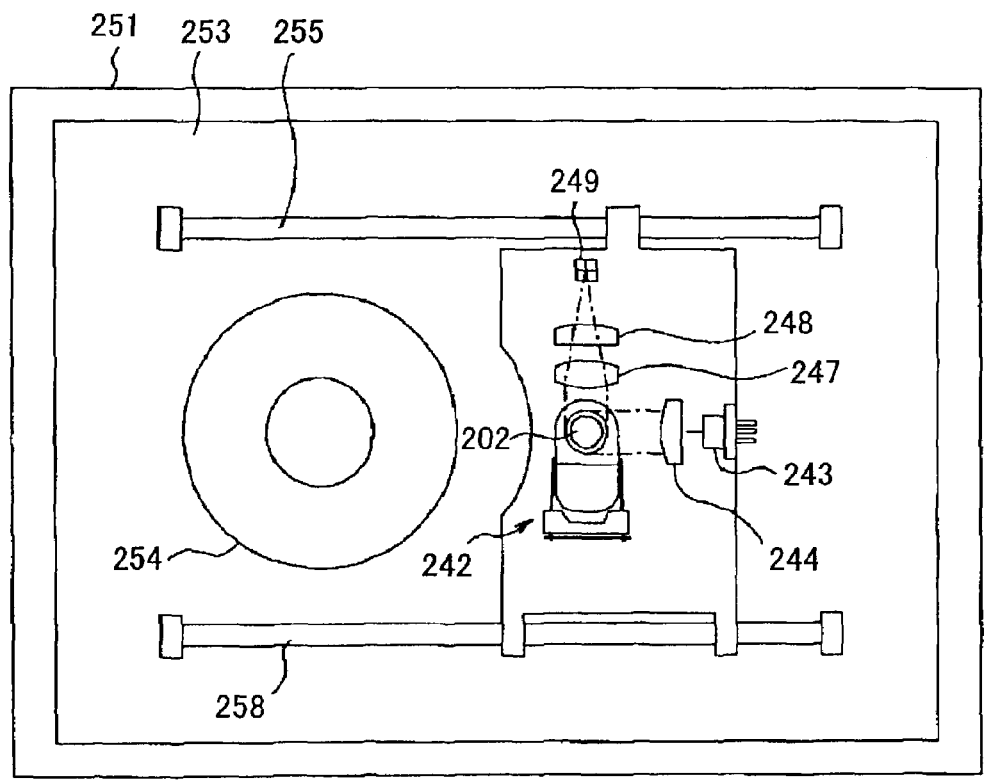
FIG. 49 is a diagram showing an optical disk drive in which the optical pickup device of FIG. 48 is provided.
Figure 50:
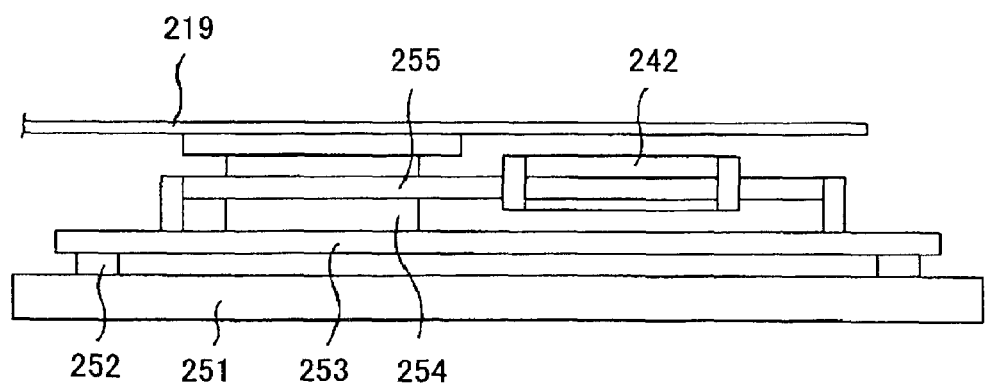
FIG. 50 is a front view of the optical disk drive of FIG. 49.

As shown in FIG. 49 and FIG. 50, the pickup module base 253 is installed in the housing 251 of the optical disk drive through the rubber cushion 252.

The spindle motor 254 as a rotation drive system which rotates the optical disk 219 is fixed to the pickup module base 253.

Moreover, the optical pickup device 242 is provided with the seek rail 255 attached in the pickup module base 253.

Movement to radial of the optical disk 219 of the optical pickup device 242 is enabled in the seek rail 255.

The optical pickup device 242 carried in the optical disk drive concerned is the optical pickup device which is mentioned above and which is explained with the form of the fourth operation, and is the optical pickup device in which few control of the influence of the tangential tilt or the radial tilt is possible at the time of the objective-lens drive. Therefore, when it is easy to be influenced of the tilt like DVD, the convenient optical disk drive can be offered.

Figure 51:
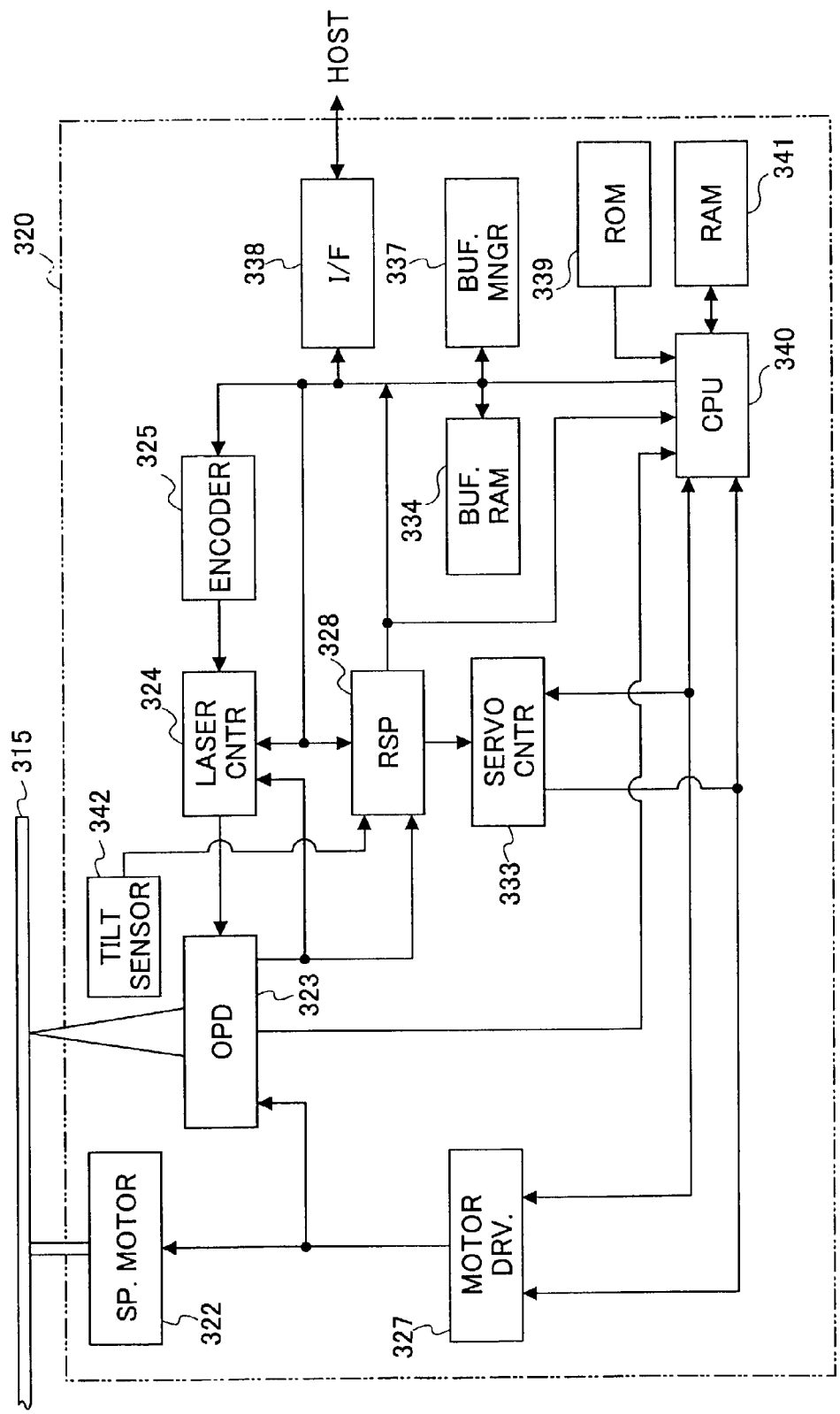
FIG. 51 is a block diagram of an optical disk drive to which the objective lens drive apparatus of one embodiment of the present invention is applied.

Next, FIG. 51 shows the composition of the optical disk drive of another preferred embodiment of the present invention.

The optical disk drive 320 of FIG. 51 includes the spindle motor 322 for carrying out the rotation drive of the optical disk 315, the optical pickup device (OPD) 323, the laser control circuit 324, the encoder 325, the motor driver 327, the reproduction signal-processing circuit (RSP) 328, the servo controller 333, the buffer RAM 334, the buffer manager 337, the interface 338, the ROM 339, the CPU 340, the RAM 341, and the tilt sensor 342, etc.

In addition, the arrow head in FIG. 51 does not show the flow of the typical signal or information, and does not express connection-related all of each block.

Moreover, in the present embodiment, the information storage medium based on the specification of the DVD (digital versatile disc) system as an example is used as the optical disk 315.

The optical pickup device 323 is equipment for receiving the reflected light from the record surface of the optical disk 315 while irradiating laser light to the predetermined position of the recording surface of the optical disk 315 in which the track in the spiral or concentric-circle formation is formed.

Figure 52:
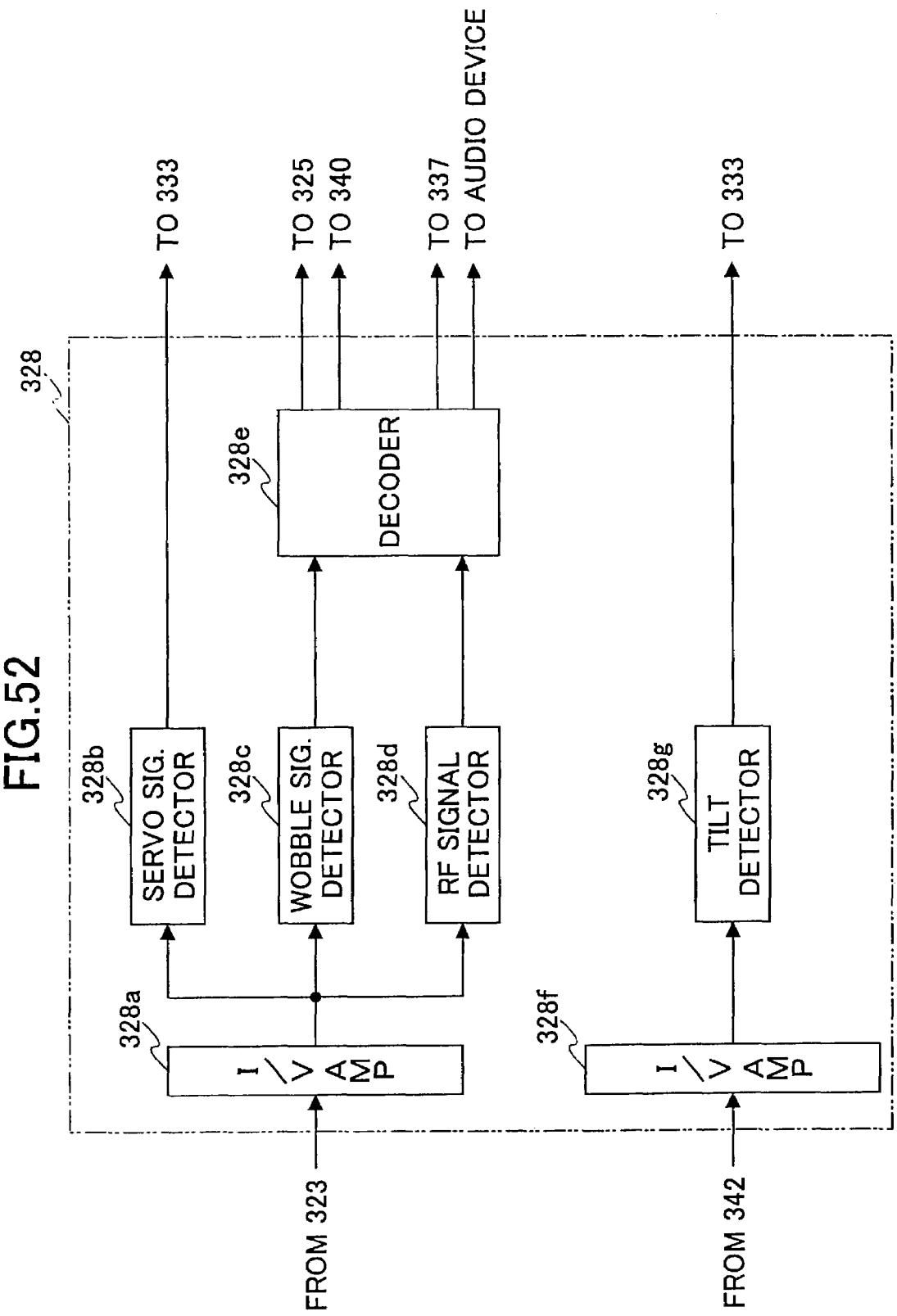
FIG. 52 is a block diagram of the reproduced signal processing circuit in the optical disk drive of FIG. 51.

The reproduction signal processing circuit 328 includes the first I/V amplifier 328a, the servo signal detector 328b, the wobble-signal detector 328c, the RF signal detector 328d, the decoder 328e, the second I/V amplifier 328f, and the tilt detector 328g, as shown in FIG. 52.

The first I/V amplifier 328a performs amplification with a predetermined gain while it changes into the voltage signal the current signal which is the output signal of the optical pickup device 323.

The servo signal detector 328b detects servo signals (the focusing error signal, tracking error signal, etc.) based on the voltage signal from the first I/V amplifier 328a. The servo signal detected is outputted to the servo controller 333.

The wobble-signal detector 328c detects the wobble signal based on the voltage signal from the first I/V amplifier 328a.

The RF signal detector 328d detects the RF signal based on the voltage signal from the first I/V amplifier 328a.

The decoder 328e extracts ADIP (Address In Pregroove) information, the synchronizing signal, etc. from the wobble signal detected by the wobble-signal detector 328c.

The ADIP information extracted is outputted to the CPU 340, and the synchronizing signal is outputted to the encoder 325.

Moreover, after the decoder 328e performs recovery processing, error-correction processing, etc. to the RF signal detected by the RF signal detector 328d, it is stored in the buffer RAM 334 through the buffer manager 337 as reproduction data.

In addition, when reproduction data are music data, it is outputted to the external audio instrument.

The second I/V amplifier 328f performs amplification with a predetermined gain while it changes into the voltage signal the current signal which is the output signal of the tilt sensor 342.

The tilt detector 328g detects the information about the media tilt based on the voltage signal from the second I/V amplifier 328f. The information about the media tilt detected is outputted to the servo controller 333 as the tilt information signal.

Referring back to FIG. 51, the servo controller 333 generates the various control signals for controlling the optical pickup device 323 based on the servo signal, and outputs them to the motor driver 327.

Moreover, the servo controller 333 generates the tilt compensation signal for correcting the inclination of the record side based on the tilt information signal, and outputs it to the motor driver 327.

The motor driver 327 outputs the drive signal to the optical pickup device 323 based on the control signal and tilt compensation signal from the servo controller 333.

Moreover, the motor driver 327 outputs the drive signal to the spindle motor 322 based on directions of CPU 340.

The buffer manager 337 notifies I/O of the data to the buffer RAM 334 to CPU 340 that it manages and the accumulated amount of data turns into the predetermined amount.

It is written in synchronizing with the synchronizing signal from the reproduction signal processing circuit 328, and outputs the signal to the laser control circuit 324 while the encoder 325 takes out the data accumulated at the buffer RAM 334 based on directions of CPU 340 through the buffer manager 337, performs abnormal conditions of data, addition of the error correction code, etc. and generates the write-in signal to the optical disk 315.

The laser control circuit 324 controls the output of the laser light irradiated to the optical disk 315 based on directions of the write-in signal from the encoder 325, and the CPU 340.

The interface 338 is the bidirectional communication interface with the host (for example, personal computer), and is based on the standard interfaces, such as ATAPI (AT Attachment Packet Interface) and SCSI (Small Computer System Interface).

The program described in code decipherable by the CPU 340 is stored in the ROM 339.

And the CPU 340 saves data required for control etc. temporarily at the RAM 341 while controlling operation of each part of the above according to the program stored in the ROM 339.

Next, the composition of the optical pickup device 323 etc. is explained using FIG. 53–FIG. 61.

Figure 53:
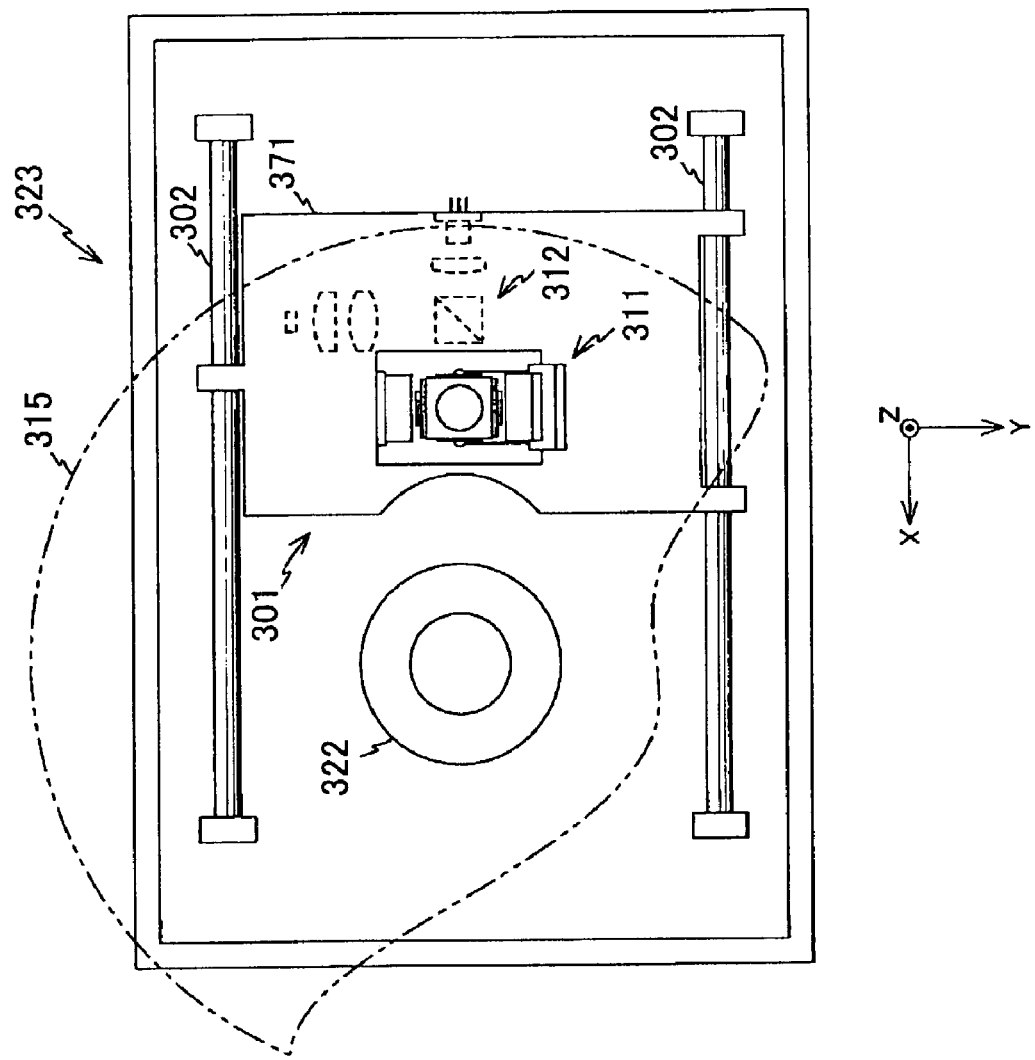
FIG. 53 is a diagram showing the optical pickup device in the optical disk drive of FIG. 51.

The optical pickup device 323 is the spindle motor as shown in FIG. 53.

The pickup body 301 which receives the reflected light from the record side while irradiating laser light to the record side of the optical disk 315 which is rotating by 322, the two seek rails 302 which guide movement to the X-axis direction (space longitudinal direction) of the pickup body 301 while holding this pickup body 301, and the pickup body.

It is constituted including the seeking motor 301 (not shown) for driving to the X-axis direction.

The pickup body 301 is stored in the center of housing 371 and this housing 371, and includes the light-beam output system 312 which acts in the direction perpendicular to the record side of the optical disk 315 as the outgoing light beam whose wavelength is 660 nm, and the focusing system 311 which focuses the light beam from the light-beam output system 312 in the predetermined position of the recording surface of the optical disk 315.

Figure 54:
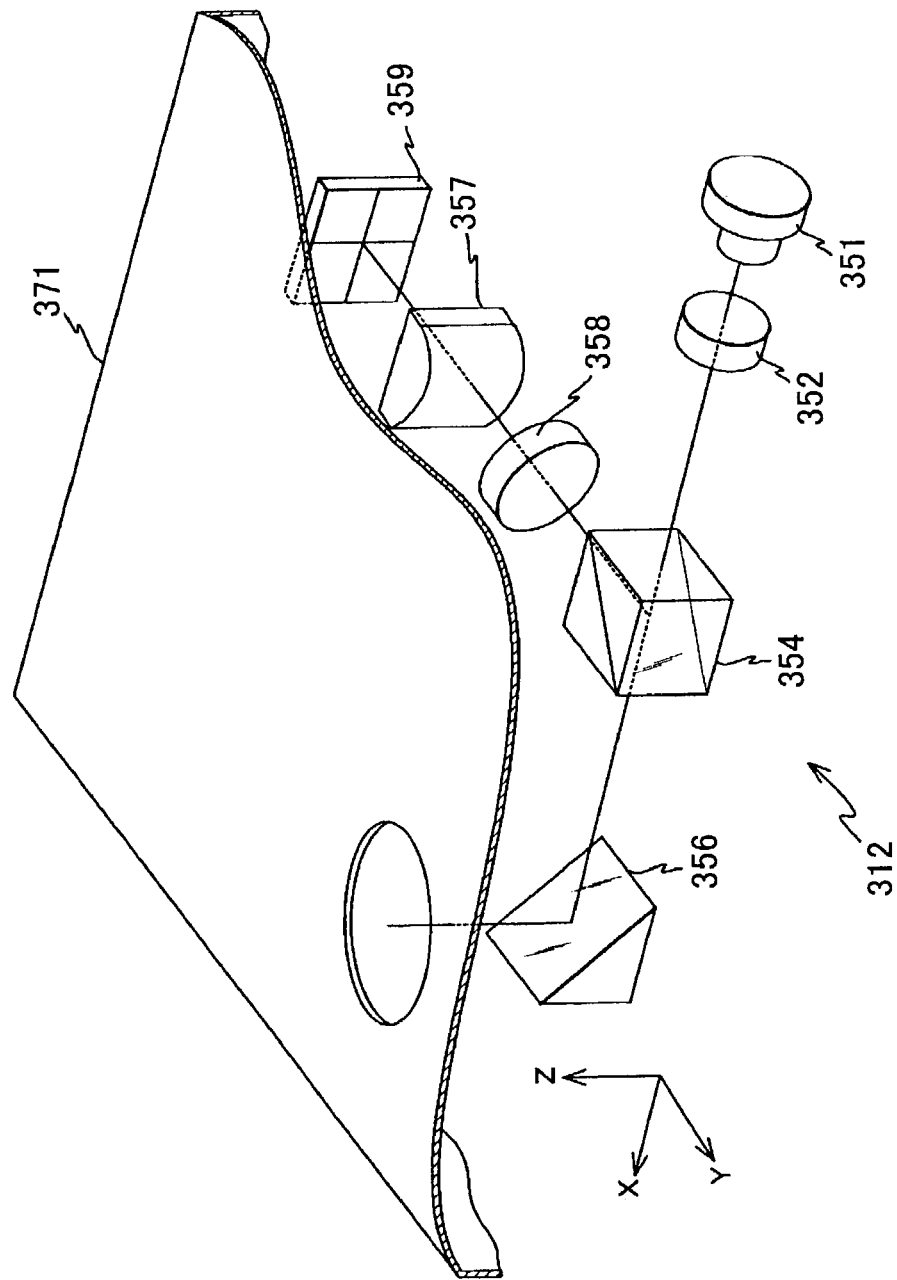
FIG. 54 is a diagram showing the outgoing light beam optical system in the optical pickup device of FIG. 53.

The light-beam output system 312 is equipped with the light source unit 351, the coupling lens 352, the beam splitter 354, the starting mirror 356, the detection lens 358, the cylindrical lens 357, and the photodetector 359, as shown in FIG. 54.

The light source unit 351 is equipped with the semiconductor laser (not shown) as a light source which emits light in the light beam whose wave length is 660 nm. The light source unit 351 is fixed to the housing 371 so that the direction with the maximum intensity of the outgoing light beam output from the light source unit accords with the direction of +X.

The coupling lens 352 is arranged at the +X side of the light source unit 351, and makes the outgoing beam abbreviation parallel light.

The beam splitter 354 is arranged at the +X side of the coupling lens 352, and branches the reflected light (return light beam) from the record side of the optical disk 315 in the direction of −Y.

The starting mirror 356 is arranged at the +X side of the beam splitter 354, and changes the direction with the maximum intensity of the outgoing beam through the beam splitter 354 into the direction of +Z.

The direction with the maximum intensity carries out incidence of the outgoing beam changed into +Z direction to the focusing system 11 through the opening of the housing 371 by the starting mirror 356.

The detection lens 358 is arranged at the −Y side of the beam splitter 354, and condenses the return light beam which branched in the direction of −Y by the beam splitter 354.

The cylindrical lens 357 is arranged at the −Y side of the detection lens 358, and operates orthopedically the return light beam condensed with the detection lens 358.

The photodetector 359 is arranged at the −Y side of the cylindrical lens 357, and receives the return light beam orthopedically operated by the cylindrical lens 357 in respect of the the received light.

The 4-division light-receiving component is used for the photodetector 359, and the signal according to the amount of the received light is outputted to the reproduction signal processing circuit 328 from each light-receiving component, respectively.

That is, while leading the light beam which acted as Idei from the semiconductor laser to the focusing system 11, the optical path length for leading the return light beam to the photodetector 359 is formed in the center of housing 371.

Figure 55:
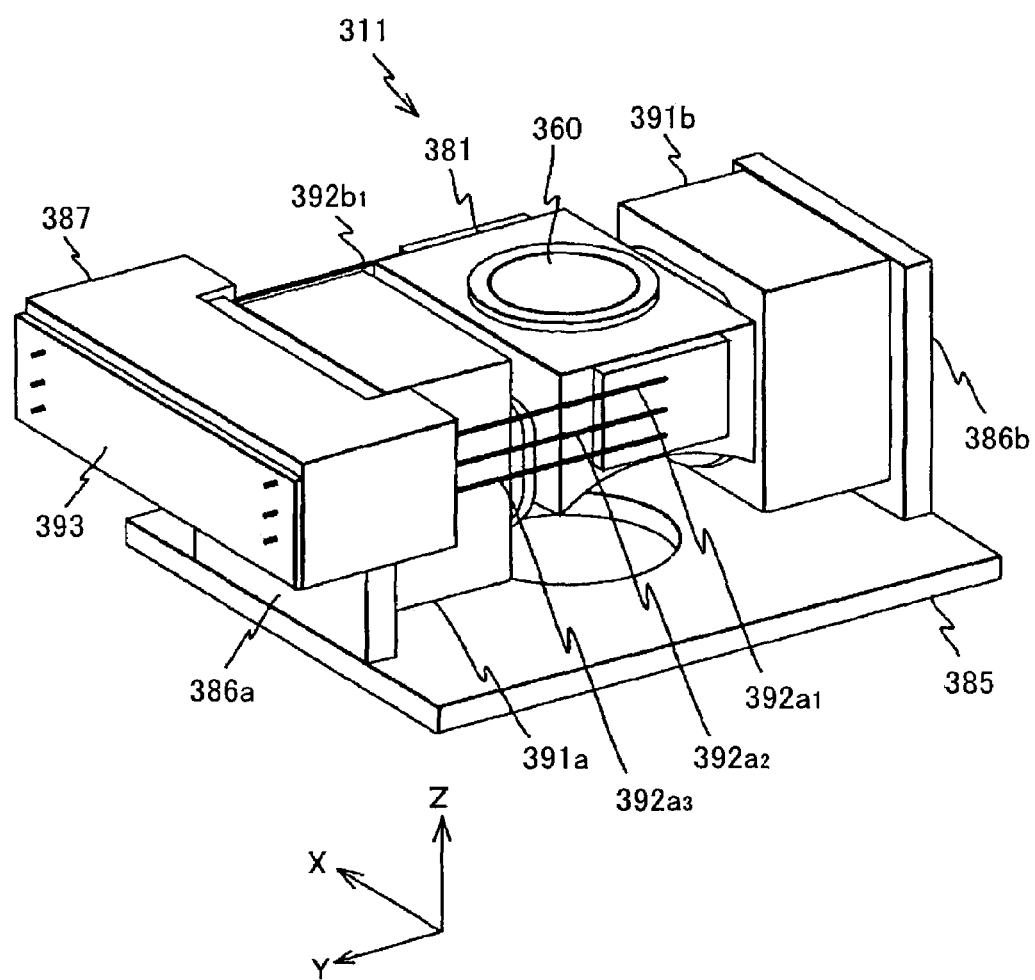
FIG. 55 is a diagram showing the focusing system in the optical pickup device of FIG. 53.
Figure 56A:
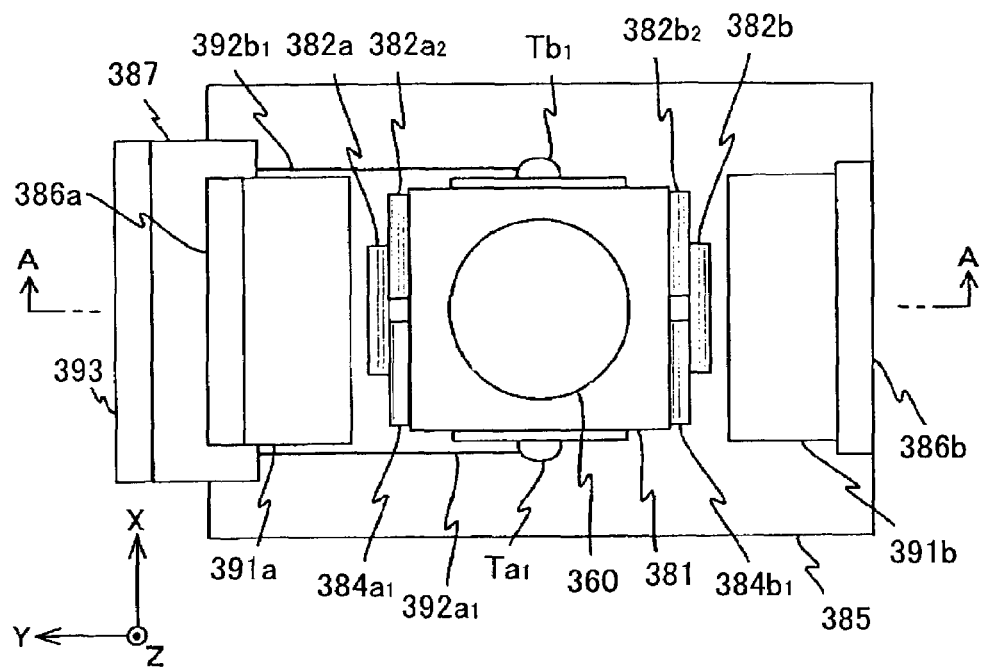
FIG. 56A and FIG. 56B are diagrams showing the focusing system in the optical pickup device of FIG. 53.
Figure 56B:
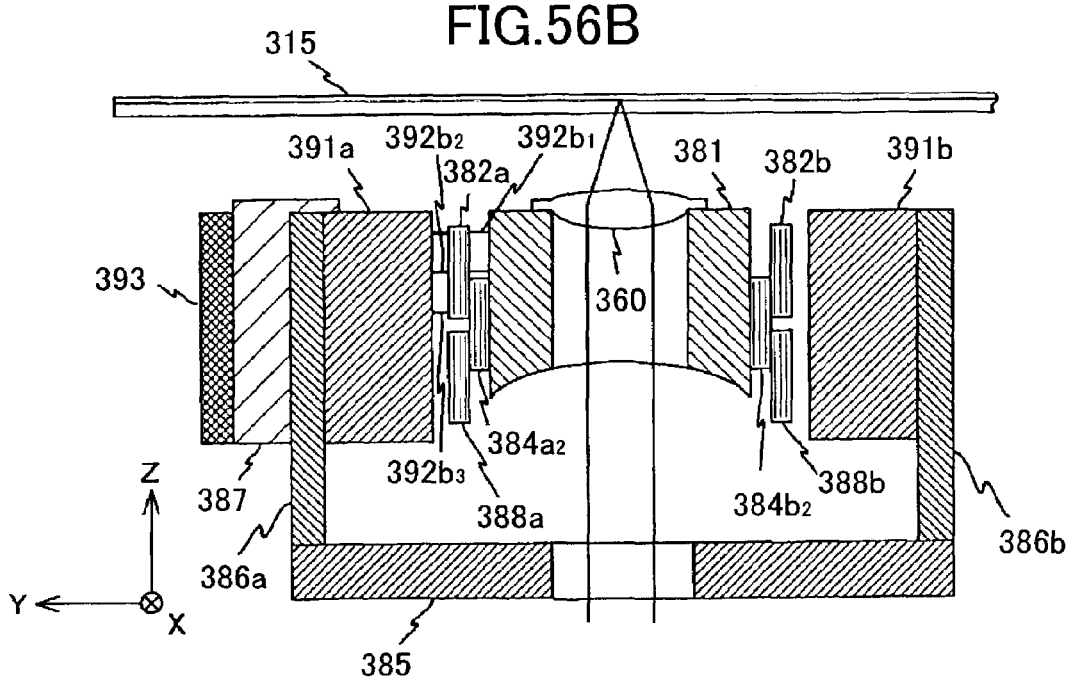

FIG. 55 shows the focusing system in the optical pickup device of FIG. 53. FIG. 56A shows the focusing system in the optical pickup device of FIG. 53. FIG. 56B is a cross-sectional view of the focusing system taken along the line A—A in FIG. 55A.

As shown, the focusing system 311 includes the objective lens 360, the lens holder 381 as a lens holding member, the first tracking coil 382a, the second tracking coil 382b, the first focusing coil 384a1, the second focusing coil 384a2, the third focusing coil 384b1, the fourth focusing coil 384b2, the base plate 385, the first yoke 386a, the second yoke 386b, the stem 387 as a stationary member, the first radial tilt coil 388a, the second radial tilt coil 388b, the first permanent magnet 391a, the second permanent magnet 391b, the six line springs (referred to as 392a1, 392a2, 392a3, 392b1, 392b2, and 392b3) that have the conductivity as an elastic member, and the board 393.

The base plate 385 is a rectangular plate-like member and the base plate is provided with the opening at the center portion thereof, which has the shape corresponding to that of the opening of the housing 371. The longitudinal direction of the base plate 385 corresponds to the Y-axis direction, and the side surface of the base plate 385 is attached to the surface of the housing 371 on the side of +Z direction so that the opening may lap with the opening of the housing 371. In addition, the base plate 385 serves as a yoke for forming the magnetic circuit.

The first yoke 386a and the second yoke 386b are the plate-like members having the same configuration, and they have the predetermined positional relation and are fixed to the base plate 385. The first yoke 386a is arranged at +Y side edge section of the base plate 385, and the second yoke 386b is arranged at −Y side edge section of the base plate 385.

The stem 387 is the block-like member, and is attached to the surface on the side of +Y of the first yoke.

The through holes extending in the Y-axis direction are formed in this stem 387 at the three locations near the side edge of +X and at the three locations near the side edge of −X, respectively.

The first permanent magnet 391a and the second permanent magnet 391b are the block-like permanent magnets having the same shape mostly.

The first permanent magnet 391a is attached to the surface on the side of −Y of the first yoke, and the second permanent magnet 391b is attached to the surface on the side of +Y of the second yoke.

That is, the surface on the side of −Y of the first permanent magnet 391a and the surface on the side of +Y of the second permanent magnet 391b confront each other with respect to the Y-axis direction.

Figure 57A:
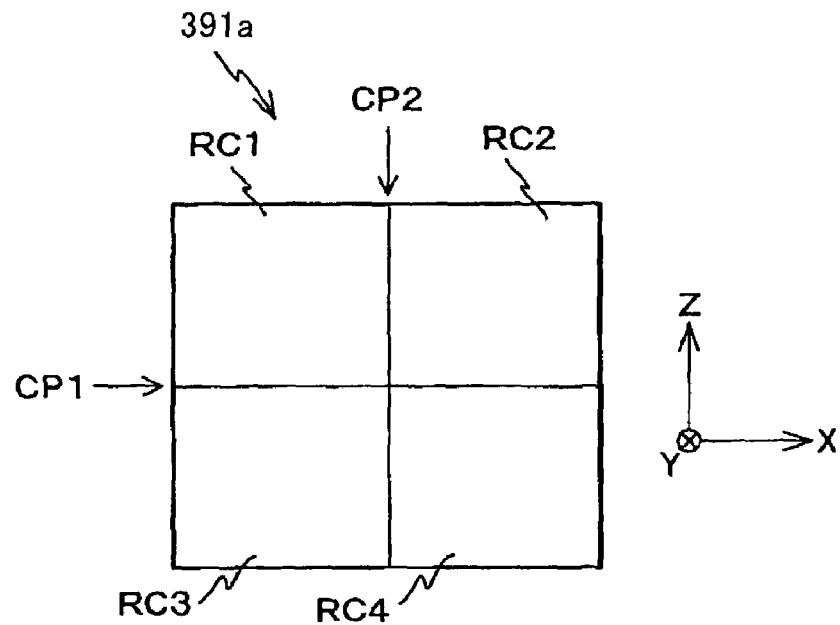
FIG. 57A and FIG. 57B are diagrams showing the first and second magnet portions in the optical pickup device of FIG. 53.

The surface on the side of −Y of first permanent magnet 391a is divided into the four ranges, each having equal magnitude, by the magnetization limits CP1 of the X-axis direction and the magnetization limits CP2 of the Z-axis direction as shown in FIG. 57A.

In the present embodiment, the range RC1 is indicated as the range which is located on the +Z side of the magnetization limits CP1 and on the −X side of the magnetization limits CP2. The range RC2 is indicated as the range which is located on the +Z side of the magnetization limits CP1 and on the +X side of the magnetization limits CP2. The range RC3 is indicated as the range which is located on the −Z side of the magnetization limits CP1 and on the −X side of the magnetization limits CP2. The range RC4 is indicated as the range which is located on the −Z side of the magnetization limits CP1 and on the +X side of the magnetization limits CP2. In addition, the adjacent ranges have the reversed polarity mutually.

Figure 57B:
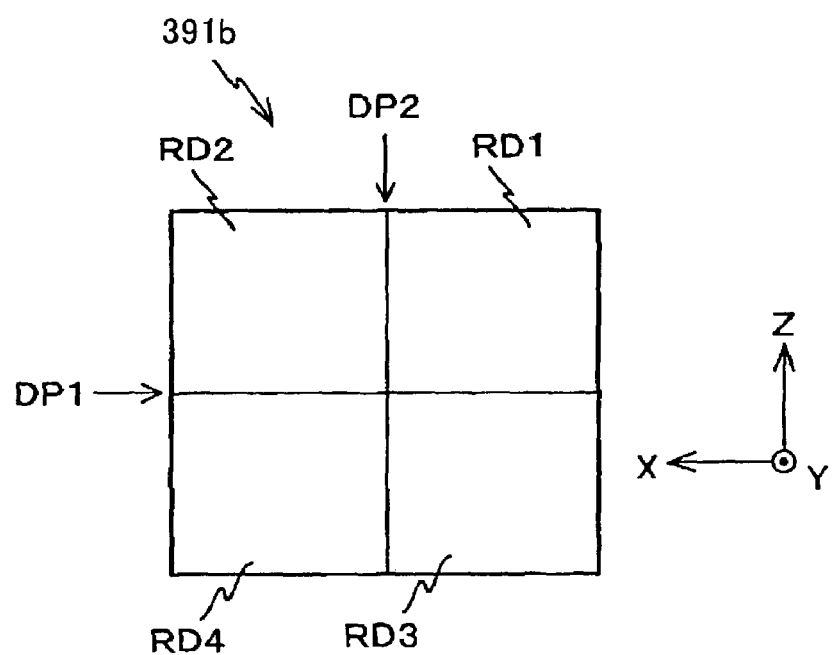
Figure 58A:
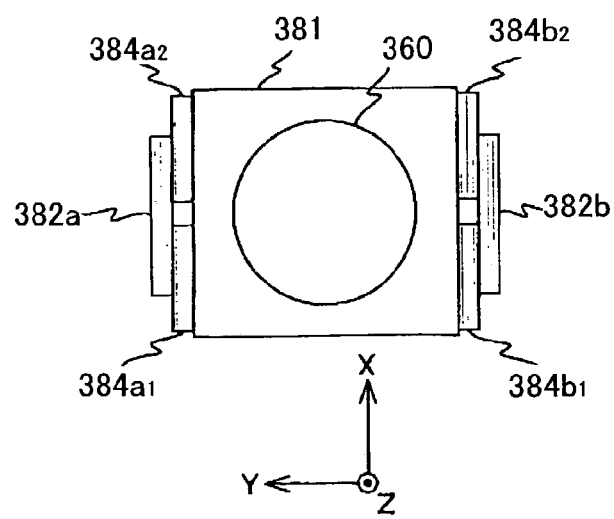
FIG. 58A, FIG. 58B, FIG. 58C and FIG. 58D are diagrams showing the respective coils for driving the lens holder.
Figure 58B:
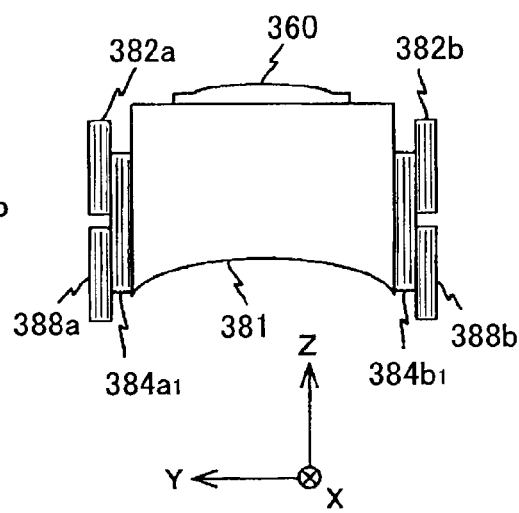
Figure 58C:
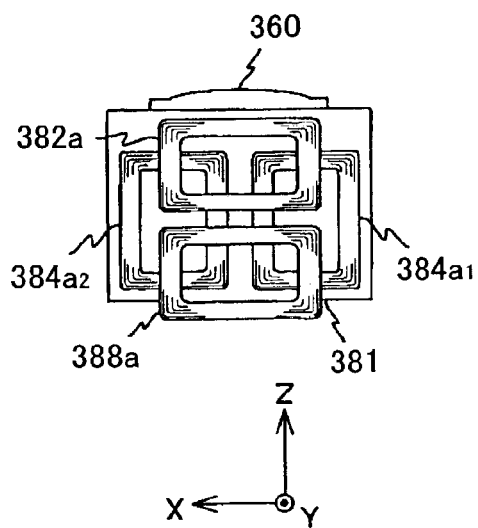
Figure 58D:
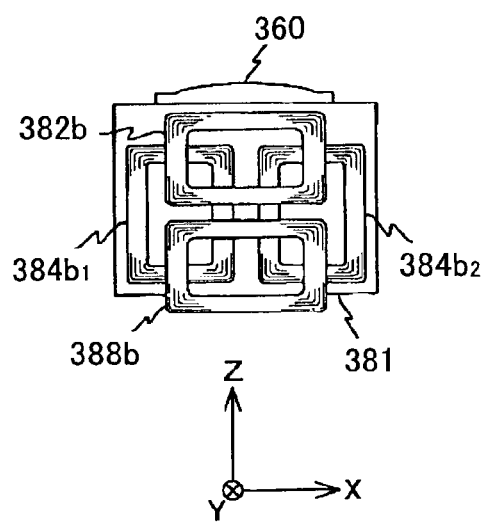

The surface on the side of +Y of the second permanent magnet 391*b* is divided into the four ranges, each having the equal magnitude, by the magnetization limits DP1 of the X-axis direction, and the magnetization limits DP2 of the Z-axis direction as shown in FIG. 57B.

In the present embodiment, the range RD1 is indicated as the range which is located on the +Z side of the magnetization limits DP1 and on the −X side of the magnetization limits DP2. The range RD2 is indicated as the range which is located on the +Z side of the magnetization limits DP1 and on the +X side of the magnetization limits DP2. The range RD3 is indicated as the range which is located on the −Z side of the magnetization limits DP1 and on the −X side of the magnetization limits DP2. The range RD4 is indicated as the range which is located on the −Z side of the magnetization limits DP1 and on the +X side of the magnetization limits DP2. In addition, the adjacent ranges have the reversed polarity mutually.

Therefore, the range RC1 and the range RD1, the range RC2 and the range RD2, the range RC3 and the range RD3, and the range RC4 and the range RD4 confront each other, respectively. Moreover, the range RC1 and the range RD1, the range RC2 and the range RD2, the range RC3 and the range RD3, and the range RC4 and the range RD4 have the reversed polarity mutually, respectively.

Referring back to FIG. 55, the base board 393 is partially fixed to the surface on the side of +Y of the stem 387 through a damping material, and provided with the plural input terminals and output terminals. The plural signal lines of the motor driver 327 are connected to the input terminals, respectively.

In addition, the base board 393 is provided to have some elastic deformation in the Y-axis direction, in order to absorb vibrations of the Y-axis direction.

The lens holder 381 is provided to have a cube-like configuration, and it is arranged between the first permanent magnet 391*a* and the second permanent magnet 391*b*.

Moreover, as shown in FIG. 56B, the through hole extending in the Z-axis direction used as the optical path length of the outgoing beam from housing 371 is formed in the center section of the lens holder 381.

In the edge on the side of +Z of the through hole, it is arranged so that the optical axis and main shaft of the through hole of the objective lens 360 may correspond mostly.

FIG. 58A through FIG. 58D show the respective coils for driving the lens holder 381 in the present embodiment.

The lens holder 381 includes the first tracking coil 382*a*, the second tracking coil 382*b*, the first radial tilt coil 388*a*, the first focusing coil 384*a*1, the second focusing coil 384*a*2, the third focusing coil 384*b*1, the fourth focusing coil 384*b*2, and the second radial tilt coil 388*b* which are unified at the predetermined position relation respectively.

As the objective lens 360, the lens holder 381, and each coil are united and are moved together, and these components are unified and will be called the movable portion.

The terminal (referred to as Ta3 and Tb3) for supplying the drive current-to the terminal (referred to as Ta2 and Tb2) for supplying the drive current to the terminal (referred to as Ta1 and Tb1) for supplying the drive current to each coil for radial tilts and each coil for the trackings and each coil for the focuses is prepared in the lens holder 381.

In the present embodiment, the terminals Ta1, Ta2, and Ta3 are formed in the surface on the side of −X of the lens holder 381, and the terminals Tb1, Tb2, and Tb3 are formed in the surface on the side of +X of the lens holder 381.

And the end of the line spring 392*a*1 is connected to the terminal Ta1, the end of the line spring 392*a*2 is connected to the terminal Ta2, and the end of the line spring 392*a*3 is connected to the terminal Ta3.

Moreover, the end of the line spring 392*b*1 is connected to the terminal Tb1, the end of the line spring 392*b*2 is connected to the terminal Tb2, and the end of the line spring 392*b*3 is connected to the terminal Tb3.

Each line spring is extending in the Y-axis direction, and those other edges are connected to the output terminal of the board 393 by soldering etc. through the through hole prepared in the stem 387, respectively. That is, the movable portion is supported by the stem 387 in elasticity through the six line springs.

In addition, in the present embodiment, it is set up so that the support center (referred to as S92) with each line spring may be mostly in agreement with the center of inertia (referred to as Sk) of movable portion.

The first coil 384*a*1 for the focuses, the second coil 384*a*2 for the focuses, the third coil 384*b*1 for the focuses, and the fourth coil 384*b*2 for the focuses are the coils of the same configuration mostly mutually. And it is connected by each coil for the focuses so that the same drive current may be supplied.

Figure 59A:
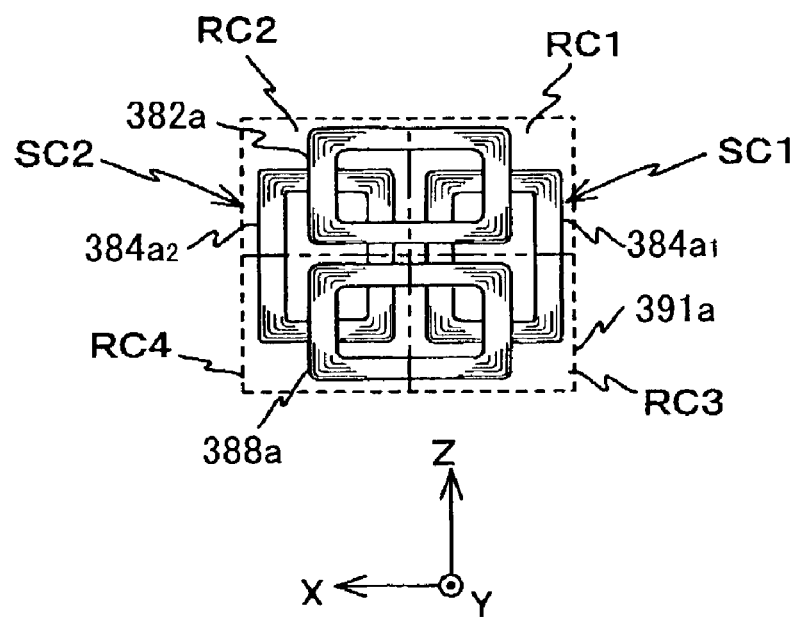
FIG. 59A and FIG. 59B are diagrams for explaining the relationship of the magnets and the coils to drive the lens holder.

The first coil 384*a*1 for the focuses and the second coil 384*a*2 for the focuses are located in the +Y side of the lens holder 381, respectively as shown in FIG. 59A.

It is arranged at the position which counters almost equally to the range RC1 and the range RC3 of the first permanent magnet 391*a*, and the coil 384*a*1 and the coil 384*a*2 are arranged at the position which counters almost equally to the range RC2 and the range RC4 of the first permanent magnet 391*a*.

Figure 59B:
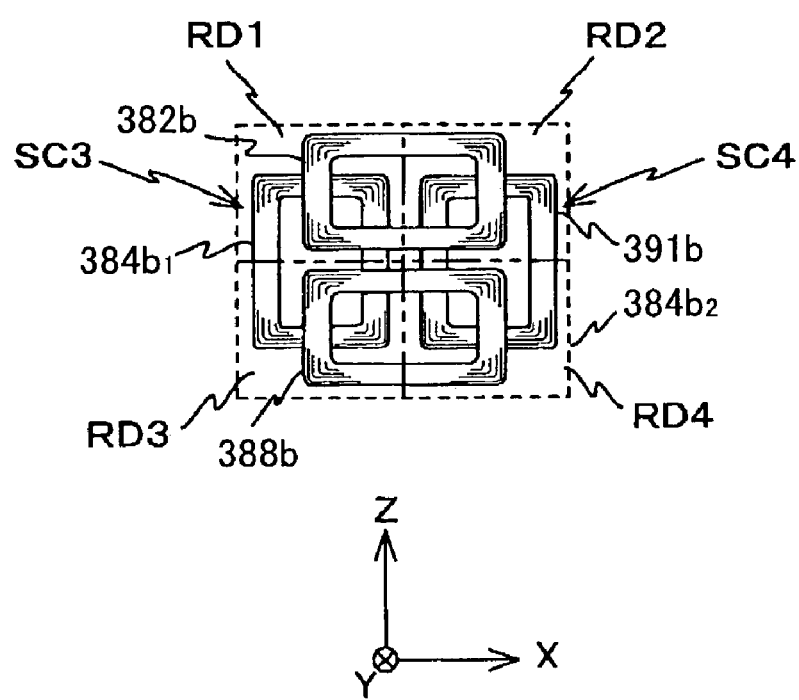

The third coil 384*b*1 and the fourth coil 384*b*2 are located on the −Y side of the lens holder 381, respectively as shown in FIG. 59B.

It is arranged at the position which counters almost equally to the range RD1 and the range RD3 of the second permanent magnet 391*b*, and the coil 384*b*1 and the coil 384*b*2 are arranged at the position which counters almost equally to the range RD2 and the range RD4 of the second permanent magnet 391*b*.

Figure 60A:
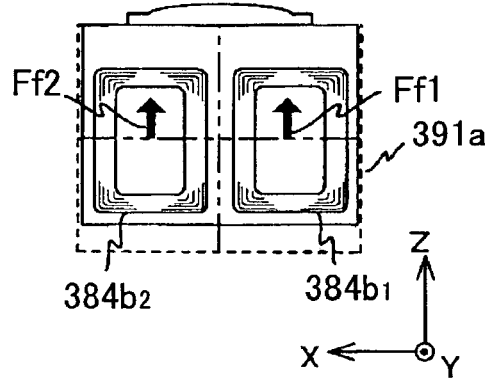
FIG. 60A, FIG. 60B, FIG. 60C, FIG. 60D, FIG. 60E and FIG. 60F are diagrams for explaining the lens holder driving operation.

Thereby, when the drive current is supplied to the first focusing coil 384*a*1, as shown in FIG. 60A, based on the current flowing through the coil 384*a*1 and the magnetic flux from the range RC1 and the range RC3 of the first permanent magnet 391*a*, the force (first focal force: Ff1) occurs in +Z direction (or −Z direction).

When the drive current is supplied to the coil 384*a*2, based on the current flowing through the coil 384*a*2 and the magnetic flux from the range RC2 and the range RC4 of the first permanent magnet 391*a*, the force (second focal force: Ff2) occurs in +Z direction (or −Z direction), which is the same direction as the first focal force.

Figure 60B:
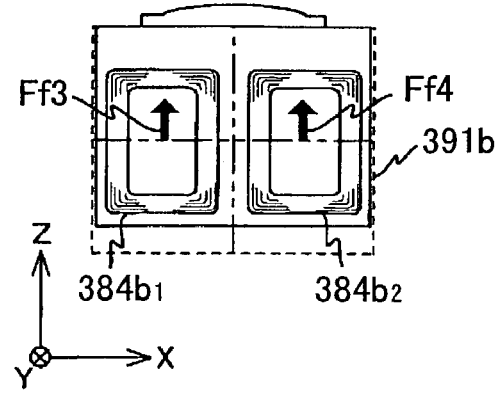

When the drive current is supplied to the third focusing coil 384*b*1, based on the current flowing through the coil 384*b*1 and the magnetic flux from the range RD1 and range RD3 of the second permanent magnet 391*b*, as shown in FIG. 60B, the force (third focal force: Ff) occurs in +Z direction (or −Z direction), which is the same direction as the first focal force.

When the drive current is supplied to the fourth focusing coil 384*b*2, based on the current flowing through the coil 384*b*2 and the magnetic flux from the range RD2 and the range RD4 of the second permanent magnet 391*b*, the force (fourth focal force: Ff4) occurs in +Z direction (or −Z direction), which is the same direction as the first focal force.

In the present embodiment, it is set up so that each focal force may serve as the same magnitude mutually, the movable portion will be driven to +Z direction (or −Z direction) according to the magnitude of the drive current.

In addition, the driving direction can control each coil for the focuses based on the flowing current.

Moreover, each coil for the focuses has the magnitude and the configuration according to the driving force needed.

The first tracking coil 382a and the second tracking coil 382b are the coils of the same configuration mostly mutually.

The first tracking coil 382a is on the +Y side of the lens holder 381, and arranged at the position which counters almost equally to the range RC1 and the range RC2 of the first permanent magnet 391a, as shown in FIG. 59A.

The second tracking coil 382a is on the −Y side of the lens holder 381, and arranged at the position which counters almost equally to the range RD1 and the range RD of the second permanent magnet 391b, as shown in FIG. 59B.

In addition, a part of the first tracking coil 382a overlaps a part of the first focusing coil 384a1 and a part of the second focusing coil 384a2 about the Y-axis direction.

Similarly, a part of the second tracking coil 382b overlaps a part of the first focusing coil 384a1 and a part of the second focusing coil 384a2 about the Y-axis direction.

Moreover, it is connected so that the same drive current may be mutually supplied to the first tracking coil 382a and the second tracking coil 382b.

Figure 60C:
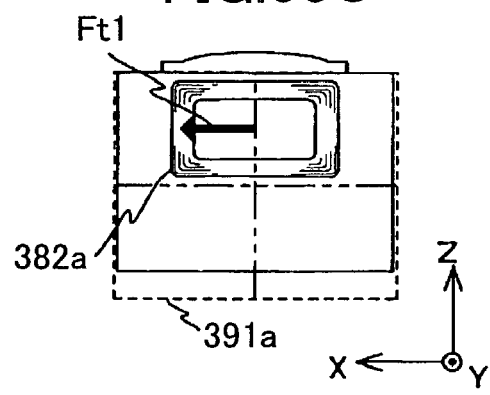

Thereby, when the drive current is supplied to the first tracking coil 382a, as shown in FIG. 60C, based on the flowing current and the magnetic flux from the range RC1 and the range RC2 of the first permanent magnet 391a, the force (first tracking force: Ft1) occurs in the direction of +X (or the direction of −X).

Figure 60D:
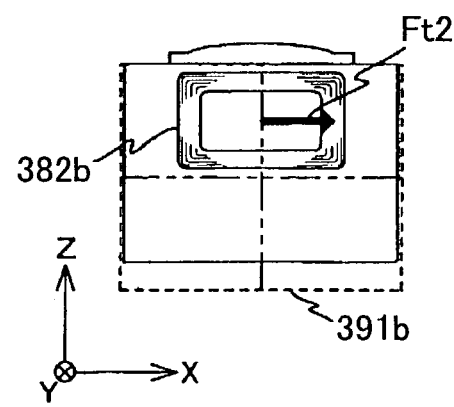

On the other hand, when the drive current is supplied to the second tracking coil 382b, as shown in FIG. 60D, based on the flowing current and the magnetic flux from the range RD1 and the range RD2 of the second permanent magnet 391b, the force (second tracking force: Ft2) occurs in the direction of +X (or the direction of −X), which is the same direction as the first tracking force.

In the present embodiment, it is set up so that the first tracking force and the second tracking force may serve as the same magnitude mutually, and the movable portion will be driven in the direction of +X (or the direction of −X) as a result according to the current value of the drive current.

In addition, the driving direction (the direction of +X or the direction of −X) is controllable according to the current which flows in each tracking coil.

Moreover, each tracking coil has the magnitude and the configuration according to the driving force needed.

In the present embodiment, it is set up so that the action center of each tracking force and the support center S92 (center of inertia Sk) with each line spring may be mostly in agreement, in tracking control at high speed, the movable portion does not rotate in XZ plane.

The first radial tilt coil 388a and the second radial tilt coil 388b are the coils of the same configuration mostly mutually.

The first radial tilt coil 388a is on the +Y side of the lens holder 381, and is arranged at the position which counters almost equally to the range RC3 and the range RC4 of the first permanent magnet 391a, as shown in FIG. 59A.

The second radial tilt coil 388b is on the −Y side of the lens holder 381, and is arranged at the position which counters almost equally to the range RD3 and the range RD4 of the second permanent magnet 391b, as shown in FIG. 59B.

In addition, a part of the coil 388a overlaps a part of the coil 384a1 and a part of the coil 384a2 about the Y-axis direction.

Similarly, a part of the coil 388b overlaps a part of the coil 384a1 and a part of the coil 384a2 about the Y-axis direction.

Moreover, it is connected so that the same drive current may be mutually supplied to the coil 388a and the coil 388b.

Figure 60E:
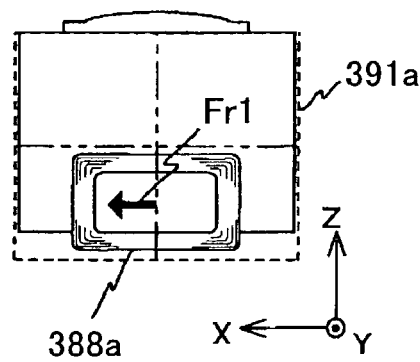

Thereby, when the drive current is supplied to the first radial tilt coil 388a, based on the flowing current and the magnetic flux from the range RC3 and the range RC4 of the first permanent magnet 391a, as shown in FIG. 60E, the force (radial tilt force: first Fr1) occurs in +Z direction (or −Z direction).

Figure 60F:
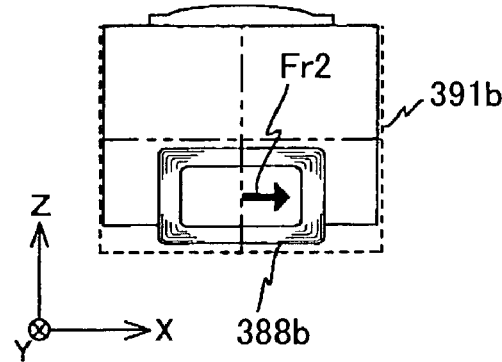

As shown in FIG. 60F, when the drive current is supplied to the second radial tilt coil 388b, based on the flowing current and the magnetic flux from the range RD3 and the range RD4 of the second permanent magnet 391b, the force (second radial tilt force: Fr2) occurs in +Z direction (or −Z direction), which is the same direction as the first radial tilt force.

Figure 61A:
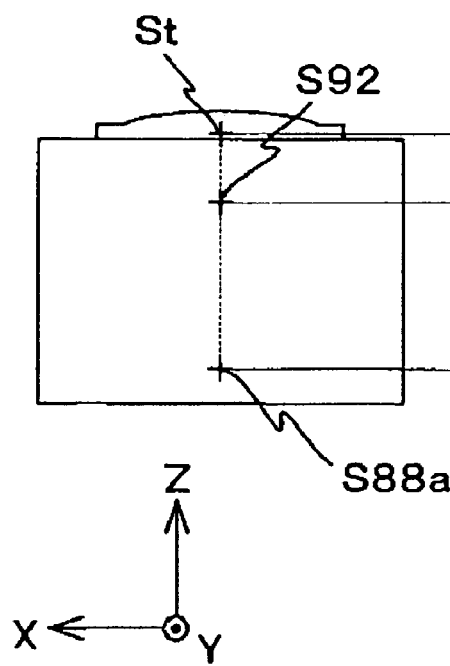
FIG. 61A, FIG. 61B and FIG. 61C are diagrams for explaining the radial and tangential tilt compensation.
Figure 61B:
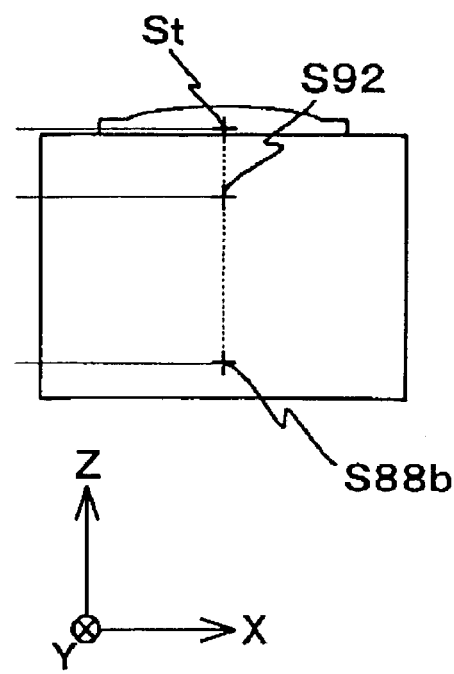

In addition, as shown in FIG. 61A and FIG. 61B, the point-of-application S88a of the first radial tilt force and the point-of-application S88b of the second radial tilt force are in the equal distance mostly from the support center S92 about the Z-axis direction, and the distance Lfs is set up so that the conditions represented by the following formula (1) may be satisfied.

In addition, Lns is the distance of the principal point St of the objective lens 360 and the support center S92 about the Z-axis direction, ktr is the spring modulus of the line spring, and krad is the torsion-spring constant of the line spring.

$$Lfs = krad/ktr/Lns \qquad (1)$$

In the present embodiment, when the resultant of the first radial tilt force and the second radial tilt force is set to Ftr, the amount Xtr of movement to the tracking direction of the movable portion is represented by the following formula (2).

$$Xtr = Ftr/ktr \qquad (2)$$

Moreover, the amount X of movement to the tracking direction of the principal-point position of the objective lens 360 when the movable portion rotates only the include angle theta 1 in XZ plane is geometrically shown by the following formula (3).

$$X = -Lns \sin theta1 = -Lns\, theta1 \qquad (3)$$

The angle of rotation theta 1 of the movable portion is represented by the following formula (4).

$$theta1 = Lfs\, Ftr/krad \qquad (4)$$

Then, when the relation of the formula (3) is used, the formula (3) can be rewritten into the following formula (5).

$$X = -Lns\, Lfs\, Ftr/krad \qquad (5)$$

Furthermore, since it is set up so that the relation of the formula (1) may be satisfied, the formula (5) can be rewritten to the following formula (6).

$$X = -Ftr/ktr \qquad (6)$$

Therefore, Xtr and X serve as the relation represented by the following formula (7).

$$Xtr + X = 0 \qquad (7)$$

Figure 61C:
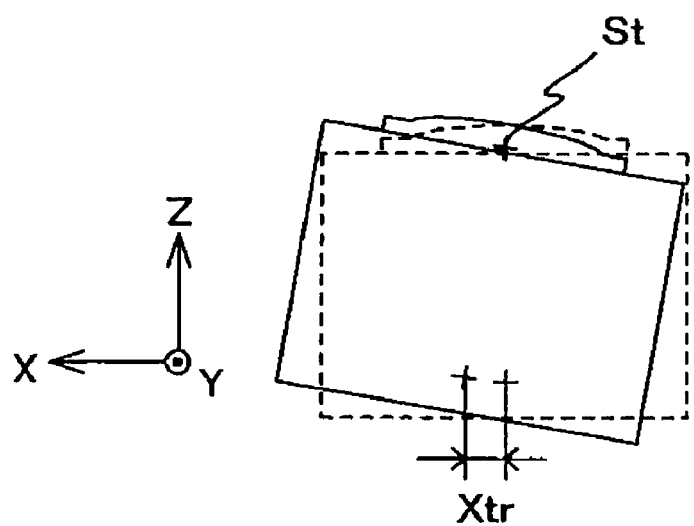
Figure 62A:
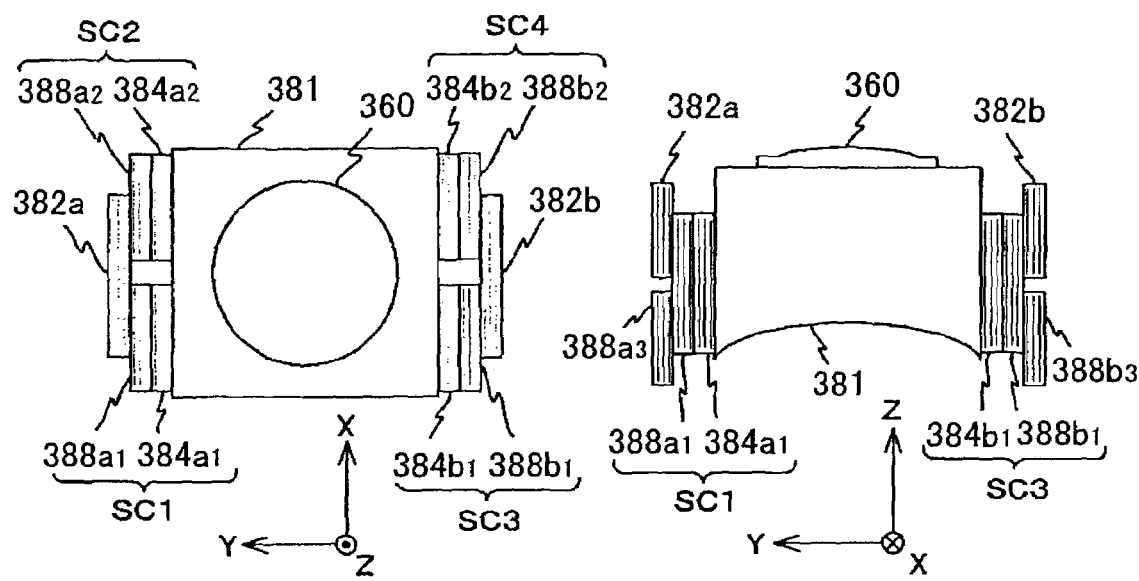
FIG. 62A, FIG. 62B, FIG. 62C and FIG. 62D are diagrams showing variation of the radial tilt coils.
Figure 62B:
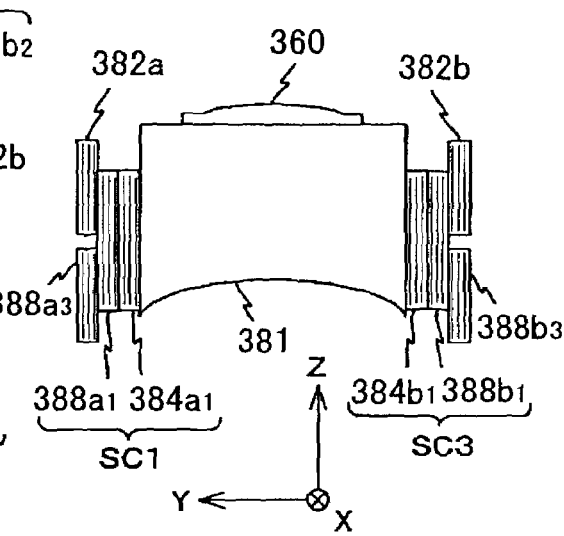
Figure 62C:
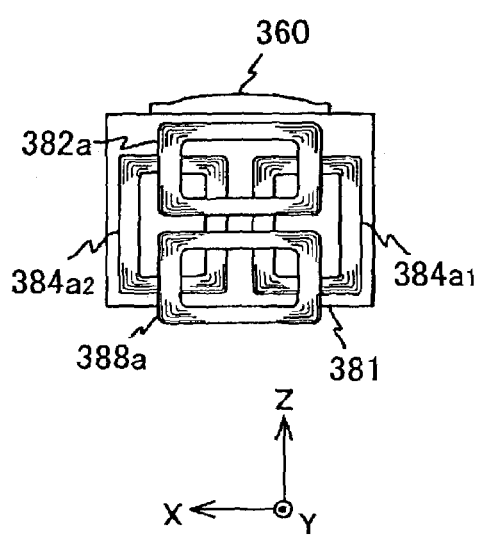
Figure 62D:
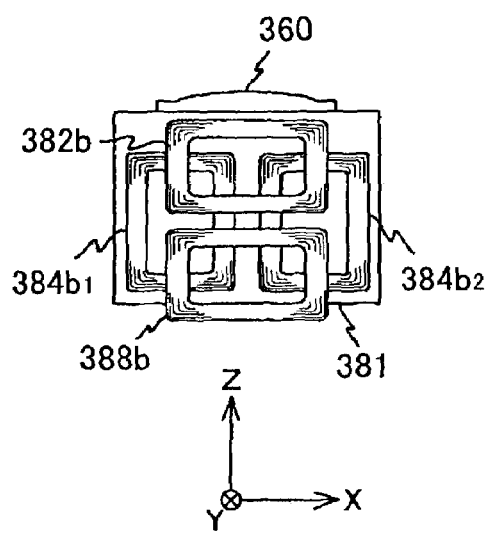

That is, in order for the movable portion itself to move in the direction contrary to the move direction of the principal-point position in the amount of the same movements even if the principal-point position of the objective lens 360 moves by the rotation of the movable portion as shown in FIG. 61C, by the tilt control, the principal-point position of the objective lens will not almost change as a result.

In addition, the angle of rotation of the movable portion can be controlled by the magnitude of the current which flows in each coil for radial tilts, and the rotational polarity can be controlled by the polarity of the current which flows in each coil for radial tilts.

Moreover, each coil for radial tilts has the magnitude and the configuration according to the driving force needed.

A description will be given of the operation of the optical pickup device 323.

The optical pickup device 323 is provided in the optical disk drive 320 so that the Z-axis direction and the tangential direction of the perpendicular to the record side of the optical disk 315 direction of the track may correspond with the Y-axis direction.

That is, the X-axis direction turns into the tracking direction, and the Z-axis direction turns into the focusing direction.

After the light beam which acts in the direction of +X from the light source unit 351 serves as the parallel light with the coupling lens 352, which is incident to the beam splitter 354.

It is reflected in +Z direction by the starting mirror 356, and the light beam from the beam splitter 354 is incident to the focusing system 11 through the opening of the housing 371 and the opening of the base plate 385.

The light beam incident to the focusing system 371 is inputted to the objective lens 360 through the through hole of the lens holder 381, and it is focused onto the recording surface of the optical disk 315 as a minute light spot by the objective lens 360.

The reflected light from the recording surface of the optical disk 315 is converted by the objective lens 360 into a return light beam which is the parallel light again, and through the opening of the base plate 385 and the opening of the housing 371 it is incident to the mirror 356.

The return light beam incident to the starting mirror 356 is reflected in the direction of −X and it is incident to the beam splitter 354.

The return light beam which branches in the direction of −Y by the beam splitter 354 is passed through the detection lens 358 and the cylindrical lens 357, and it is received by the photodetector 359.

Each light-receiving component which constitutes the photodetector 359 outputs the current signal according to the amount of the received light to the reproduction signal processing circuit 328, respectively.

Next, a description will be given of the control processing of the position and attitude of the objective lens 360 in the optical disk drive 320.

First, the focus control in the optical disk drive 320 will be explained.

1. After the reproduction signal processing circuit 328 changes the output signal of the photodetector 359 into the voltage signal by the first I/V amplifier 328a, it detects the focusing error signal by the servo signal detector 328b, and outputs the detected signal to the servo controller 333.

2. The servo controller 333 generates the focal control signal for correcting the focal gap based on the focusing error signal, and outputs the signal to the motor driver 327.

3. The motor driver 327 outputs the drive current for focal control corresponding to the focal control signal to the optical pickup device 323.

4. In the optical pickup device 323, the drive current for the focal control from the motor driver 327 is inputted into the predetermined input terminal of the board 393, and is supplied to each focusing coil through the line spring 392$a3$ and the line spring 392$b3$.

5. When the drive current flows through each focusing coil, the driving force according to the magnitude of the current and the polarity of the current will occur, and the movable portion will be driven in the direction of the focus control accordingly.

As a result, the objective lens 360 shifts in the direction of the focus control, and the focal gap is corrected.

The tracking control in the optical disk drive 320 will now be explained.

1. After the reproduction signal processing circuit 328 changes the output signal of the photodetector 359 into the voltage signal by the first I/V amplifier 328a, it detects the tracking error signal by the servo signal detector 328b, and outputs it to the servo controller 333.

2. The servo controller 333 generates the tracking control signal for correcting the track gap based on the tracking error signal, and outputs it to the motor driver 327.

3. The motor driver 327 outputs the drive current for tracking control corresponding to the tracking control signal to the optical pickup device 323.

4. In the optical pickup device 323, the drive current for the tracking control from the motor driver 327 is inputted into the predetermined input terminal of the board 393, and is supplied to each tracking coil through the line spring 392$a2$ and the line spring 392$b2$.

5. When the drive current flows through each tracking coil, the driving force according to the magnitude of the current and the polarity of the current will occur, and the movable portion will be driven in the tracking direction accordingly.

As a result, the objective lens 360 shifts to the tracking direction, and the track gap is corrected.

The tilt control in the optical disk drive 320 will now be explained.

1. After the reproduction signal processing circuit 328 changes the output signal of the tilt sensor 342 into the voltage signal by the second I/V amplifier 328f, it detects the information about the media tilt by the tilt detector 328g, and outputs it to the servo controller 333 as the tilt information signal.

2. The servo controller 333 generates the radial tilt compensation signal for correcting the radial tilt based on the tilt information signal, and outputs it to the motor driver 327.

3. The motor driver 327 outputs the drive current for radial tilt control corresponding to the radial tilt compensation signal to the optical pickup device 323.

4. In the optical pickup device 323, the drive current for the radial tilt control from the motor driver 327 is inputted into the predetermined input terminal of the board 393, and is supplied to the radial tilt coils through the line spring 392$a1$ and the line spring 392$b1$.

5. When the drive current flows through each radial tilt coil, the driving force according to the magnitude of the current and the polarity of the current will occur, and the movable portion will be inclined in XZ plane.

As a result, the objective lens 360 is rotated in XZ plane, and the radial tilt is corrected.

Next, the processing operation in the case of accessing the optical disk 315 using the optical disk drive 320 will be explained.

First, the recording processing of the optical disk drive 320 will be explained.

When the command of the record request is received from the host, the CPU 340 notifies the receipt of the command of the record request to the reproduction signal processing circuit 328 while outputting the control signal for controlling rotation of the spindle motor 322 based on the specified record rate to the motor driver 327.

Moreover, the CPU 340 directs the accumulation to the buffer RAM 334 of the user data received from the host to the buffer manager 337.

When the rotation of the optical disk 315 reaches the predetermined linear velocity, the focal control, tracking control and tilt control (which will be generically called the position attitude control) will be performed by the CPU 340.

In addition, the position attitude control is performed at any time until the record processing is completed.

And the reproduction signal processing circuit 328 acquires ADIP information based on the output signal of the photodetector 359, and notifies it to the CPU 340.

In addition, the reproduction signal processing circuit 328 acquires ADIP information for every predetermined timing until the record processing is completed, and notifies it to the CPU 340.

The CPU 340 outputs the signal which controls the seeking motor to the motor driver 327 so that the optical pickup body 301 is located at the start point where it performs writing to the optical disk based on ADIP information.

When the notice that the amount of user data accumulated at the buffer RAM 334 exceeds the predetermined value is received from the buffer manager 337, the CPU 340 directs generation of the signal for writing to the encoder 325.

When the CPU 340 determines that the writing position of the optical pickup body 301 is the start point based on ADIP information, it will be notified to the encoder 325.

Accordingly, the user data are recorded on the optical disk 315 through the encoder 325, the laser control circuit 324 and the optical pickup device 323.

The reproduction processing of the optical disk drive 320 will now be explained.

When the command of the reproduction request is received from the host, the CPU 340 outputs to the motor driver 327 the control signal for controlling rotation of the spindle motor 322 based on the reproduction rate. At the same time, the CPU 340 notifies to the reproduction signal processing circuit 328 that the command of the reproduction request is received.

When the rotation of the optical disk 315 reaches the predetermined linear velocity, the position attitude control will be performed by the CPU 340.

In addition, the position attitude control is performed at any time until the reproduction is completed.

And the reproduction signal processing circuit 328 acquires ADIP information based on the output signal of the photodetector 359, and notifies it to the CPU 340.

In addition, the reproduction signal processing circuit 328 acquires ADIP information for every predetermined timing until the reproduction is completed, and it notifies it to the CPU 340.

The CPU 340 outputs the signal which controls the seeking motor to the motor driver 327 so that the optical pickup body 301 is located at the start point for the reading on the optical disk based on ADIP information.

When the CPU 340 determines that the reading position of the optical pickup body 301 is the start point on the optical disk based on ADIP information, it will notify it to the reproduction signal processing circuit 328.

And after the reproduction signal processing circuit 328 detects the RF signal based on the output signal of the photodetector 359 and performs recovery processing, error-correction processing, etc., it is accumulated to the buffer RAM 334 as reproduction data.

The buffer manager 337 transmits to the host through the interface 338, when the reproduction data accumulated at the buffer RAM 334 are assembled as sector data.

As is apparent from the above description, the tilt detection unit is constituted by the tilt sensor 342 and the tilt detector 328g in the optical disk drive of the present embodiment.

Moreover, the processing mechanism is realized by the program performed by the CPU 340, the reproduction signal processing circuit 328, and the CPU 340.

According to the present embodiment, in the tilt control, the principal point of the objective lens does not need to be located near the rotation axis of the movable portion, and the degree of freedom in the design of each coil increases, and it is possible to acquire the required driving force easily. Therefore, it is possible to raise the servo control performance.

According to the present embodiment, it is possible to drive the objective lens with sufficient accuracy at high speed.

Moreover, according to the optical pickup device of the present embodiment, the rapid response and focal control of the objective lens, the tracking control, and the radial tilt control can be performed efficiently.

The optical spot of the predetermined configuration is stabilized with sufficient accuracy in the predetermined position of the optical disk, and is formed in it, and it is possible for the optical pickup device to output the signal, including the information required for the position control of the objective lens, with sufficient accuracy.

Moreover, according to the optical disk drive of the present embodiment, it is possible for the optical pickup device to be stabilized with sufficient accuracy and to perform the high-speed access which includes reproduction, erasing and recording of the information storage medium.

In the foregoing embodiment, the case where the frequency of the drive signal supplied to the tilt drive unit is comparatively low, or the case where the occurrence of cross action by tilt operation in the elastic range in the displacement sensibility property of the optical pickup device is suppressed at a very low level is described.

When the frequency of the drive signal outputted to the optical pickup device is high, it is possible to set up such that the occurrence of cross action by tilt operation may be suppressed at the very low level in the inertia range in the displacement sensibility property of the optical-pickup device.

In this case, it will set up so that the conditions related to the distance (referred to as Lfg) of the point of application of each radial tilt force and the center of inertia Sk of the movable portion about the Z-axis direction, which are indicated by the following formula (8), may be satisfied.

$$Lfg = Irad/m/Lng \tag{8}$$

In the above formula (8), Lng is the distance of the principal point St of the objective lens 360 and the center of inertia Sk concerning the Z-axis direction, Irad is the moment of inertia of the movable portion, and m is the mass of the movable portion.

In addition, in the preferred embodiment, the support center S92 and the center of inertia Sk are mostly in agreement, or Lng=Lns. However, the present invention is is not limited to this embodiment, and the support center S92 may differ from the center of inertia Sk.

The reason will now be explained.

The acceleration alpha1 of movement to the tracking direction of the movable portion by each radial tilt force is shown by the following formula (9).

$$\text{alpha1} = Ftr/m \quad (9)$$

The amount X2 of movement to the tracking direction of the principal-point position of the objective lens 360 when the movable portion rotates only by the include angle theta 2 in XZ plane is shown by the following formula (10).

$$X2 = -Lng \sin(\text{theta2}) = -Lng(\text{theta2}) \quad (10)$$

Then, the acceleration alpha2 to the tracking direction of the principal-point position is shown by the following formula (11).

$$\text{alpha2} = -Lng(\text{theta2}'') \quad (11)$$

In the above formula (11), theta2" is the angular acceleration of the movable portion.

The angular-acceleration theta2" has the relation of the following formula (12).

$$\text{theta2}'' = Lfg(Ftr/\text{Irad}) \quad (12)$$

Then, if the relation of the formula (12) is used, the above formula (11) can be rewritten to the following formula (13).

$$\text{alpha2} = -Lng(Lfg(Ftr/\text{Irad})) \quad (13)$$

In the present embodiment, it is set up so that the relation of the above formula (8) may be satisfied, and the above formula (13) can be further rewritten to the following formula (14).

$$\text{alpha2} = -Ftr/m \quad (14)$$

Therefore, alpha1 and alpha2 satisfy the relation represented by the following formula (15).

$$\text{alpha1} + \text{alpha2} = 0 \quad (15)$$

Namely, even if the principal-point position of the objective lens 360 moves by the rotation of the movable portion, in order for the movable portion to move in the direction contrary to the move direction of the principal-point position with the same acceleration, the principal-point position of the objective lens by the tilt control will not almost change as a result.

In addition, when the frequency band of the drive signal is wide, it is possible to satisfy the conditions shown by the following formula (16).

$$\text{Irad}/m = \text{krad}/\text{ktr} \quad (16)$$

That is, it is possible to make the primary resonance frequency in the tracking direction of the movable portion, and the primary resonance frequency in rotation in XZ plane mostly in agreement.

In addition, when the above conditions cannot be satisfied by the restrictions on the design, or when there is a possibility of having the bad influence on the operation of the optical disk drive when the above conditions are satisfied, it is possible to adopt an intermediate value between Lfg and Lfs.

Moreover, in the preferred embodiment, the case where the radial tilt coils (first radial tilt coil 388a and second radial tilt coil 388b) are used as a pair of radial tilt coils is explained. However, the present invention is not limited to this embodiment.

As shown in FIG. 62A–FIG. 62D, it is possible to add the two pairs of radial tilt coils (388a1, 388a2, 388b1, 388b2) as a coil for generating the couple moment.

The two pairs of radial tilt coils (388a1, 388a2, 388b1, 388b2) are the coils of the same configuration mostly with the focusing coils.

The laminating of the radial tilt coil 388a1 and the first focusing coil 384a1 is mutually carried out to the Y-axis direction, and they form the first laminating coil SC1.

The laminating of the radial tilt coil 388a2 and the second focusing coil 384a2 is mutually carried out to the Y-axis direction, and they form the second laminating coil SC2.

The laminating of the radial tilt coil 388b1 and the third focusing coil 384b1 is mutually carried out to the Y-axis direction, and they form the third laminating coil SC3.

The laminating of the radial tilt coil 388b2 and the fourth focusing coil 384b2 is mutually carried out to the Y-axis direction, and they form the fourth laminating coil SC4.

Figure 63A:
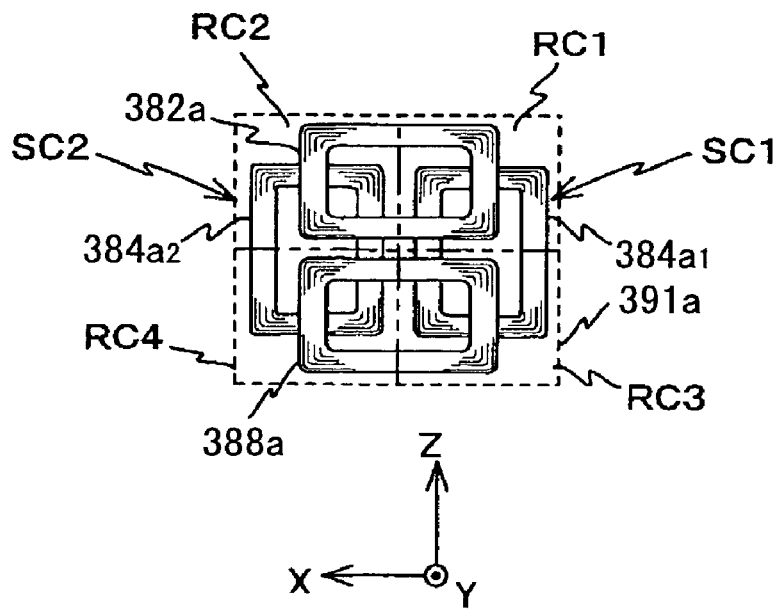
FIG. 63A and FIG. 63B are diagrams for explaining the positional relationship of the magnets and the coils in the arrangment of FIG. 62A through FIG. 62D.

As shown in FIG. 63A, the first laminating coil SC1 is on the +Y side of the lens holder 381, and is arranged in the position which counters almost equally to the range RC1 and the range RC3 of first permanent magnet 391a.

The second laminating coil SC2 is on the +Y side of the lens holder 381, and is arranged in the position which counters almost equally to the range RC2 and the range RC4 of first permanent magnet 391a.

Figure 63B:
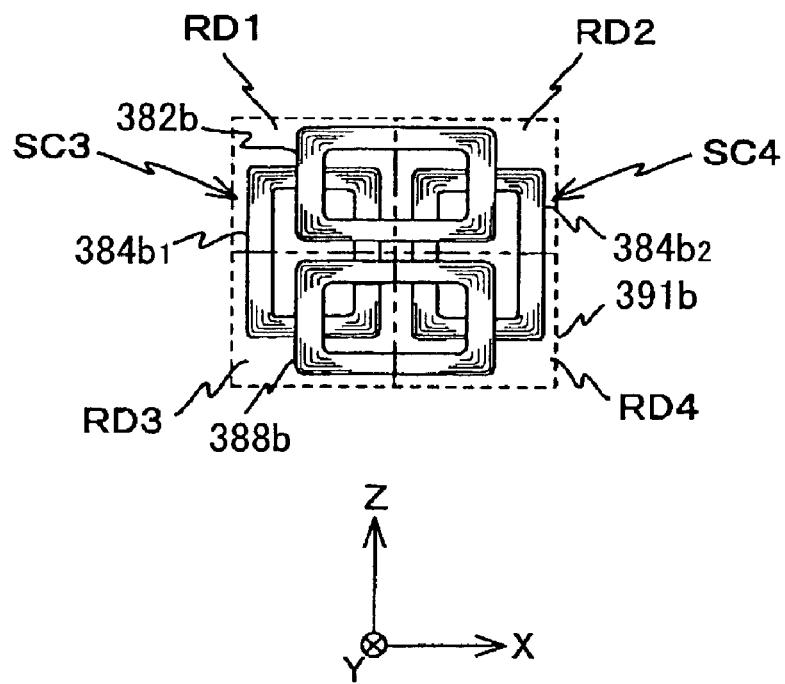

As shown in FIG. 63B, the third laminating coil SC3 is on the −Y side of the lens holder 381, and is arranged in the position which counters almost equally to the range RD1 and the range RD3 of second permanent magnet 391b.

The fourth laminating coil SC4 is on the −Y side of the lens holder 381, and is arranged in the position which counters almost equally to the range RD2 and the range RD4 of second permanent magnet 391b.

In addition, the focusing coils need a larger driving force than the radial tilt coils, and the focusing coils are arranged to the permanent magnet side so that the strong magnetic flux against the focusing coils may occur.

Moreover, it is connected by each coil for radial tilts so that the respectively same drive current may be supplied.

Figure 64A:
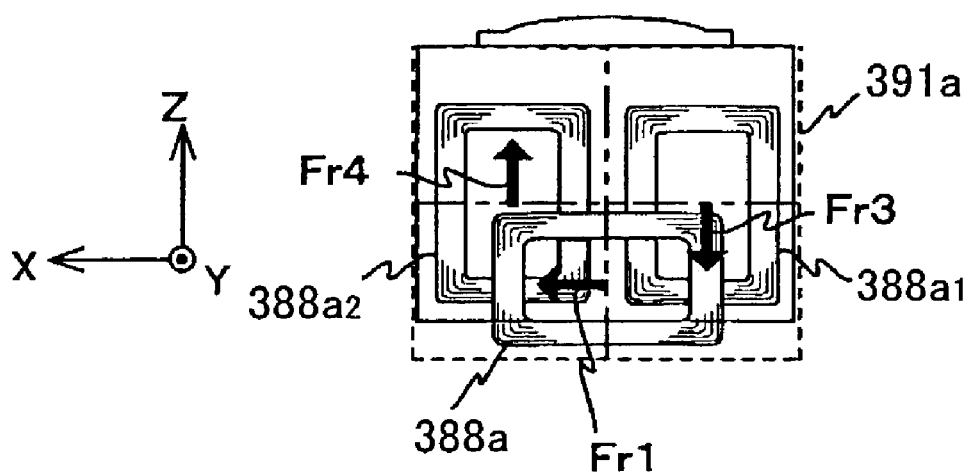
FIG. 64A and FIG. 64B are diagrams for explaining the operations of the radial tilt coils of FIG. 62A through FIG. 62D.

Thereby, if the drive current is supplied to the coil 388a1 for radial tilts, as shown in FIG. 64A, based on the flowing current and the magnetic flux from the range RC1 and the range RC3 of the first permanent magnet 391a, the force (third radial tilt force: Fr3) will occur in −Z direction (or +Z direction).

If the drive current is supplied to the coil 388a2 for radial tilts, based on the flowing current and the magnetic flux from the range RC2 and the range RC4 of the first permanent magnet 391a, the force (fourth radial tilt force: Fr4) will occur in +Z direction (or −Z direction), which is opposite to the direction of the third radial tilt force.

Figure 64B:
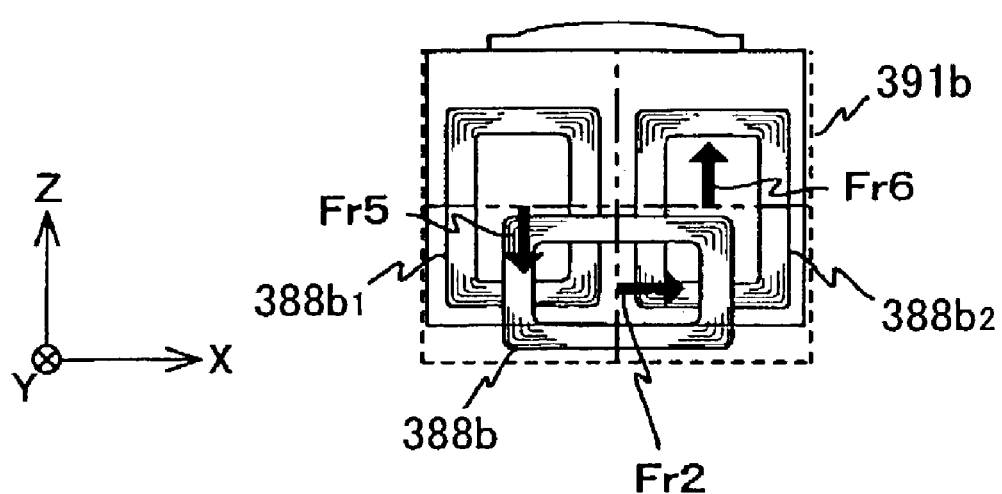
Figure 65A:
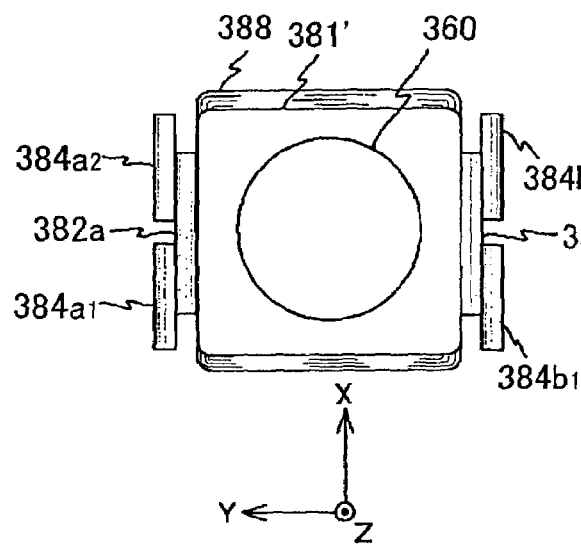
FIG. 65A, FIG. 65B, FIG. 65C and FIG. 65D are diagrams showing another variation of the radial tilt coils.
Figure 65B:
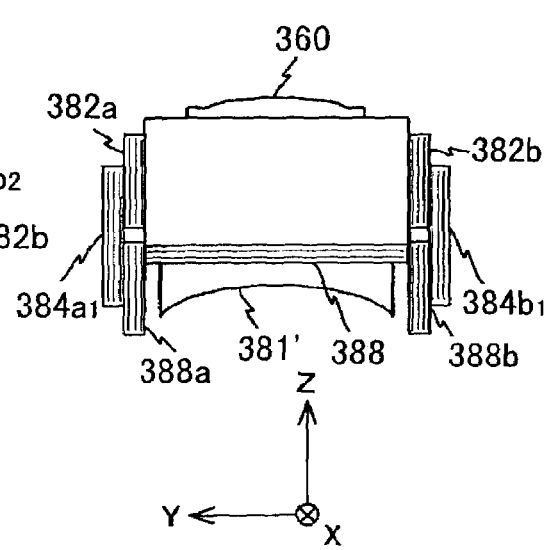
Figure 65C:
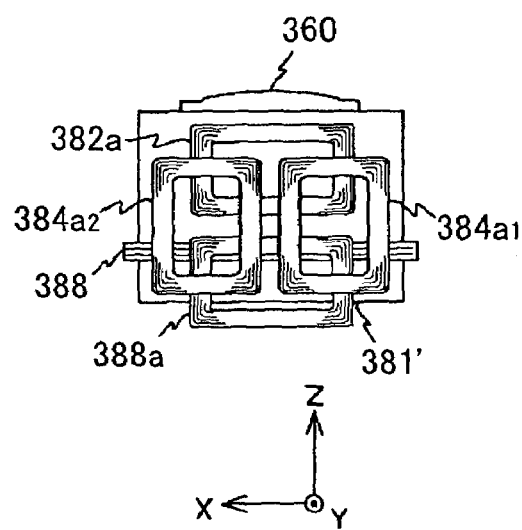
Figure 65D:
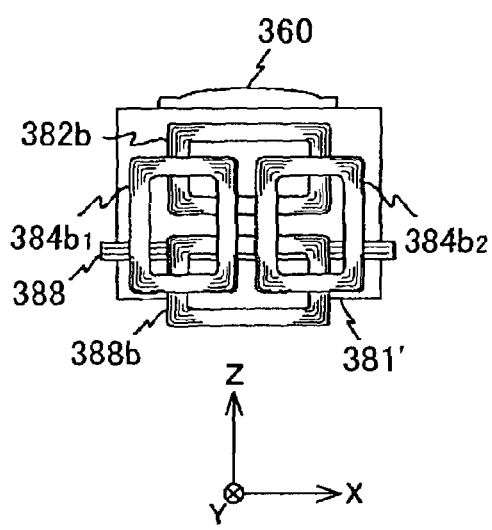

If the drive current is supplied to the coil 388b1 for radial tilts, as shown in FIG. 64B, based on the flowing current and the magnetic flux from the range RD1 and the range RD3 of the second permanent magnet 391b, the force (fifth radial tilt force: Fr5) will occur in −Z direction (or +Z direction), which is the same direction as the third radial tilt force.

If the drive current is supplied to the coil 388b2 for radial tilts, based on the flowing current and the magnetic flux from the range RD2 and the range RD4 of the second permanent magnet 391b, the force (sixth radial tilt force: Fr6) will occur in +Z direction (or −Z direction), which is opposite to the direction of the third radial tilt force.

As the result, the couple moment (referred to as Mg) to rotate the movable portion in XZ plane will occur.

In this case, what is necessary is just to arrange each radial tilt coil so that the ratio of the couple moment Mg and the force Ftr may satisfy the following formula (17).

$$Ftr/Mg = Lns/krad\{(1/ktr) - (Lns(Lfs/krad))\} \quad (17)$$

The reason is explained below.

The amount X3 of movement to the tracking direction of the principal-point position of the objective lens 360 when the movable portion rotates only by the include angle theta3 in XZ plane is represented by the following formula (18).

$$X3 = -Lns(\sin(theta3)) = -Lns(theta3) \quad (18)$$

In this case, the angle of rotation theta3 in XZ plane of the movable portion is the addition value of the rotation by the couple moment Mg and the rotation by Ftr, as shown in the following formula (19).

$$theta3 = Mg/krad + Lfs(Ftr/krad) \quad (19)$$

Then, if the relation of the formula (19) used, the above formula (18) can be rewritten to the following formula (20).

$$X3 = -Lns(Mg/krad) - Lns(Lfs(Ftr/krad)) \quad (20)$$

Furthermore, since it is set up so that the relation of the formula (17) may be satisfied, the above formula (20) can be rewritten to the following formula (21).

$$X3 = -Ftr\{(1/ktr) - (Lns(Lfs/krad))\} - Lns(Lfs(Ftr/krad))$$
$$= -Ftr/ktr \quad (21)$$

Therefore, Xtr and X3 satisfy the relation represented by the following formula (22).

$$Xtr + X3 = 0 \quad (22)$$

That is, even if the principal-point position of the objective lens 360 moves by the rotation of the movable portion, in order for the movable portion to move in the direction contrary to the move direction of the principal-point position in the amount of the same movement, the principal-point position of the objective lens by the tilt drive will not almost change as a result.

In addition, the direction of the rotation can be controlled by the polarity of the flowing current of each radial tilt coil.

Moreover, each coil for radial tilts has the magnitude and the configuration according to the driving force needed.

In this case, what is necessary is just to arrange each coil for radial tilts so that the ratio of the couple moments Mg and Ftr may satisfy the following formula (23) when the frequency of the drive signal is high.

$$Ftr/Mg = Lng/\{Irad(1/m - Lng(Lfg/Irad))\} \quad (23)$$

The reason is explained below.

The acceleration alpha1 of movement to the tracking direction of the movable portion by the driving force Ftr is shown by the formula (9).

Moreover, the amount X4 of movement to the tracking direction of the principal-point position of the objective lens 360 when the movable portion rotates only by the include angle theta 4 in XZ plane is shown by the following formula (24).

$$X4 = -Lng(\sin(theta4)) = -Lng(theta4) \quad (24)$$

The acceleration alpha4 to the tracking direction of the principal-point position is shown by the following formula (25).

$$alpha4 = -Lng(theta4'') \quad (25)$$

In the above formula (25), theta4" is the angular acceleration of the movable portion.

The angular-acceleration theta4" is the addition value of the angular acceleration by the couple moment Mg and the angular acceleration by the driving force Ftr, as shown in the following formula (26).

$$theta4'' = Mg/Irad + Lfg(Ftr/Irad) \quad (26)$$

Then, if the relation of the formula (26) is used, the above formula (25) can be rewritten to the following formula (27).

$$alpha4 = -Lng(Mg/Irad) - Lng(Lfg(Ftr/Irad)) \quad (27)$$

Furthermore, since it is set up so that the relation of the formula (23) may be satisfied, the above formula (27) can be further rewritten to the following formula (28).

$$alpha4 = -Ftr(1/m - Lng(Lfg/Irad)) - Lng(Lfg(Ftr/Irad))$$
$$= -Ftr/m \quad (28)$$

Therefore, alpha1 and alpha4 satisfy the relation represented by the following formula (29).

$$alpha1 + alpha4 = 0 \quad (29)$$

That is, even if the principal-point position of the objective lens 360 moves by the rotation of the movable portion, in order for the movable portion to move in the direction contrary to the move direction of the principal-point position with the same acceleration, the principal-point position of the objective lens by the tilt control will not almost change as a result.

In addition, in the case where the frequency band of the drive signal is wide, at the time when the conditions are satisfied but there is a possibility of having the bad influence on the operation of the optical disk drive, or at the time when the conditions of the formula (23) cannot be satisfied by the restrictions on the design, what is necessary is that Ftr/Mg satisfy the conditions represented by the following formula (30).

$$Lns/krad\{(1/ktr) - Lns(Lfs/krad)\} < Ftr/Mg < Lng/Irad\{(1/m) - Lng(Lfg/Irad)\} \quad (30)$$

Moreover, in the present embodiment, as shown in FIG. 65A–FIG. 65D, the radial tilt coil 388 may be provided around the perimeter of the lens holder 381' in XY plane as a coil for generating the couple moment.

Figure 66A:
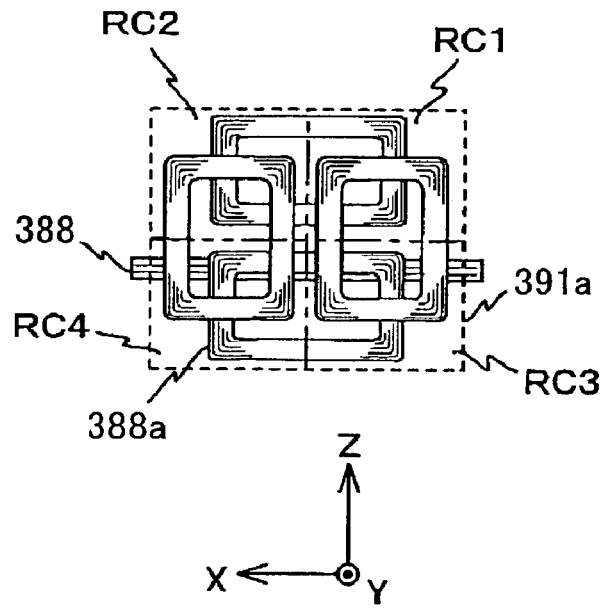
FIG. 66A and FIG. 66B are diagrams for explaining the positional relationship of the magnets and the coils in the arrangment of FIG. 65A through FIG. 65D.
Figure 66B:
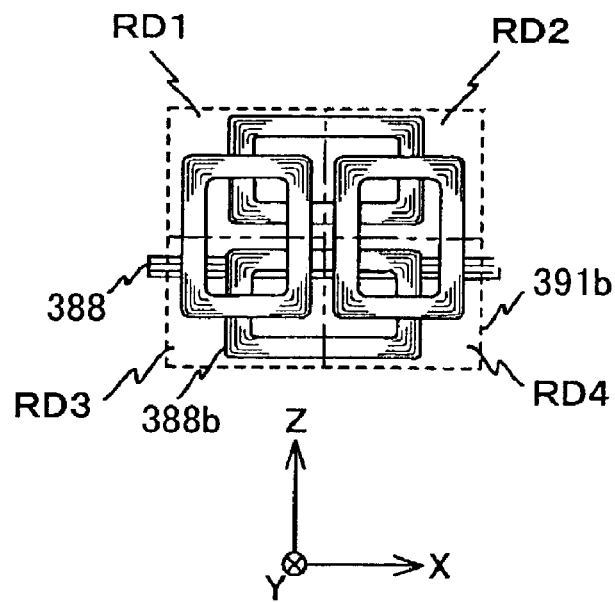

As shown in FIG. 66A, the radial tilt coil 388 is arranged on the −Y side of the lens holder 381 at the position which counters the range RC3 and the range RC4 of the first permanent magnet 391a. As shown in FIG. 66B, it is arranged on the +Y side of the lens holder 381 at the position which counters the range RD3 and the range RD4 of the second permanent magnet 391b.

Figure 67A:
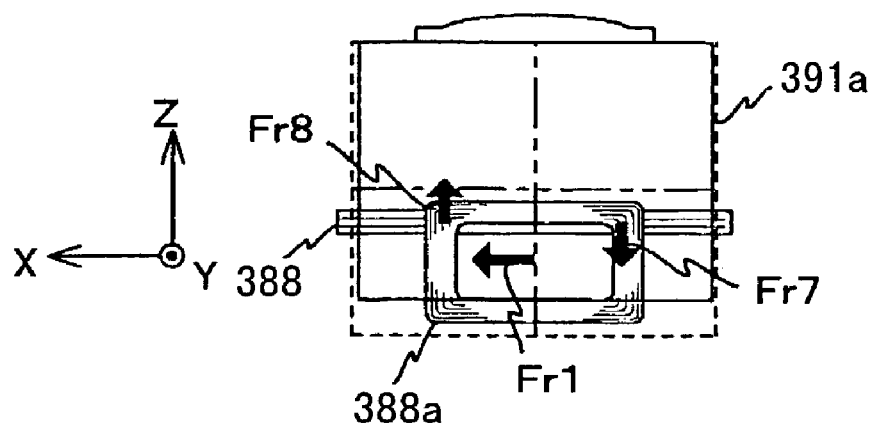
FIG. 67A and FIG. 67B are diagrams for explaining the operations of the radial tilt coils of FIG. 65A through FIG. 65D.

As shown in FIG. 67A, when the drive current is supplied to the radial tilt coil 388, the force (seventh radial tilt force: Fr7) occurs in −Z direction (or +Z direction) based on the current flowing through the radial tilt coil 388 and the magnetic flux from the range RC3 of the first permanent magnet 391a. At the same time, based on the same current and the magnetic flux from the range RC3, the force (eighth radial tilt force: Fr8) occurs in +Z direction (or −Z direction), which is opposite to the direction of the seventh radial tilt force.

Figure 67B:
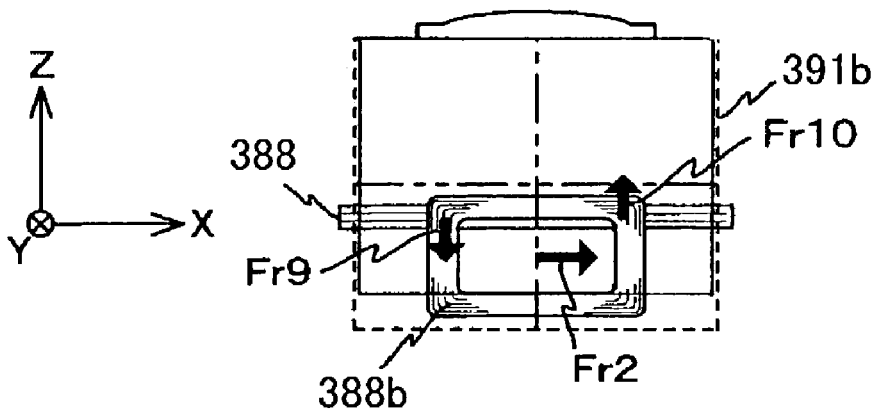

Moreover, as shown in FIG. 67B, based on the current flowing through the radial tilt coil 388 and the magnetic flux from the range RD3 of the second permanent magnet 391b, the force (ninth radial tilt force: Fr9) occurs in −Z direction (or +Z direction), which is the same direction as the seventh radial tilt force. At the same time, based on the same current and the magnetic flux from the range RD4, the force (tenth radial tilt force: Fr10) occurs in +Z direction (or −Z direction), which is opposite to the direction of the ninth radial tilt force.

As the result, the couple moment (referred to as Mg2) to rotate the movable portion in XZ plane is generated.

In this case, what is necessary is just to arrange each radial tilt coil so that the ratio of the driving force Ftr to the couple moment Mg2 may satisfy the following formula (31).

$$Ftr/Mg2 = Lns/k\text{rad}\{(1/ktr) - (Lns(Lfs/k\text{rad}))\} \quad (31)$$

Moreover, in the present embodiment, the pair of the radial tilt coils for generating the couple moment with which each magnet range is countered except the part extending in the Z-axis direction may be arranged additionally.

Moreover, in the present embodiment, the case where the surfaces of each permanent magnet which confront each other mutually are divided into the four equal ranges, respectively. However, the present invention is not limited to this embodiment.

Figure 68A:
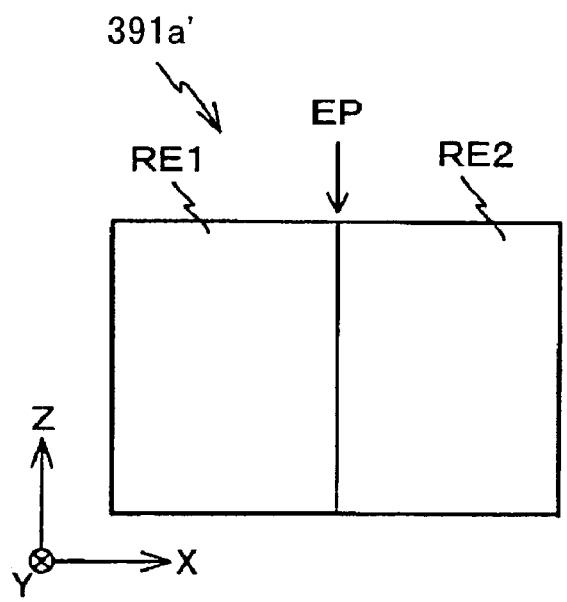
FIG. 68A and FIG. 68B are diagrams showing variation of the arrangment of the magnets.
Figure 68B:
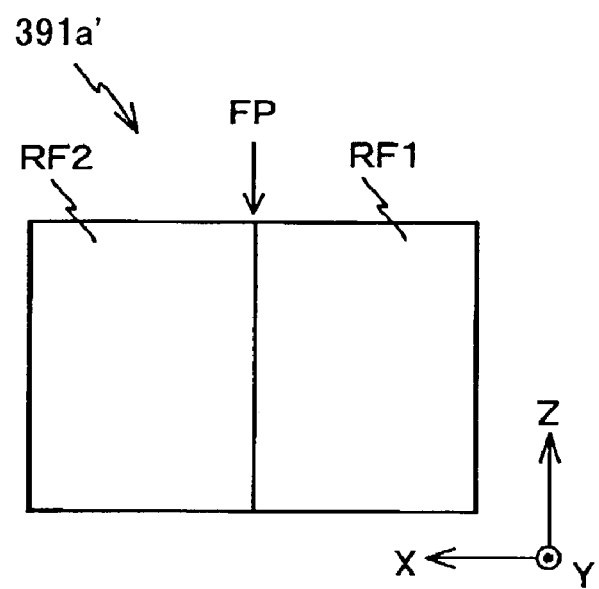
Figure 69A:
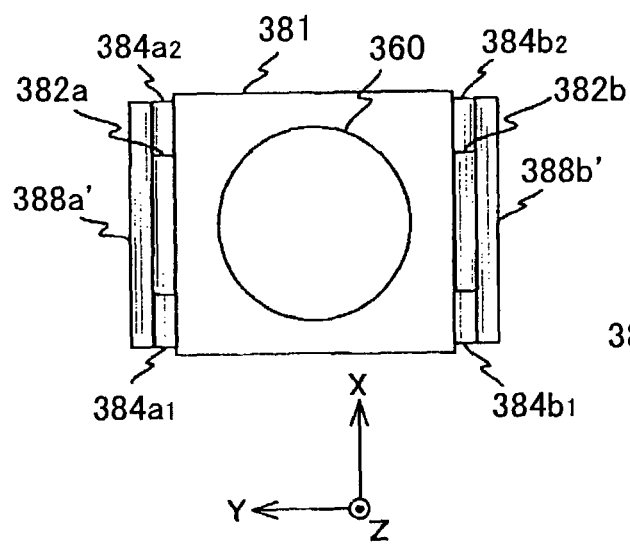
FIG. 69A, FIG. 69B, FIG. 69C and FIG. 69D are diagrams for explaining the arrangement of the coils corresponding to the arrangment of the magnets of FIG. 68A and FIG. 68B.
Figure 69B:
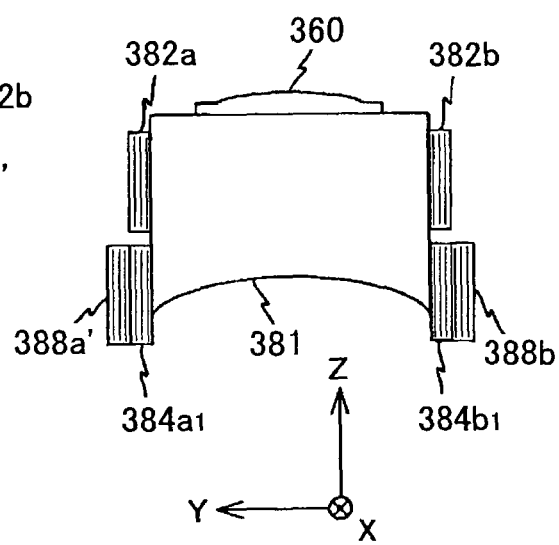
Figure 69C:
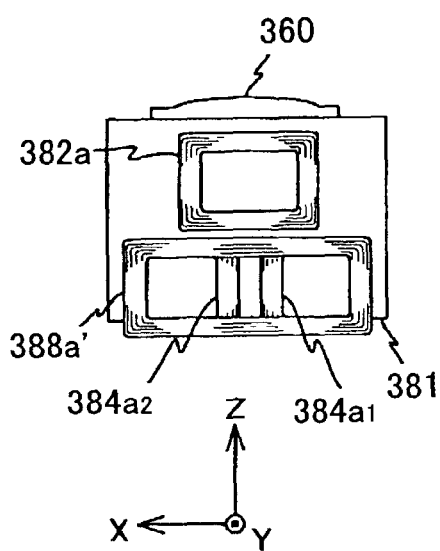
Figure 69D:
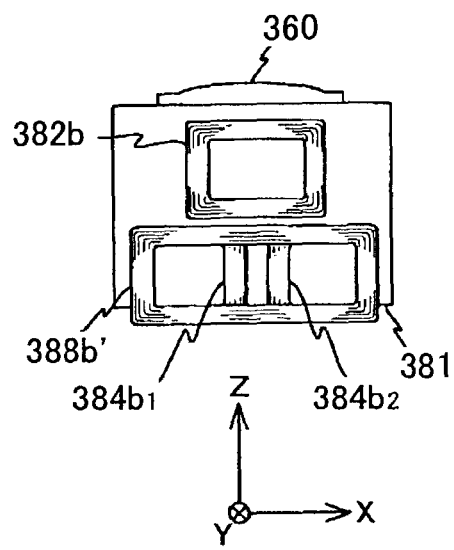

For example, as shown in FIG. 68A and FIG. 68B, it is possible to divide each surface into the two ranges by the magnetization limits (EP, FP) of the Z-axis direction.

That is, the third magnet 391a' is used instead of first permanent magnet 391a, and the fourth magnet 391b' may be used instead of being the second permanent magnet 391b.

In the present embodiment, as shown in FIG. 68A, let the range RE1 and the range on the side of +X be the ranges RE2 for the range on the side of −X of the magnetization limits EP in third magnet 391a'. In addition, the respective ranges have the reversed polarity mutually.

Moreover, as shown in FIG. 68B, let the range RF1 and the range on the side of +X be the ranges RF2 for the range on the side of −X of the magnetization limits FP in the fourth magnet 391b'. In addition, the respective ranges have the reversed polarity mutually.

In this case, as shown in FIG. 69A–FIG. 69D, the radial tilt coil 388a' is used instead of the first radial tilt coil 388a, and the radial tile coil 388b' is used instead of the second radial tilt coil 388b.

Figure 70A:
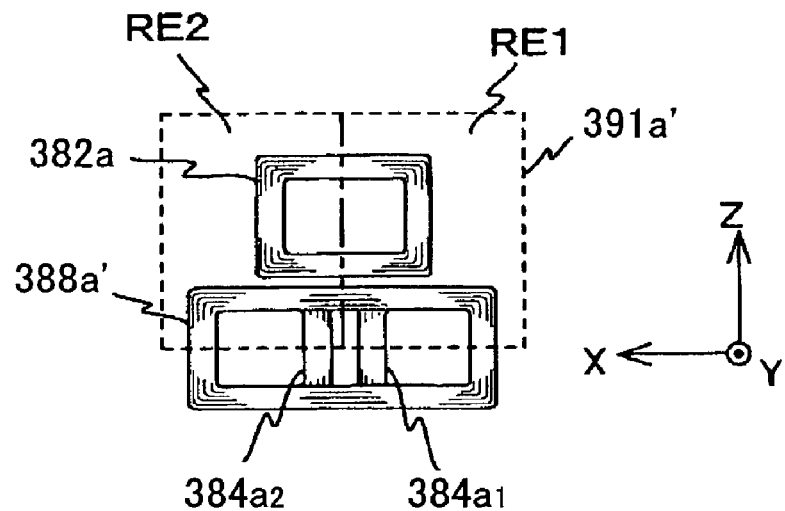
FIG. 70A and FIG. 70B are diagrams for explaining the positional relationship of the magnets and the coils in the arrangment of FIG. 69A through FIG. 69D.

As shown in FIG. 70A, the radial tilt coil 388a' is arranged, except for the part extending in the X-axis direction, at the position to equally confront the range RE1 and the range RE2 of the third magnet 391a'.

Figure 70B:
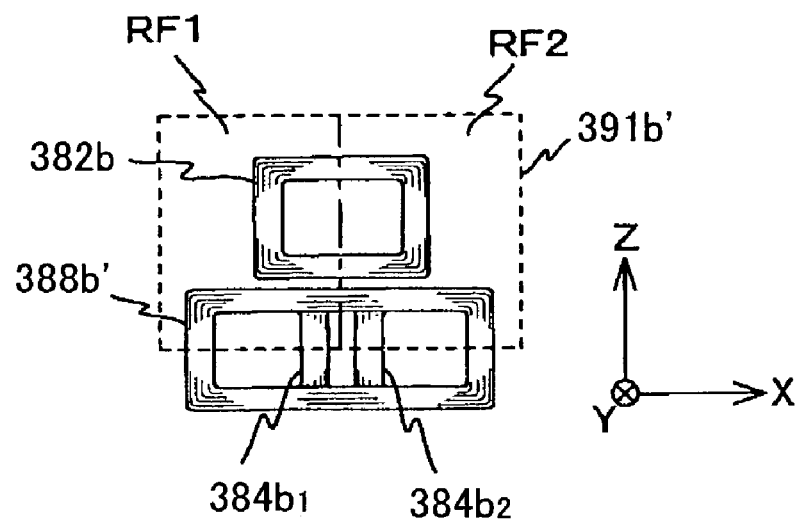

As shown in FIG. 70B, the radial tilt coil 388b' is arranged in the position to equally confront the range RF1 and the range RF2 of the fourth magnet 391b', except for the part extending in the X-axis direction.

Figure 71A:
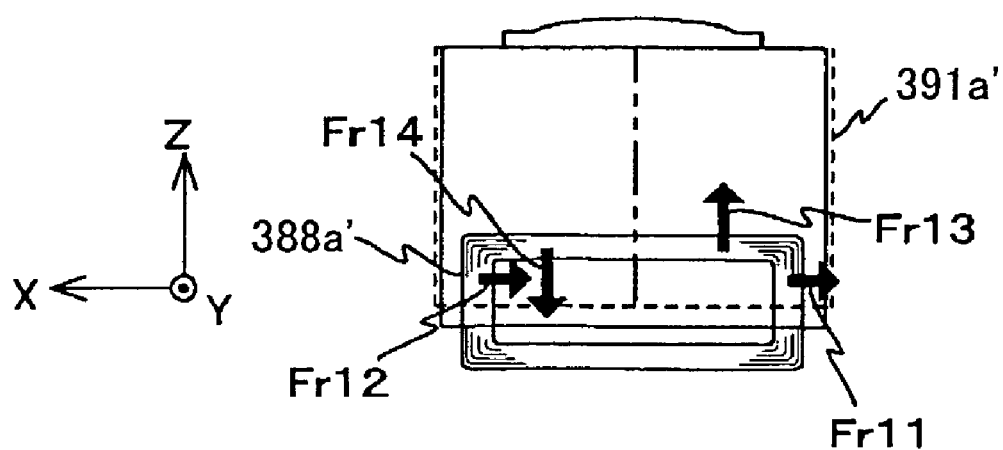
FIG. 71A and FIG. 71B are diagrams for explaining the operations of the radial tilt coils of FIG. 69A through FIG. 69D.

When the drive current is supplied to the radial tilt coil 388a', as shown in FIG. 71A, the force (11th radial tilt force Fr11, 12th radial tilt force: Fr12) of +X direction (or −X direction) occurs based on the current flowing through the radial tilt coil 388a' and the magnetic flux from the range RE1 and the range RE2 of the third permanent magnet 391a'. At the same time, the force (13th radial tilt force: Fr13) of +Z direction (or −Z direction) and the force (14th radial tilt force: Fr14) of −Z direction (or +Z direction) occur.

Figure 71B:
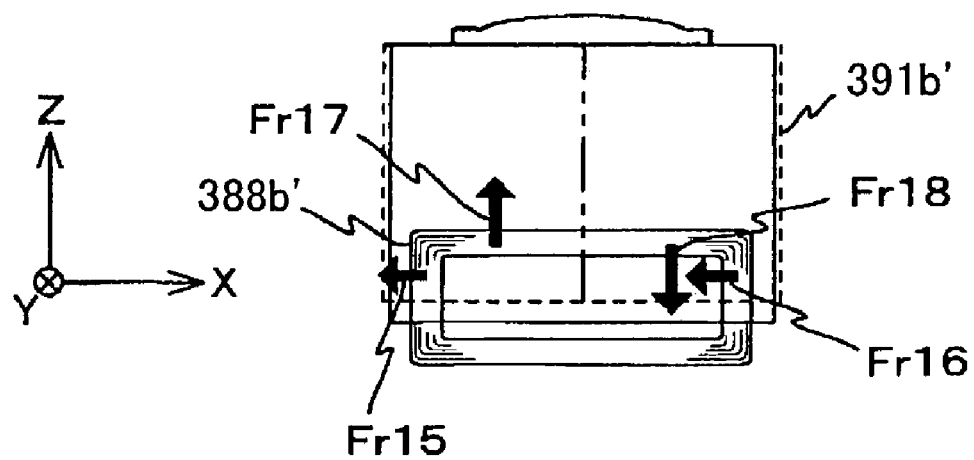

As shown in FIG. 71B, when the drive current is supplied to the radial tilt coil 388b', the force (15th radial tilt force: Fr15, 16th radial tilt force: Fr16) occurs in the direction of +X (or the direction of −X) based on the current flowing through the radial tilt coil 388b' and the magnetic flux from the range RF1 and the range RF2 of the fourth permanent magnet 391b'. At the same time, the force (17th radial tilt force: Fr17) of the +Z direction (or −Z direction) and the force (18th radial tilt force: Fr18) of the −Z direction (or +Z direction) occur.

In this case, what is necessary is just to arrange each radial tilt coil so that the ratio of the driving force Ftr2 of the X-axis direction by Fr11, Fr12, Fr15 and Fr16 to the couple moment Mg3 by Fr13, Fr14, Fr17 and Fr18 may satisfy the following formula (32).

$$Ftr2/Mg3 = Lns/k\text{rad}\{(1/ktr) - (Lns(Lfs/k\text{rad}))\} \quad (32)$$

In addition, when the frequency of the drive signal is high, and when the frequency band is wide, the approach that is the same as described above can be used.

Figure 72A:
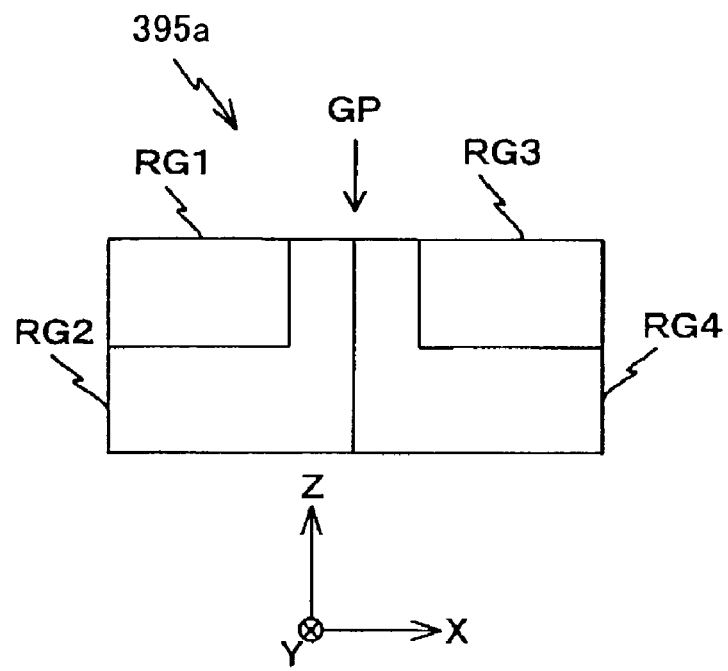
FIG. 72A and FIG. 72B are diagrams showing another variation of the arrangment of the magnets.
Figure 72B:
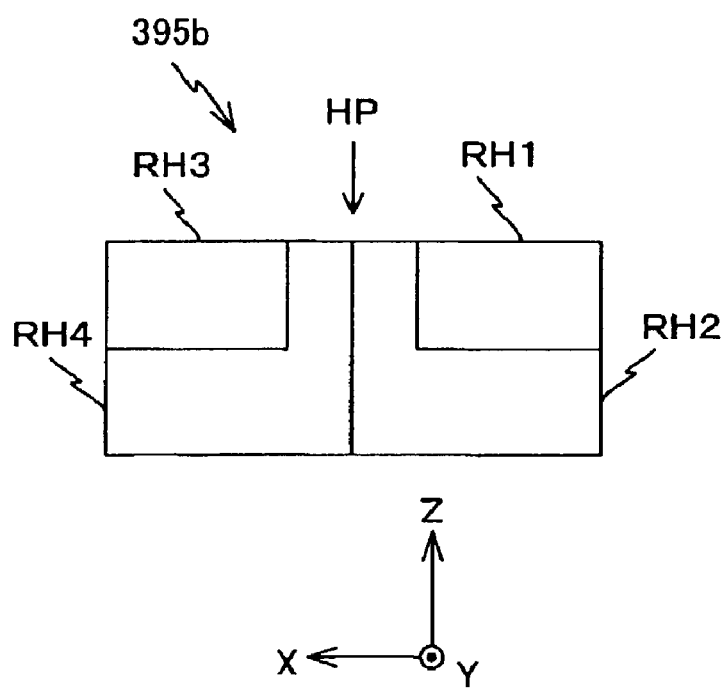

Moreover, as shown in FIG. 72A and FIG. 72B, it is possible to use the permanent magnets 395a and 395b with which the magnitude of each range differs mutually.

As the surface on the side of −Y of the permanent magnet 395a is shown in FIG. 72A, it is divided into the two ranges by the magnetization limits GP of the Z-axis direction, and each range is further divided into the L-shaped range and the rectangular range.

In the present embodiment, the rectangular range on the side of −X of the magnetization limits GP is indicated by the range RG1, and the L-shaped range on the same side is indicated by the range RG2.

The rectangular range on the side of +X of the magnetization limits GP is indicated by the range RG3, and the L-shaped range on the same side is indicated by the range RG4.

And the range RG1 and the range RG2 have the reversed polarity mutually, and the range RG3 and the range RG4 have the reversed polarity mutually. Moreover, the range RG1 is smaller than the range RG2, and the range RG3 is smaller than the range RG4.

As shown in FIG. 72B, the surface on the side of +Y of the permanent magnet 395b is divided into the two ranges by the magnetization limits HP of the Z-axis direction, and each range is further divided into the L-shaped range and the rectangular range.

In the present embodiment, the rectangular range on the side of −X of the magnetization limits HP is indicated by the range RH1, and the L-shaped range on the same side is indicated by the range RH2. The rectangular range on the side of +X of the magnetization limits HP is indicated by the range RH3, and the L-shaped range on the same side is indicated by the range RH4.

And the range RH1 and the range RH2 have the reversed polarity mutually, and the range RH3 and the range RH4 have the reversed polarity mutually. Moreover, the range RH1 is smaller than the range RH2, and the range RH3 is smaller than the range RH4.

Figure 73A:
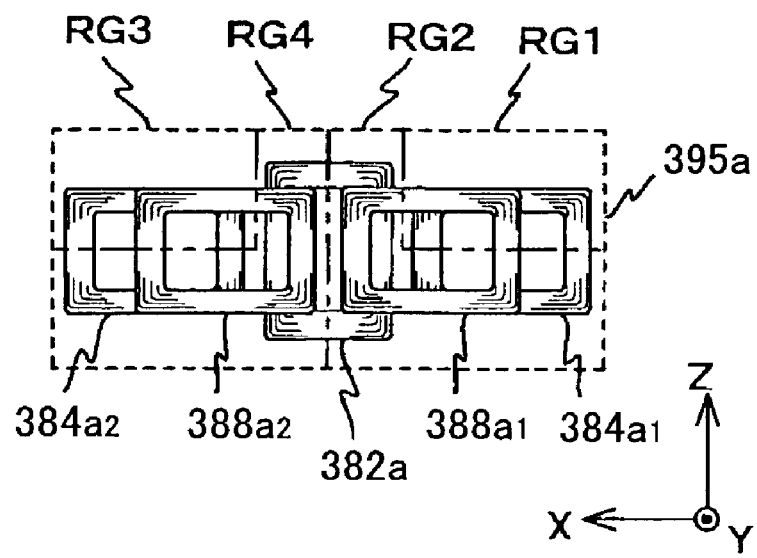
FIG. 73A and FIG. 73B are diagrams for explaining the positional relationship of the magnets and the coils in the arrangment of FIG. 72A and FIG. 72B.
Figure 73B:
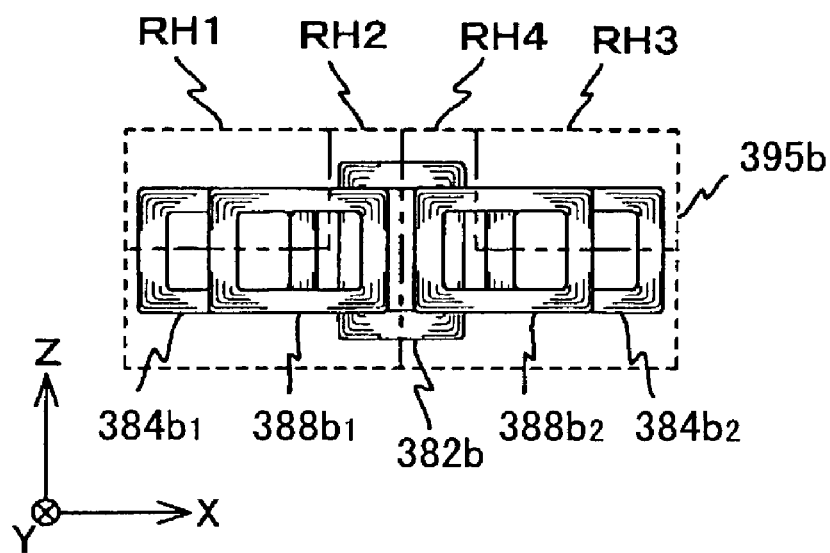

In this case, as shown in FIG. 73A, the first tracking coil 382a is arranged at the position which equally counters the range RG2 and the range RG4 of the permanent magnet 395a. As shown in FIG. 73B, the second tracking coil 382b is arranged at the position which equallt counters the range RH2 and the range RH4 of the permanent magnet 395b.

As shown in FIG. 73A, the first focusing coil 384a1 is arranged at the position where the range RG1 and the range RG2 of the permanent magnet 395a counter equally to the part which adjoins the Z-axis direction, and the second focusing coil 384a2 is arranged at the position where the range RG3 and the range RG4 of the permanent magnet 395a counter almost equally to the part which adjoin the Z-axis direction.

Moreover, as shown in FIG. 73B, the third focusing coil 384b1 is arranged at the position where the range RH1 and the range RH2 of the permanent magnet 395b counter almost equally to the part which adjoins the Z-axis direction. The fourth focusing coil 384b2 is arranged at the position where the range RH3 and the range RH4 of the permanent magnet 395b counter almost equally to the part which adjoins the Z-axis direction.

As shown in FIG. 73A, the radial tilt coil 388a1 is arranged at the position where about two thirds of this coil counters the range RG2 of the permanent magnet 395a and the remainder of this coil counters the range RG1. The radial tilt coil 388a2 is arranged at the position where about two thirds of this coil counters the range RG4 and the remainder of this coil counters the range RG2.

As shown in FIG. 73B, the radial tilt coil 388b1 is arranged at the position where two thirds of this coil counters the range RH2 of the permanent magnet 395b and the remainder thereof counters the range RH1. The radial tilt coil 388b2 is arranged at the position where two thirds of this coil counters the range RH4 and the remainder thereof counters the range RH3.

As shown in FIG. 74A and FIG. 74B, when the drive current is supplied to each radial tilt coil, the driving force to move the movable portion to the X-axis direction and the couple moment to rotate the movable portion in XZ plane occur.

Therefore, the movement of the principal-point position of the objective lens generated by the radial tilt drive can be controlled by arranging each radial tilt coil so that the above-mentioned conditions related to the ratio of the driving force and the couple moment may be satisfied.

Figure 75A:
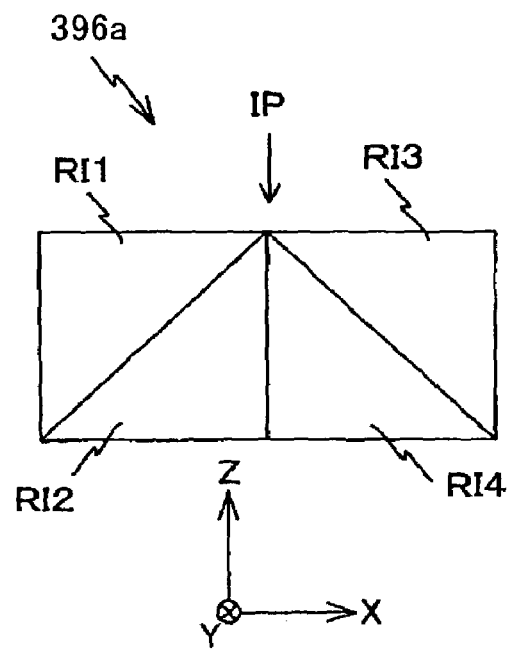
FIG. 75A and FIG. 75B are diagrams showing another variation of the arrangment of the magnets.
Figure 75B:
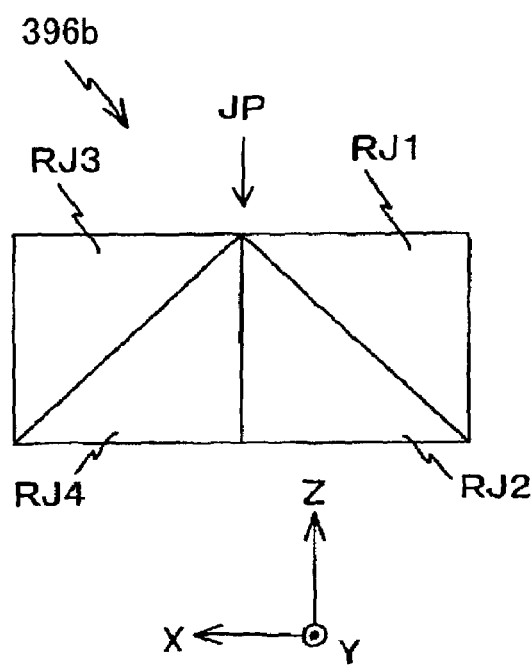

Furthermore, as shown in FIG. 75A and FIG. 75B, the permanent magnets 396a and 396b having respective ranges with the shape of a triangle may be used instead.

As shown in FIG. 75A, the surface on the side of −Y of the permanent magnet 396a is divided into the two ranges by the magnetization limits IP of the Z-axis direction, and each range is further divided into the two triangule ranges.

In the present embodiment, the triangle range on the −X side of the magnetization limits IP which makes the magnetization limits IP one side of the triangle range is indicated by the range RI2. The other triangle range is indicated by the range RI1. The triangle range on the +X side of the magnetization limits IP which makes the magnetization limits IP one side of the triangle range is indicated by the range RI4. The other triangle range is indicated as the range RI3. In addition, the triangle ranges which adjoin each other have the reversed polarity mutually.

As shown in FIG. 75B, the surface on the side of +Y of permanent magnet 396b is divided into the two ranges by the magnetization limits JP of the Z-axis direction, and each range is further divided into the two triangle ranges.

In the present embodiment, the triangle range on the −X side of the magnetization limits JP which makes the magnetization limits JP one side of the triangle range is indicated by the range RJ2. The other triangle range is indicated by the range RJ1. The triangle range on the +X side of the magnetization limits JP which makes the magnetization limits JP one side of-the triangle range is indicated by the range RJ4. The other triangle range is indicated as the range RJ3. In addition, the triangle ranges which adjoin each other have the reversed polarity mutually.

Figure 76A:
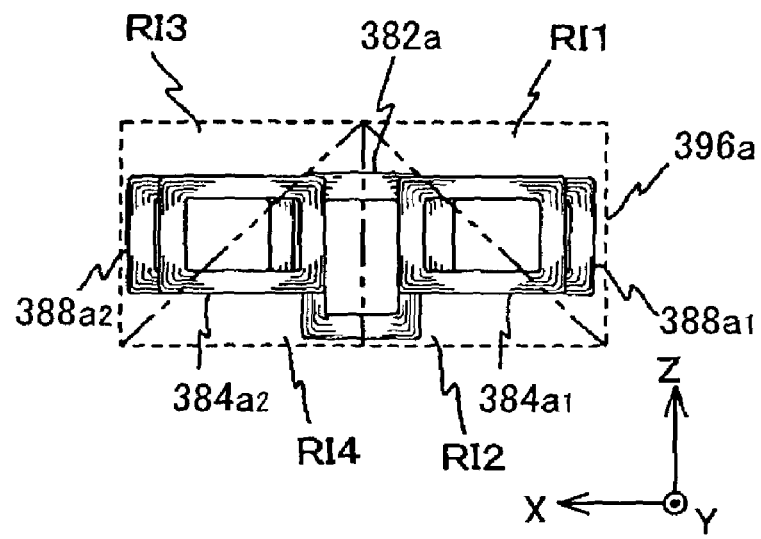
FIG. 76A and FIG. 76B are diagrams for explaining the positional relationship of the magnets and the coils in the arrangment of FIG. 75A and FIG. 75B.
Figure 76B:
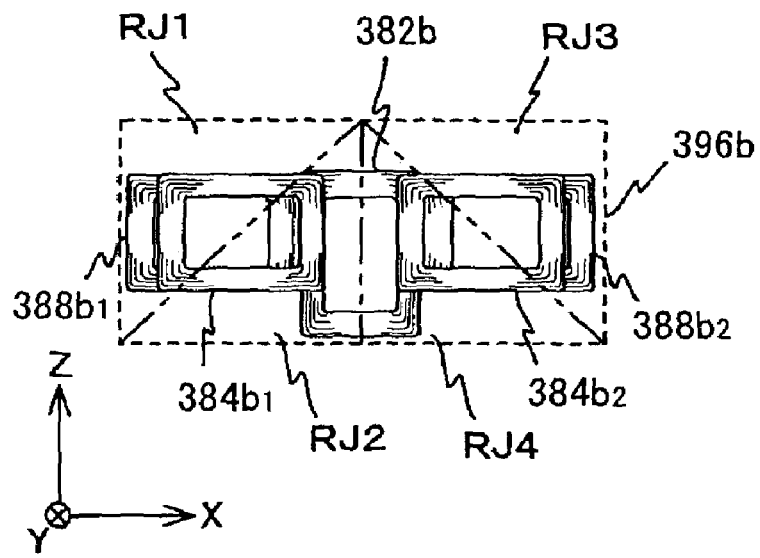

In this case, as shown in FIG. 76A, the first tracking coil 382a is arranged at the position which counters almost equally to the range RI2 and the range RI4 of the permanent magnet 396a. As shown in FIG. 76B, the second tracking coil 382b is arranged at the position which counters almost equally to the range RJ2 and the range RJ4 of the permanent magnet 396b.

As shown in FIG. 76A, the first focusing coil 384a1 is arranged at the position which counters almost equally to the range RI1 and the range RI2 of the permanent magnet 396a. The second focusing coil 384a2 is arranged at the position which counters almost equally to the range RI3 and the range RI4 of the permanent magnet 396a.

Moreover, as shown in FIG. 76B, the third focusing coil 384b1 is arranged at the position which counters almost equally to the range RJ1 and the range RJ2 of the permanent magnet 396b, and the fourth focusing coil 384b2 is arranged at the position which counters almost equally to the range RJ3 and the range RJ4 of the permanent magnet 396b.

As shown in FIG. 76A, the radial tilt coil 388a1 is arranged at the position where about two thirds of this coil counter the range RI1 of the permanent magnet 396a and the remainder thereof counters the range RI2. The radial tilt coil 388a2 is arranged at the position where about ⅔ of this coil counters the range RI3 and the remainder counters the range RI4.

As shown in FIG. 76B, the radial tilt coil 388b1 is arranged at the position where about two thirds of this coil counters the range RJ1 of the permanent magnet 396b and the remainder counters the range RJ2. The radial tilt coil 388b2 is arranged at the position where about two thirds of this coil counter the range RJ3 and the remainder counters the range RJ4.

Figure 77A:
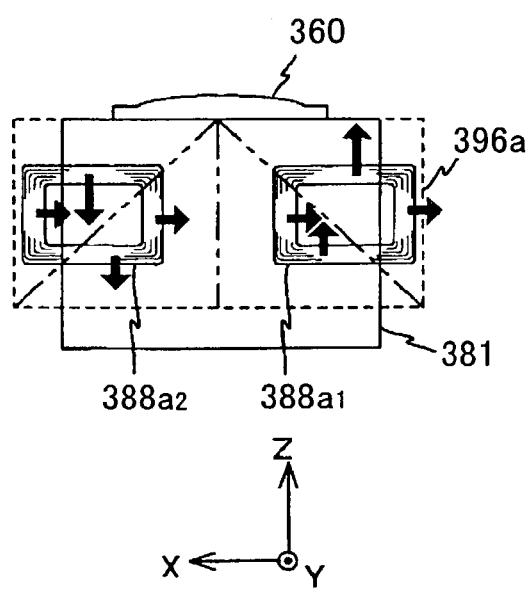
FIG. 77A and FIG. 77B are diagrams for explaining the operations of the radial tilt coils of FIG. 76A and FIG. 76B.
Figure 77B:
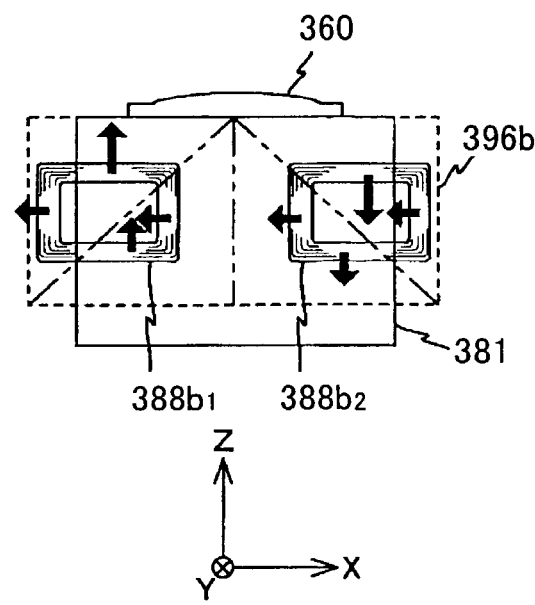

As shown in FIG. 77A and FIG. 77B, when the drive current is supplied to each radial tilt coil, the driving force to move the movable portion to the X-axis direction and the couple momemnt to rotate the movable portion in XZ plane occur.

Therefore, the movement of the principal-point position of the objective lens generated by the radial tilt drive can be controlled by arranging each radial tilt coil so that the above-mentioned conditions related to the ratio of the driving force and the couple moment may be satisfied.

Moreover, in the present embodiment, the case where the tilt sensor is arranged apart from the optical pickup device is described. However, the present invention is not limited to this embodiment. It is possible that the tilt sensor be arranged within the optical pickup device.

It is possible to add the tilt detectors 328, and the circuit which performs the same processing to the optical pickup device. In the optical pickup device of such embodiment, the signal with which the influence of the radial tilt is removed will be stably be outputted.

Moreover, as for the arrangement of the range in the permanent magnet, it is not limited to the above-described embodiment. It is adequate that the turning effort which rotates the movable portion around the rotation axis of the Y-axis direction, and the translation force which offsets the movement of the principal point of the objective lens about the X-axis direction accompanying the rotation act on the movable portion almost simultaneously with the tilt control.

Moreover, as for the composition and the arrangement position of the radial tilt coils, it is not limited to the above-described embodiment. It is adequate that the turning effort which rotates the movable portion around the rotation axis of the Y-axis direction, and the translation force which offsets the movement of the principal point of the objective lens about the X-axis direction accompanying the rotation act on the movable portion almost simultaneously with the tilt control.

Moreover, in the above-described embodiment, the case where the information storage medium based on the specification of the DVD system is used as the optical disk 315 is described. However, the present invention is not limited to this embodiment, and it is possible to use an information storage medium based on the specification of the CD (compact disc) system or a laser disk.

The present invention is applicable to any information storage medium to which a light beam is focused in order to carry out at least reproduction of information from the storage medium among the functions of recording, reproduction and elimination.

As for the light source which outputs the light beam, not only the light source that outputs a light beam whose wavelength is 660 nm but also the light source that outputs a light beam whose wavelength is 405 nm or the light source that outputs a light beam whose wavelength is 780 nm may be used.

Moreover, in the above-described embodiment, the case where a single light sources is used is described. However, the present invention is not limited to this embodiment, and it is possible to use a plurality of light sources. In such a case, it is possible to use a multiple light-source unit including any of the light source that outputs the light beam whose wavelength is 405 nm, the light source that outputs the light beam whose wavelength is 660 nm, and the light source that outputs the light beam whose wavelength is 780 nm.

The present invention is not limited to the above-described embodiments, and variations and modifications may be made without departing from the scope of the present invention.

Further, the present invention is based on Japanese priority applications No. 2002-165616, filed on Jun. 6, 2002; No. 2002-198442, filed on Jul. 8, 2002; No. 2002-297166, filed on Oct. 10, 2002; and No. 2002-334417, filed on Nov. 18, 2002, the entire contents of which are hereby incorporated by reference.

What is claimed is:

1. An objective lens drive apparatus comprising:
a stationary member;
a movable portion having an objective lens, an objective-lens holding member holding the objective lens, and driving coils generating a first force in a first direction parallel to an optical axis of the objective lens and a second force in a second direction perpendicular to the optical axis of the objective lens, wherein the driving coils are arranged to cause the movable portion to rotate around an axis of the second direction; and
a plurality of rod-like elastic support members each having an axial direction parallel to a third direction perpendicular to both the first direction and the second direction, the support members elastically supporting the movable portion so that the movable portion is movable to the stationary member in the first direction and the second direction,
wherein the movable portion is supported by the support members on both sides of the movable portion in the third direction, the support members are arranged on different planes perpendicular to the first direction, and the movable portion is arranged to be movable in the third direction with the support members, so that the objective lens is rotatable around the axis of the second direction.

2. An objective lens drive apparatus comprising:
a stationary member;
a movable portion having an objective lens, an objective-lens holding member holding the objective lens, and driving magnets generating a first force in a first direction parallel to an optical axis of the objective lens and a second force in a second direction perpendicular to the optical axis of the objective lens, wherein the driving magnets are arranged to cause the movable portion to rotate around an axis of the second direction; and
a plurality of rod-like elastic support members each having an axial direction parallel to a third direction perpendicular to both the first direction and the second direction, the support members elastically supporting the movable portion so that the movable portion is movable to the stationary member in the first direction and the second direction,
wherein the movable portion is supported by the support members on both sides of the movable portion in the third direction, the support members are arranged on different planes perpendicular to the first direction, and the movable portion is arranged to be movable in the third direction with the support members, so that the objective lens is rotatable around the axis of the second direction.

3. The objective lens drive apparatus according to claim 1 wherein ends of the support members on the stationary member side are attached to boards which are fixed to the stationary member, and portions of the boards where the ends of the support members are attached are provided to be movable in the third direction, thereby supporting the objective lens rotatably around the axis of the second direction.

4. The objective lens drive apparatus according to claim 1 wherein the support members are provided with portions that are deformable in the third direction, thereby supporting the objective lens rotatably around the axis of the second direction.

5. The objective lens drive apparatus according to claim 1 wherein ends of the support members on the movable portion side are provided to be movable to a part of the objective-lens holding member in the third direction, thereby supporting the objective lens rotatably around the axis of the second direction.

6. The objective lens drive apparatus according to claim 4 wherein the deformable portions of the support members on the both sides of the movable portion in the third direction are configured to have almost equal spring constants, thereby supporting the objective lens rotatably around the axis of the second direction.

7. The objective lens drive apparatus according to claim 1 wherein the support members on the different planes perpendicular to the first direction are configured to have different rigidity values with respect to the third direction.

8. The objective lens drive apparatus according to claim 7 wherein the support members on one of the different planes perpendicular to the first direction and passing through a principal point of the objective lens are configured to have a rigidity value with respect to the third direction, which is larger than a rigidity value with respect to the third direction of the support members on the other planes than said one of the different planes.

9. The objective lens drive apparatus according to claim 7 wherein the support members which are arranged on one of the different planes perpendicular to the first direction, pass through a principal point of the objective lens and are provided only on one side of the movable portion in the third direction are configured to have a rigidity value with respect to the third direction, which is larger than a rigidity value with respect to the third direction of the support members on the other planes than said one of the different planes.

10. The objective lens drive apparatus according to claim 1 wherein an incidence of a laser light beam projected in the second direction is transferable to the objective lens, and wherein the elastic-support members are spaced in the third direction so that they do not interfere with the laser light beam.

11. The objective lens drive apparatus according to claim 1 wherein a part of a laser light beam projected in the second direction is made to project in the first direction such that it passes through the objective-lens holding member and strikes the objective lens.

12. An objective lens drive apparatus comprising:
a stationary member;
a movable portion having an objective lens, an objective-lens holding member holding the objective lens, and driving coils generating a first force in a first direction parallel to an optical axis of the objective lens and a second force in a second direction perpendicular to the optical axis of the objective lens; and
a plurality of rod-like elastic support members each having an axial direction parallel to a third direction perpendicular to both the first direction and the second direction, the support members elastically supporting the movable portion so that the movable portion is movable to the stationary member in the first direction and the second direction,
wherein the movable portion is supported by the support members on both sides of the movable portion in the third direction, the support members are arranged on different planes perpendicular to the first direction, and the movable portion is arranged to be movable in the third direction with the support members, so that the objective lens is rotatable around an axis of the second direction,
wherein ends of the support members on the stationary member side are attached to boards which are fixed to the stationary member, and portions of the boards where the ends of the support members are attached are provided to be movable in the third direction, thereby supporting the objective lens rotatably around the axis of the second direction, and
wherein the boards to which the ends of the support members are attached are flexible circuit boards, and the flexible circuit boards are arranged on the both sides of the movable portion in the third direction.

13. The objective lens drive apparatus according to claim 12 wherein the flexible circuit boards are provided with wiring connected to the driving coils and formed into an integral board.

14. An objective lens drive apparatus comprising:
a stationary member;
a movable portion having an objective lens, an objective-lens holding member holding the objective lens, and driving magnets generating a first force in a first direction parallel to an optical axis of the objective lens and a second force in a second direction perpendicular to the optical axis of the objective lens; and
a plurality of rod-like elastic support members each having an axial direction parallel to a third direction perpendicular to both the first direction and the second direction, the support members elastically supporting the movable portion so that the movable portion is movable to the stationary member in the first direction and the second direction,
wherein the movable portion is supported by the support members on both sides of the movable portion in the third direction, the support members are arranged on different planes perpendicular to the first direction, and the movable portion is arranged to be movable in the third direction with the support members, so that the objective lens is rotatable around an axis of the second direction,
wherein ends of the support members on the stationary member side are attached to boards which are fixed to the stationary member, and portions of the boards where the ends of the support members are attached are provided to be movable in the third direction, thereby supporting the objective lens rotatably around the axis of the second direction, and
wherein the boards to which the ends of the support members are attached are flexible circuit boards, and the flexible circuit boards are arranged on the both sides of the movable portion in the third direction.

15. The objective lens drive apparatus according to claim 14 wherein the flexible circuit boards are provided with wiring and formed into an integral board.

* * * * *